US005773512A

United States Patent [19]
Chenera et al.

[11] Patent Number: 5,773,512
[45] Date of Patent: Jun. 30, 1998

[54] COMPOUNDS AND METHODS

[75] Inventors: Balan Chenera, Audubon; John Elliott, Wayne; Michael Moore, Media; Joseph Weinstock, Phoenixville, all of Pa.

[73] Assignee: SmithKline Beecham Corp., Philadelphia, Pa.

[21] Appl. No.: 663,148

[22] PCT Filed: Dec. 15, 1994

[86] PCT No.: PCT/US94/14414

§ 371 Date: Jun. 12, 1996

§ 102(e) Date: Jun. 12, 1996

[87] PCT Pub. No.: WO95/16712

PCT Pub. Date: Jun. 22, 1995

[51] Int. Cl.[6] .............................. C08F 8/00; C08L 83/00
[52] U.S. Cl. ........................ 525/100; 525/105; 525/106
[58] Field of Search .................................. 525/100, 105, 525/106

[56] References Cited

U.S. PATENT DOCUMENTS

| 3,139,409 | 6/1964 | Meston et al. | |
| 4,912,170 | 3/1990 | Niwa et al. | 525/337 |
| 4,933,391 | 6/1990 | Long et al. | 525/106 |
| 5,369,012 | 11/1994 | Koontz et al. | 435/792 |

FOREIGN PATENT DOCUMENTS

| 57-146788 | 9/1982 | Japan . |
| 4-124191 | 4/1992 | Japan . |
| 5-345789 | 12/1993 | Japan . |

*Primary Examiner*—Karen A. Dean
*Attorney, Agent, or Firm*—Nora Stein-Fernandez; Janice E. Williams; Edward T. Lentz

[57] ABSTRACT

This invention relates to libraries of non-peptide compounds each comprised of a core structure and methods for making such libraries. This invention also relates to novel silicon-based polymer resins and silane linkers, methods for their preparation and their use in the synthesis of libraries of compounds to be screened as pharmaceutical agents.

26 Claims, No Drawings

COMPOUNDS AND METHODS

FIELD OF THE INVENTION

This invention relates to libraries of non-peptide compounds each comprised of a core structure and methods for making such libraries. This invention also relates to novel silicon-based polymer resins and silane linkers, methods for their preparation and their use in the synthesis of libraries of aromatic carbocycles to be screened as pharmaceutical agents.

BACKGROUND OF THE INVENTION

In the continuing search for new chemical moieties that can effectively modulate a variety of biological processes, the standard method for conducting a search is to screen a variety of pre-existing chemical moieties, for example, naturally occurring compounds or compounds which exist in synthetic libraries or databanks. The biological activity of the pre-exiting chemical moieties is determined by applying the moieties to an assay which has been designed to test a particular property of the chemical moiety being screened, for example, a receptor binding assay which tests the ability of the moiety to bind to a particular receptor site.

In an effort to reduce the time and expense involved in screening a large number of randomly chosen compounds for biological activity, several developments have been made to provide libraries of compounds for the discovery of lead compounds. The chemical generation of molecular diversity has become a major tool in the search for novel lead structures. Currently, the known methods for chemically generating large numbers of molecularly diverse compounds generally involve the use of solid phase synthesis, in particular to synthesize and identify peptides and peptide libraries. See, for example, Lebl et al., *Int. J. Pept. Prot. Res.*, 41, p. 201 (1993) which discloses methodologies providing selectively cleavable linkers between peptide and resin such that a certain amount of peptide can be liberated from the resin and assayed in soluble form while some of the peptide still remains attached to the resin, where it can be sequenced; Lam et al., *Nature*, 354, p. 82 (1991) and (WO 92/00091) which disclose a method of synthesis of linear peptides on a solid support such as polystyrene or polyacrylamide resin; Geysen et al., *J. Immunol. Meth.*, 102, p. 259 (1987) which discloses the synthesis of peptides on derivatized polystyrene pins which are arranged on a block in such a way that they correspond to the arrangement of wells in a 96-well microtiter plate; and Houghten et al., *Nature*, 354, p. 84 (1991) and WO 92/09300 which disclose an approach to de novo determination of antibody or receptor binding sequences involving soluble peptide pools.

The major drawback, aside from technical considerations, with all of these methods for lead generation is the quality of the lead. Linear peptides historically have represented relatively poor leads for pharmaceutical design. In particular, there is no rational strategy for conversion of a linear peptide into a non-peptide lead. As noted above, one must resort to screening large databanks of compounds, with each compound being tested individually, in order to determine non-peptide leads for peptide receptors.

It is known that a wide variety of organic reactions can be carried out on substrates immobilized on resins. These include, in addition to peptide synthesis reactions which are well known to those of ordinary skill in the art, nucleophilic displacements on benzylic halides, halogenation, nitration, sulfonation, oxidation, hydrolysis, acid chloride formation, Friedel-Crafts reactions, reduction with $LiAlH_4$, metallation, and reaction of the organometallic polymer with a wide variety of reagents. See, for example, N. K. Mathur et al., *Polymers as Aids in Organic Chemistry*, Academic Press, New York, p. 18 (1980). In addition, Farrall et al., *J. Org. Chem.*, 41, p. 3877 (1976) describe the experimental details of some of these reactions carried out with resins.

The above-mentioned known organic reactions when applied to solid phase synthesis using known polymeric resins, yield non-peptide compounds containing auxiliary functional groups such as carboxyl, phenolic hydroxyl, amine, amide or bulky groups, all of which have their own unique pharmacological properties. A hydrogen atom offers its own unique pharmacological properties. However, currently, there exists no solid phase synthetic resin linker directly bonded to a carbon atom of a compound, which, upon cleavage of the compound from the resin, yields a compound with a hydrogen on the carbon at the cleavage position. See, for example, Bunin, B. A. & Ellman J. A., *JACS*, 114, pp. 10997–10998 (1992), which reports the solid-phase synthesis of 1,4-benzodiazepine derivatives. Unlike the instant invention, that method is limited by requisite introduction of auxiliary functionality, e.g., carboxylic acid, in the target molecule in order to facilitate attachment to the solid support. Furthermore, no apparatus or method for multiple, simultaneous synthesis is described by Bunin & Ellman.

It has now been discovered, as disclosed herein, that silicon-based polymer resins are useful in the preparation of a single compound, e.g., an aromatic carbocycle, or a library of molecularly diverse compounds which are aromatic carbocycles, each comprising an aromatic carbon atom and at least one substituent that is not hydrogen or alkyl, said aromatic carbons having a hydrogen, halogen, hydroxy or acyloxy group bound to them after cleavage from the resin.

It has also been discovered that certain non-peptide compounds, each comprised of a core structure, bind to a variety of receptors, in particular, G-protein coupled receptors. It has further been discovered that the core structures, including aromatic carbocycles, may be used as templates for developing libraries of non-peptide compounds which are analogs of the core structures. Therefore, rather than synthesizing individual analogs of these non-peptide compounds for screening, large numbers of non-peptide compounds which may be receptor ligands, in particular G-protein coupled receptor ligands, can be synthesized by the combinatorial methods described herein and screened in assays developed for determining lead compounds as pharmaceutical agents. The methods disclosed herein may also be applied to obtain libraries of compounds, including aromatic carbocycles, that are enzyme inhibitors, receptor ligands or channel blockers.

The current methods for generation of lead compounds have a variety of limitations, therefore, demonstrating the necessity for new methods for generating and determining lead compounds as pharmaceutical agents.

SUMMARY OF THE INVENTION

The present invention is directed to non-peptide compounds, each comprised of a core structure. The present invention is also directed to the use of these core structures as templates for developing libraries of non-peptide compounds which are analogs of the core structures. Further, this invention is directed to libraries of compounds which comprise receptor ligands, in particular, G-protein coupled receptor ligands, enzyme inhibitors and channel blockers and the combinatorial synthetic methods for making such libraries of compounds. Still further this invention relates to novel silicon-based polymer resins, methods for preparing said resins and intermediates used in the preparation of said resins. In this regard, one aspect of this invention relates to methods for preparing one or a plurality of derivatized compounds by resin-bound synthesis, wherein the compounds are aromatic carbocycles each comprising an aromatic carbon atom and at least one substituent X, A, B or C that is not hydrogen or alkyl, said aromatic carbons having a hydrogen, halogen, hydroxy or acyloxy group bound to them after cleavage from the resin. In particular, this aspect of the invention relates to methods for utilizing silicon chemistry to effectuate the cleavage of an aromatic carbocycle from a polymer resin while leaving a hydrogen, halogen, hydroxy or acyloxy group on the aromatic carbocycle at the cleavage position. Yet further, the present invention is directed to methods for screening a compound or plurality of compounds made according to the synthetic methods disclosed herein, which comprise using the compounds in suitable assays developed for detecting the compounds' utility as pharmaceutical agents. In addition, this invention relates to a method of screening G-protein coupled receptors with ligands that are known to bind other G-protein coupled receptors, or that are related to ligands that are known to bind other G-protein coupled receptors.

DETAILED DESCRIPTION OF THE INVENTION

The term "core structure(s)" is used herein at all occurrences to mean a core molecular structure(s) which is derived from compounds which have been shown to interact with a receptor, in particular, a G-protein coupled receptor, and which is used as a template for designing the libraries of compounds to be made. Core structures may be aromatic carbocycles as defined below.

The term "library of compounds" is used herein at all occurrences to mean a series or plurality of compounds derivatized from their core structure. Suitably, the core structure used for designing a library of compounds is an aromatic carbocycle.

The term "combinatorial library" is used herein at all occurrences to mean a collection of compounds based upon a core structure, for example, an aromatic carbocycle structure, wherein the library contains a discrete number of independently variable substituents, functional groups or structural elements, and further, wherein the library is designed so that, for the range of chemical moieties selected for each of the independently variable substituents, compounds containing all possible permutations of those substituents will be present in the library. Thus, by way of illustration, if a core structure, labeled R, contains three independently variable substituents, labeled X, Y and Z, and if X is taken from m different chemical moieties, Y from n different chemical moieties and Z from p different chemical moieties (wherein m, n and p are integers which define the size of the library, and which range between 1 to 1000; preferably between 1 to 100; most preferably between 1 to 20), then the library would contain m×n×p different chemical compounds and all possible combinations of X, Y and Z would be present on the core structure R within that library. The methods for preparing combinatorial libraries of compounds are such that the molecularly diverse compound members of the libraries are synthesized simultaneously.

The term "aromatic carbocycle" is used herein at all occurrences to mean a compound which comprises a single ring or a fused ring system, preferably 5–14 membered ring systems, and, for purposes herein, includes an optionally substituted biphenyl, composed of carbon atoms having aromatic character, e.g., characterized by delocalized electron resonance and the ability to sustain a ring current and which ring or ring systems may include one or more heteroatoms selected from oxygen, nitrogen or sulfur. The aromatic carbocycle may be optionally substituted by one or more substituents herein described as "substituent X", "substituent A", "substituent B" or "substituent C". When the aromatic carbocycle is a biphenyl, the substituents X, A, B or C may be, independently, on one or both rings. This is similarly so for other aromatic carbocyclic rings or ring systems as defined above. It will be recognized by the skilled artisan that a large number of aromatic carbocycles may be made using the silane linkers of this invention, provided that the chemistry used to prepare the aromatic carbocycles is compatible with the aryl silane bond, defined below. Suitable aromatic carbocycles include, but are not limited to, optionally substituted phenyl rings, optionally substituted naphthyl rings, optionally substituted tetrahydronaphthyl rings, optionally substituted anthracenyl rings, optionally substituted 1-, 2- or 3-tetrahydrobenzazepines; optionally substituted 1,4, 1,5-, or 2,4-tetrahydrobenzodiazepines; optionally substituted biphenyl tetrazoles; optionally substituted 1,3- or 1,4-diaminobenzene compounds; or optionally substituted 1,3- or 1,4-aminocarboxyphenyl compounds. Suitably, the aromatic carbocycles described herein may serve as core structures, and therefore, as templates for designing libraries of compounds to be screened as pharmaceutical agents. Suitably, the aromatic carbocycles are G-protein coupled receptor ligands, channel blockers and/or enzyme inhibitors.

The terms "resin-bound synthesis" and "solid phase synthesis" are used herein interchangeably to mean one or a series of chemical reactions used to prepare either a single compound or a library of molecularly diverse compounds, wherein the chemical reactions are performed on a compound, suitably, an aromatic carbocycle, which is bound to a polymeric resin support through an appropriate linkage, suitably, an silane linker.

The terms "resin," "inert resin," "polymeric resin" or "polymeric resin support" are used herein at all occurrences to mean a bead or other solid support such as beads, pellets, disks, capillaries, hollow fibers, needles, solid fibers, cellulose beads, pore-glass beads, silica gels, grafted co-poly beads, poly-acrylamide beads, latex beads, dimethylacrylamide beads optionally cross-linked with N,N'-bis-acryloyl ethylene diamine, glass particles coated with a hydrophobic polymer, etc., i.e., a material having a rigid or semi-rigid surface. The solid support is suitably made of, for example, cross linked polystyrene resin, polyethylene glycol-polystyrene resin, benzyl ester resins or benzhydrylamine resins and any other substance which may be used as such and which would be known or obvious to one of ordinary skill in the art. For purposes herein, it will be obvious to the skilled artisan, that when the linker to the resin is silicon-based, the above terms mean any aliphatic or aromatic polymer which lacks functionality known to participate in the additional synthetic chemistry for generation of the derivatized compounds of this invention, and which is stable to conditions for protodesilylation. Preferred polymer resins for use herein are the Merrifield resin (available commercially from Nova Biochem) and the Wang resin (synthesis described below). The compounds (or libraries of compounds) made by the instant methods may either remain bound to the resin which is used to perform the resin-bound synthesis (hereinafter referred to as "resin-bound compounds (or libraries)") or not bound to a resin (hereinafter referred to as "soluble compounds (or libraries)").

The terms "silane linker" or "silane linker group" are used herein at all occurrences to mean the moiety which binds the aromatic carbocycle to the polymeric resin support, which linker comprises a silicon atom bound to an alkyl chain comprising one or more methylene groups, said alkyl chain optionally having one or more intervening heteroatoms and/or aryl groups, or combinations thereof. Suitable silane linkers for use in this invention comprise a moiety of the following formula: -D-CH$_2$—Si—R"R'", wherein R" and R'" are independently, $C_1$ to $C_6$ alkyl, and D is a $C_1$ to $C_{20}$ alyl chain optionally having one or more intervening heteroatoms and/or optionally substituted aryl groups. It will be recognized that the alkyl chain may contain both intervening heteroatoms and intervening optionally substituted aryl groups. Preferably, R" and R'" are independently, $C_1$ to $C_4$ alkyl, more preferably, R" and R'" are both methyl or ethyl, more preferably methyl.

The term "aryl silane compound" is used herein at all occurrences to mean an intermediate compound comprising an aromatic carbocycle having an aromatic carbon and at least one substituent X, A, B or C that is not hydrogen or alkyl, wherein the aromatic carbon is bound to a silane linker through an aryl silane bond. Suitably, an aryl silane compound within the scope of this invention is defined by a compound of Formula (IB).

The term "aryl silane bond" is used herein at all occurrences to mean the bond between the aromatic carbon of an aromatic carbocycle and the silicon atom of a silane linker. Suitably, after the resin-bound synthesis is performed, this bond is cleaved in order to decouple the aromatic carbocycle from the resin-bound aryl silane intermediate.

The term "resin-bound aryl silane intermediate" is used herein at all occurrences to mean an intermediate wherein an aromatic carbocycle is directly bound to a silane linker, which linker is directly bound to a polymeric resin support. Therefore, it will be recognized that a resin-bound aryl silane intermediate is a moiety which couples an aromatic carbocycle to a polymeric resin support through a silane linker.

The terms "substituent X," "substituent A," "substituent B," and "substituent C" are used herein at all occurrences to mean a non-nucleophilic substituent, including, but not limited to, hydrogen, halogen, alkyl, alkenyl, alkynyl, alkoxy, aryloxy, thioether (e.g., -alkyl-S-alkyl-), alkylthio (e.g., alkyl-SH), C(O)R$^a$, wherein R$^a$ is hydrogen or alkyl, t-butoxyamino-carbonyl, cyano, nitro (—NO$_2$), aryl, heteroaryl, arylalkyl, alkyl disulfide (e.g., alkyl-S—S—), aryl disulfide (e.g. aryl-S—S—), acetal (alkyl(O-alkyl)$_2$), thioacetal (alkyl(S-alkyl)$_2$), fluorenylmethoxycarbonyl or orthoester (—C(OR)$_3$, wherein R is $C_1$ to $C_4$ alkyl). The substituents X, A, B and C are chosen independently from one another. In addition, X, A, B and C can not all be hydrogen and X, A, B and C can not all be alkyl. When the aromatic carbocycle is a biphenyl, the substituents X, A, B or C may be, independently, on one or both rings. This is similarly so for other aromatic carbocyclic rings or ring systems as defined above. As used herein, modification of the substituents produces a derivatized aromatic carbocycle. The nature of the substituents X, A, B and C, must be compatible with the reaction conditions used for modifying said substituents without said conditions being capable of cleaving the aryl silane bond of the resin-bound aryl silane intermediate. Therefore, it will be recognized that when modification of substituents X, A, B or C by performing additional synthetic chemistry thereon, utilizes reaction conditions such that the aryl silane bond is subject to cleavage, it is desirable to choose a strong electron withdrawing group as the substituent(s). Additional synthetic chemistry can then be performed to modify the substituent(s) without cleavage of the aryl silane bond. Subsequent to performing the additional synthetic chemistry to modify the substituent(s), it is possible to cleave the aryl silane bond which decouples the aromatic carbocycle from the resin-bound aryl silane intermediate. If desired, synthetic chemistry conventional in the art may then be performed on the cleaved derivatized aromatic carbocycle to convert the strong electron withdrawing group into a different functionality, e.g., conversion of a nitro group into an amino group using known reaction conditions. Given this disclosure, the types of synthetic chemistry which are compatible with the goal of derivatizing the resin-bound aromatic carbocycle, without also cleaving the aryl silane bond of the resin-bound aryl silane intermediate, will be obvious to one of ordinary skill in the art.

The term "additional synthetic chemistry" is used herein at all occurrences to mean one or a series of chemical reactions which are performed on the resin-bound aryl silane intermediate, in particular to modify or derivatize substituents X, A, B and C, prior to cleavage of the aromatic carbocycle from the resin-bound aryl silane intermediate wherein said chemical reactions are compatible with and non-reactive with the aryl silane bond and may be used to prepare derivatives of the aromatic carbocycle. It will be recognized by the skilled artisan that the additional synthetic chemistry performed on the resin-bound aryl silane intermediate is done so prior to cleavage of the aryl silane bond. Chemical reactions which are compatible with the resin-bound aryl silane intermediate, are reactions which effectuate the swelling of the polymeric resin thereby allowing penetration of the reagents to react with the aromatic carbocycle. Chemical reactions which are reactive with the aryl silane bond, i.e., they cause cleavage of the aryl silane bond, and therefore are not among the additional synthetic chemistry that may be used in the methods of this invention, are for example, chemical reactions which use strongly acidic conditions or strong electrophilic oxidizing agents (e.g., benzoyl peroxide under acidic conditions).

The term "G-protein coupled receptor(s)" is used herein at all occurrences to mean a membrane receptor using G-proteins as part of their signaling mechanism, including, but not limited to muscarinic acetylcholine receptors, adenosine receptors, adrenergic receptors, IL-8R receptors, dopamine receptors, endothelin receptors, histamine receptors, calcitonin receptors, angiotensin receptors and the like.

The term "assay" is used herein at all occurrences to mean a binding assay or a functional assay known or obvious to one of ordinary skill in the art, including, but not limited to, the assays disclosed herein. A particularly suitable assay for use according to the invention is disclosed by Lerner et al., Proc. Natl. Acad. Sci. U.S.A., 91 (5), pp. 1614–1618 (1994).

The terms "batches" or "pools" are used herein at all occurrences to mean a collection of compounds or compound intermediates.

The term "alkyl" is used herein at all occurrences to mean a straight or branched chain radical of 1 to 20 carbon atoms, unless the chain length is limited thereto, including, but not limited to methyl, ethyl, n-propyl, isopropyl, n-butyl, sec-butyl, isobutyl, tert-butyl, and the like. Preferably the alkyl chain is 1 to 10 carbon atoms in length, more preferably 1 to 8 carbon atoms in length.

The term "alkenyl" is used herein at all occurrences to mean a straight or branched chain radical of 2–20 carbon atoms, unless the chain length is limited thereto, including, but not limited to, ethenyl, 1-propenyl, 2-propenyl, 2-methyl-1-propenyl, 1-butenyl, 2-butenyl, and the like. Preferably, the alkenyl chain is 2 to 10 carbon atoms in length, more preferably, 2 to 8 carbon atoms in length.

The term "alkynyl" is used herein at all occurrences to mean a straight or branched chain radical of 2–20 carbon atoms, unless the chain length is limited thereto, wherein there is at least one triple bond between two of the carbon atoms in the chain, including, but not limited to, acetylene, 1-propylene, 2-propylene, and the like. Preferably, the alkynyl chain is 2 to 10 carbon atoms in length, more preferably, 2 to 8 carbon atoms in length.

In all instances herein where there is an alkenyl or alkynyl moiety as a substituent group, the unsaturated linkage, i.e., the vinylene or acetylene linkage is preferably not directly attached to a nitrogen, oxygen or sulfur moiety.

The term "alkoxy" is used herein at all occurrences to mean a straight or branched chain radical of 1 to 20 carbon atoms, unless the chain length is limited thereto, bonded to an oxygen atom, including, but not limited to, methoxy, ethoxy, n-propoxy, isopropoxy, and the like. Preferably the alkoxy chain is 1 to 10 carbon atoms in length, more preferably 1 to 8 carbon atoms in length.

The terms "cycloalkyl" and "cyclic alkyl" are used herein at all occurrences to mean cyclic radicals, preferably comprising 3 to 10 carbon atoms which may be mono- or bicyclo-fused ring systems which may additionally include unsaturation, including, but not limited to, cyclopropyl, cyclopentyl, cyclohexyl, 1,2,3,4-tetrahydronaphthyl, and the like.

The terms "aryl" or "heteroaryl" are used herein at all occurrences to mean 5–14 membered optionally substituted aromatic ring(s) or ring systems which may include bi- or tri-cyclic systems and one or more heteroatoms, wherein the heteroatoms are selected from oxygen, nitrogen or sulfur. Representative examples include, but are not limited to, phenyl, naphthyl, pyridyl, quinolinyl, thiazinyl, isoquinoline, imidazole, 3,4-dimethoxyphenyl, 3,4-methylenedioxyphenyl, 3,4-dimethoxybenzyl, 3,4-methylenedioxy-benzyl, benzhydryl, 1-naphthylmethyl, 2-naphthylmethyl fluorenyl, biphenyl-4-methyl, furanyl, and the like.

The term "heteroatom" is used herein at all occurrences to mean an oxygen atom ("O"), a sulfur atom ("S") or a nitrogen atom ("N"). It will be recognized that when the heteroatom is nitrogen, it may form an $NR^1R^2$ moiety, wherein $R^1$ and $R^2$ are, independently from one another, hydrogen or $C_1$ to $C_8$ alkyl, or together with the nitrogen to which they are bound, form a saturated or unsaturated 5-, 6-, or 7-membered ring.

The terms "arylalkyl" and "heteroarylalkyl" are used herein at all occurrences to mean an aryl or heteroaryl moiety, respectively, that is connected to a $C_{1-8}$ alkyl moiety as defined above, such as, but not limited to, benzyl.

The term "5- 6-, or 7-membered ring" is used herein at all occurrences to mean that substituents $R^1$ and $R^2$, together with the nitrogen to which they are bound, form a saturated or unsaturated ring structure containing at least one additional heteroatom selected from oxygen, nitrogen or sulfur, including, but not limited to morpholine, piperazine, piperidine, pyrolidine, pyridine, and the like.

The term "heterocyclic" is used herein at all occurrences to mean a saturated or wholly or partially unsaturated 4–10 membered ring system in which one or more rings contain one or more heteroatoms selected from the group consisting of O, N, or S; including, but not limited to, pyrrolidine, piperidine, piperazine, morpholine, imidazolidine, pyrazolidine, benzodiazepines, and the like.

The term "halogen" is used herein at all occurrences to mean chloro, fluoro, iodo and bromo.

The term "Ph" is used herein at all occurrences to mean phenyl.

The term "optionally substituted" is used herein at all occurrences to mean that the optionally substituted moieties may or may not be substituted with one to three various functional groups including, alkyl, alkenyl, alkynyl, aryl, cycloalkyl, heteroaryl, heterocyclo groups arylalkyl, heteroarylalkyl, halogen, cyano, $—(CR^{11}R^{12})_n—C(O)R'$; $—(CR^{11}R^{12})_n—NO_2$; $—(CR^{11}R^{12})_n—OR'$; $(CR^{11}R^{12})_n—SR'$; $—(CR^{11}R^{12})_n—N(R')_2$; $—(CR^{11}R^{12})_n—NHC(O)R'$; $—(CR^{11}R^{12})_n—CO_2R'$; $—(CR^{11}R^{12})_n—CON(R')_2$; $—(CR^{11}R^{12})_a(C\!=\!C)_b(CR^{11}R^{12})_cZ'$ or $(CR^{11}R^{12})_a(C\!=\!C)_bW'(CR^{11}R^{12})_cZ'$; wherein Z' is $C(O)R'$, $CO_2R'$, $NO_2$; OR'; SR'; $N(R')_2$, $NHC(O)R'$; or $CON(R')_2$; a is 0 or 1, b is 0 to 10 and c is 0 to 10, preferably a=b=c is less than 10, W' is N or S; R' is hydrogen, $(C_1\text{–}C_4)$ alkyl, aryl, arylalkyl, or heteroaryl; and $R^{11}$ and $R^{12}$ are independently hydrogen or a branched or straight chain $C_1$ to $C_6$ alkyl, alkenyl or alkynyl; and, for purposes herein, n is 0 or is an integer from 1 to 10. It is recognized that these substituents may be further substituted by groups similar to those indicated above herein to give substituents such as halo-substituted alkyl (e.g., $—CF_3$), aryl-substituted alkyl, alkoxy-substituted alkyl and the like. For example, in the term $(CR^{11}R^{12})_n—N(R')_2$, n is 1, $R^{11}$ is $—CH_2CH\!=\!CH_2$, $R^{12}$ is hydrogen, one of R' is hydrogen and one of R' is benzyl; in the term $—(CR^{11}R^{12})_nSR'$, n is 1, R' is phenyl, $R^{12}$ is hydrogen, $R^{11}$ is a substituted alkyl, specifically a methyl substituted by $—COOR'$ and R' is hydrogen, methyl or ethyl; in the term alkenyl, the alkenyl moiety may be substituted by $—(CR^{11}R^{12})_n—C(O)R'$ or $—(CR^{11}R^{12})_n—CO_2R'$, wherein R' is hydrogen, methyl or ethyl; in the term $(CR^{11}R^{12})_a(C\!=\!C)_b(CR^{11}R^{12})_cZ'$, a is 1, b is 1, c is 0, Z' is NR', $R^{11}$ and $R^{12}$ are H and R' is benzyl; in the term $(CR^{11}R^{12})_a(C\!=\!C)_bW'(CR^{11}R^{12})_cZ'$, W' is N and a is 1, b is 1, c is 0, Z' is NR', $R^{11}$ and $R^{12}$ are H and R' is benzyl.

Preferred optional substituents for use herein include alkyl, alkenyl, alkoxy, cyano, $NO_2$, halogen, preferably bromine, $—(CR^{11}R^{12})_nC(O)R'$, $—(CR^{11}R^{12})_n—SR'$, $—(CR^{11}R^{12})_n—N(R')_2$ and aryl, preferably phenyl. More preferably, the optional substituents are $C_1$ to $C_{10}$ alkyl, $C_1$ to $C_{10}$ alkoxy, cyano, C(O)R', $NO_2$, halogen, and aryl.

The term "polypeptide" is used herein at all occurrences to mean a polymer of amino acids (i.e., acid units chemically bound together with amide linkages (CONH)), forming a chain that consists of 1 to 20 amino acid residues.

Certain non-peptide compounds bind to a variety of receptors, particularly, G-protein coupled receptors. Suitably, the following core structures may be used as templates for designing libraries of non-peptide compounds which may be tested for binding to a variety of receptors, specifically, G-protein coupled receptors.

Benzodiazepines of formula (I):

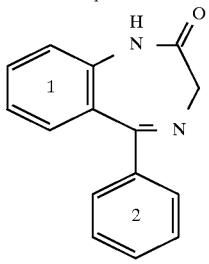

Formula (I)

N-phenylimidazoles of formula (II):

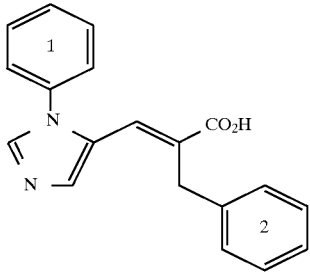

Formula (II)

Oxindoles of formula (III):

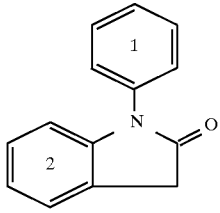

Formula (III)

Indole carboxylic amines or acids of formula (IV):

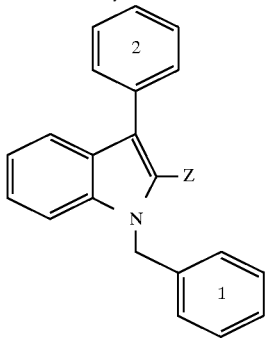

Formula (IV)

Aminobenzazepines of formula (V):

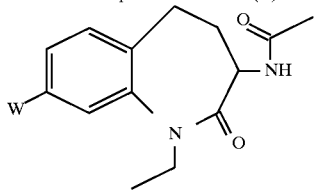

Formula (V)

Surprisingly, it has been discovered that compounds which comprise any one of these core structures, when tested in assays developed for determining lead compounds as pharmaceutical agents, demonstrate activity more often than would be expected by the skilled artisan. These core structures may be used as templates for developing synthetic libraries by the combinatorial methods described herein. The libraries of compounds can then be screened in assays developed for determining lead compounds as pharmaceutical agents. If the core structures are used as templates for making the libraries of compounds, the number of individual compounds which are likely to be active in a particular assay will be higher than the skilled artisan would expect when using standard methods of synthesizing individual compounds randomly for screening as pharmaceutical agents. Also, by making and screening the libraries of compounds based upon core structures, the probability of identifying a chemical lead for use as a pharmaceutical agent is enhanced.

Combinatorial Synthesis Methods

Based upon the disclosure herein, it will be clear to one of ordinary skill in the art that there are many possible synthetic approaches to creating the libraries of this invention. The libraries can be prepared on a solid support, e.g., a resin, or they can be prepared in solution. For example, the variable substituents can be added by reacting core structure, labeled R, with a mixture of reagents designed to introduce substituents $X_{1-m}$ collectively or by reacting aliquots of R with individual reagents each one of which will introduce a single substituent $R_i$ and then mixing the resultant products together (wherein i, j and k are used herein to represent any of the substituents on the compound members of the combinatorial library).

For reasons of efficiency, the components of the library are screened in groups of multiple compounds. Therefore, once the library of compounds has been synthesized, there must be some method to deconvolute the results of screening such that individual active compounds can be identified. Based upon the disclosure herein, it will be clear to the skilled artisan that there are many methods for deconvolution of the combinatorial library. For example, if the compounds of the library are screened on a solid support, they may be physically segregated so that individual active compounds may be directly selected and identified. In contrast, if the compounds of the library are tested as soluble mixtures, the library may be deconvoluted in an iterative approach, which involves resynthesis of mixtures of decreasing complexity until a single compound is identified, or in a scanning approach, in which the various substituents on the core structure R, are evaluated independently and the structure of active compounds are determined deductively. Both the iterative and scanning approaches to deconvolution of the combinatorial libraries of this invention are described in more detail below.

Iterative Approach

In its simplest form, the iterative approach to deconvoluting the combinatorial library involves separation of the combinatorial library of compounds immediately prior to the introduction of the last variable substituent. Using the same nomenclature, i.e., R is the core structure, etc., as used above, the mixture of compounds $RX_{1-m}Y_{1-n}$ is partitioned into p aliquots (wherein m, n and p are integers which define the size of the library, and which range between 1 to 1000; preferably between 1 to 100, most preferably between 1 to 20). Each of those aliquots is reacted with reagents designed to introduce a single substituent, labeled Z. Thus, p different pools $RX_{1-m}Y_{1-n}Z_i$, each of which contains m×n compounds with all possible variations of X and Y being represented but only one particular Z, will be obtained. Screening this library in a binding or functional assay defines the appropriate Z substituent(s) for the desired activity.

Once the appropriate Z substituent, labeled $Z_a$, is determined (for illustrative purposes, only one active compound exists, however, it would be clear to the skilled artisan that more than one active compound may exist in the library), the library is prepared again, this time splitting the mixture of compounds $RX_{1-m}$ into n aliquots for introduction of the n different Y substituents (as used herein "a", "b" and "c" refer to specific acceptable substituents which have been determined to be active by screening in a binding or functional assay). After the Y substituents are introduced, the $Z_a$ substituent is introduced into each of the still separated aliquots. The library now consists of n pools $RX_{1-m}Y_jZ_a$, each of which contains m different compounds with all the possible X substituents represented, and one particular Y substituent. Screening this library in a binding or functional assay defines the appropriate Y substituent, labeled $Y_b$.

In a similar manner, the appropriate X substituent, labeled $X_c$ is determined by beginning with m different aliquots of core structure R and sequentially introducing $X_k$, $Y_b$ and $Z_a$ to give m different pools $RX_kY_bZ_a$, each of which contains a single compound. Thus only m+n+p syntheses are required to deconvolute a library containing m×n×p compounds.

The iterative approach is specific for a single target which is determined after the first round of screening, since subsequent library preparations do not contain the full complement of substituents.

Scanning Approach

The application of the scanning approach to deconvoluting the combinatorial library requires that the variable substituents X, Y and Z can be introduced synthetically independently of each other. The library is first prepared as $RX_{1-m}Y_{1-n}Z_i$ exactly as in the iterative approach to give p pools $RX_{1-m}Y_{1-n}Z_i$, each of which contains m×n compounds with all possible variation of X and Y represented but only one particular Z. Screening this library defines the appropriate Z substituents for the desired activity.

Since Y can be introduced independently from X and Z, the library is then prepared as $RX_{1-m}Y_jZ_{1-p}$, giving n pools of compounds each containing m×p compounds in which all substituents X and Z are represented with a particular Y substituent. Screening this library in a binding or functional assay defines the appropriate Y substituents for the desired activity.

Since X can also be introduced independently from Y and Z, the library is then prepared as $RX_kY_{1-n}Z_{1-p}$, giving m batches or pools of compounds, each of which contains n×p compounds in which all substituents Y and Z are represented with a particular X substituent. Screening this library in a binding or functional assay defines the appropriate X substituents for the desired activity.

In the simplest case, a single X, Y and Z substituent are identified from the three libraries, thus converging on a single compound $RX_cY_bZ_a$. The advantage of utilizing the scanning approach is that each library contains all the possible permutations of X, Y and Z and can be utilized to screen against a number of different biological targets.

The Use of Silicon Chemistry in Preparing Combinatorial Libraries

The use of the instant silicon-based resins has been discovered to be particularly effective in preparing, by resin-bound synthesis, core structure(s) which are substituted aromatic carbocycle(s), wherein said aromatic carbocycle(s) comprises an aromatic carbon which carbon has a hydrogen, halogen, hydroxy or acyloxy group bound to it after the resin-bound synthesis is completed. The aromatic carbocycle prepared by resin-bound synthesis utilizing silicon chemistry may be useful as receptor ligands, particularly G-protein coupled receptor ligands, enzyme inhibitors and channel blockers.

In contrast to the resins and linkers known in the art, the instant polymeric resins and silane linkers are particularly useful in effectuating the cleavage of an aromatic carbocycle from a polymeric resin support while leaving a hydrogen at the cleavage position. In addition, the silicon linkers, polymeric resin supports and intermediates of this invention effectuate the successful preparation of a single aromatic carbocycle or a plurality of molecularly diverse aromatic carbocycles which, upon cleavage from a polymeric resin support, have a halogen, hydroxy or acyloxy group at the cleavage position. The aromatic carbocycles prepared by the methods described herein can be screened in assays developed for determining lead compound as pharmaceutical agents.

In one aspect, the invention is in a method for preparing a compound by resin-bound synthesis, wherein said compound is an aromatic carbocycle comprising an aromatic carbon atom and at least one substituent that is not hydrogen or alkyl, said method comprising the steps of: (i) attaching the aromatic carbon to a polymeric resin support through a silane linker to give a resin-bound aryl silane intermediate; and (ii) performing additional synthetic chemistry on the substituent so that the aromatic carbocycle is derivatized. The derivatized resin-bound aryl silane intermediate may be stored for further derivitization of the substituents. Suitably, the aromatic carbocycle is biphenyl, phenyl, naphthyl or anthracenyl. Suitably, the aromatic carbocycle has at least one substituent that is X, A, B or C, as defined above, to be derivatized by additional synthetic chemistry. A compound prepared by this method remains as a resin-bound aryl silane intermediate, which resin-bound intermediate may be screened in a suitable assay developed for determining pharmaceutical activity.

The derivatized aromatic carbocycle may be decoupled from the resin-bound aryl silane intermediate by a further step comprising cleaving the resin-bound aryl silane intermediate at the aryl silane bond so that the decoupled aromatic carbocycle resulting from the cleavage has a hydrogen, halogen, hydroxy or acyloxy group on the aromatic carbon where it was bound through the silane linker. After this step, the decoupled aromatic carbocycle may be screened in a suitable assay developed for determining pharmaceutical activity.

As described above, the additional synthetic chemistry performed in order to modify the substituents X, A, B or C must be such that the aromatic carbocycle is derivatized without cleaving the aryl silane bond of the resin-bound aryl silane intermediate.

According to this invention, the aromatic carbocycle is bound to a polymeric resin support through a silane linker to give a resin-bound aryl silane intermediate. In particular, the aromatic carbocycle is bound to the resin through a silane linker group comprising the following moiety: D-CH$_2$—Si—R"R'", wherein D is defined as a $C_1$ to $C_{20}$ alkyl chain optionally having one or more intervening heteroatoms and/or optionally substituted aryl groups, and R" and R'" are independently, $C_1$ to $C_6$ alkyl. Preferred silane linker groups of formula D-CH$_2$—Si—R"R'" for use in the methods disclosed herein include, but are not limited to, the following linker groups: —O—CH$_2$—Ph—O—CH$_2$—Si—R"R'", wherein D is —O—CH$_2$—Ph—O—; —O—Ph—O—CH$_2$—SiR"R'", wherein D is —O—Ph—O—; or —O—Ph—CH$_2$—CH$_2$—Si—R"R'", wherein D is —O—Ph—CH$_2$—O—. A preferred silane linker group for preparing aromatic carbocycles wherein a substituent X, A, B, or C is cyano, is a linker group of formula D-CH$_2$—Si—R"R'", wherein D is —O—Ph—O—. For purposes herein, the aromatic carbon atom of the aromatic carbocycle is bound directly to a silicon atom of the silane linker. Preferably, R" and R'" are independently, $C_1$ to $C_4$ alkyl, more preferably, R" and R'" are both methyl or ethyl, more preferably R" and R'" are both methyl.

Useful intermediates of the invention are the novel aryl silane compounds of Formula (IB). The compounds of Formula (IB) are reacted with an appropriate polymer resin in order to make a resin-bound aryl silane intermediate which will be further modified by performing additional synthetic chemistry thereon. Preferably, an aryl silane compound is formed as a first intermediate, which intermediate is then coupled to a polymeric resin support. A suitable resin-bound aryl silane intermediate is prepared by combining an aryl silane compound of Formula (IB):

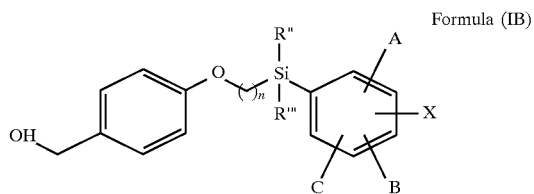

Formula (IB)

wherein R" and R'", independently from one another, are $C_1$ to $C_6$ alkyl; X, A, B and C are, independently from one another, hydrogen, halogen, alkyl, alkenyl, alkynyl, alkoxy, alkylthio, $C(O)R^a$, wherein $R^a$ is hydrogen or alkyl, t-butoxyaminocarbonyl, cyano, nitro, aryl, heteroaryl, arylalkyl, alkyl disulfide, aryl disulfide, acetal, fluorenylmethoxycarbonyl or orthoester group, provided that X, A, B and C can not all be hydrogen and X, A, B and C can not all be alkyl; and n is an integer from 1 to 10, with an appropriate polymeric resin, using conventional techniques.

A preferred embodiment of this inventive intermediate is a compound of Formula (IB) wherein R" and R'", independently from one another, are $C_1$ to $C_4$ alkyl; X is bromine or iodine; A, B and C are hydrogen; and n is 1 to 4. A more preferred embodiment of this invention is wherein R" and R'" are each methyl; X is bromine; A, B and C are hydrogen; and n is 1.

The compound of Formula (IB) may then be reacted with a suitable polymeric resin support to form a resin-bound aryl silane intermediate. Suitable resins for use herein are a cross-linked polystyrene resin, a polyethylene glycol-polystyrene based resin, or a polypropylene glycol based resin. A preferred resin for reaction with a compound of Formula (IB) is a chloromethyl cross-linked divinylbenzene polystyrene resin. Suitable additional synthetic chemistry may be performed on this resin-bound aryl silane intermediate, particularly on the substituents X, A, B or C, as described above, in order to modify the substituents X, A, B or C.

In all cases, after the aromatic carbocycle portion of the resin-bound aryl silane intermediate is modified by the additional synthetic chemistry, the derivatized aromatic carbocycle may be cleaved from the resin-bound aryl silane intermediate at the aryl silane bond or it may remain as a resin-bound aryl silane intermediate.

The intermediate compounds of Formula (IB) may be prepared by utilizing another useful intermediate of this invention, i.e., a compound of Formula (IIB):

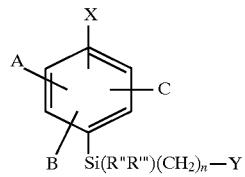

Formula (IIB)

wherein R" and R'", independently from one another, are $C_1$ to $C_6$ alkyl; X, A, B and C are, independently from one another, hydrogen, halogen, alkyl, alkenyl, alkynyl, alkoxy, alkylthio, $C(O)R^a$, wherein $R^a$ is hydrogen or alkyl, t-butoxyaminocarbonyl, cyano, nitro, aryl, heteroaryl, arylalkyl, alkyl disulfide, aryl disulfide, acetal, fluorenylmethoxycarbonyl or an orthoester group, provided that X, A, B and C can not all be hydrogen and X, A, B and C can not all be alkyl; Y is halogen or hydroxyl; and n is an integer from 1 to 10. A preferred embodiment of this aspect of the invention is a compound of Formula (IIB) wherein R" and R'", independently from one another, are $C_1$ to $C_4$ alkyl; X is halogen; A, B and C are hydrogen; Y is bromine; and n is 1 to 4. A more preferred embodiment of this aspect of the invention is a compound of Formula (IIB) wherein R" and R'" are each methyl; X is bromine; A, B and C are hydrogen; Y is bromine; and n is 1. As would be obvious to one of ordinary skill in the art, the novel intermediates of Formula (IIB) may easily be prepared from compound 1-Scheme 1, or appropriate analogs thereof, by reaction with an alkyl lithium compound. In the alternative, a compound of Formula (IIB) may be prepared by forming a Grignard reagent of compound 1-Scheme 1, or appropriate analogs thereof. An illustrative method for preparing an intermediate of Formula (IIB) is disclosed by Morikawa et al., *Polym. J.*, 24, p. 573 (1992), the relevant parts of which are incorporated herein by reference. In addition, as would be appreciated by the skilled artisan, aside from being compatible with the additional synthetic chemistry to be performed on the resin-bound aryl silane intermediate, substituents X, A, B and C must also be compatible with the alkyl lithium chemistry utilized to make the intermediates of Formulae (IB) and (IIB).

In order to cleave the aryl silane bond of the resin-bound aryl silane intermediate, so that a hydrogen is bound to the aromatic carbon at the cleavage site, a number of suitable conditions may be used, for example, treatment of the resin-bound aryl silane intermediate with a strong protic acid. In particular, the acidic cleavage conditions, include, but are not limited to, treatment with 100% trifluoroacetic acid ("TFA"), hydrofluoric acid ("HF"), hydrochloric acid ("HCl"), pyridinium hydrofluoride, sulfuric acid ("$H_2SO_4$"), trifluoromethanesulfonic acid (commonly referred to as triflic acid), boron trifluoride ("$BF_3$"), methanesulfonic acid or mixtures thereof. Preferred cleavage conditions utilize 100% TFA. Alternatively, cleavage of the aryl silane bond may be accomplished using base catalyzed cleavage. In particular, base catalyzed cleavage conditions include, but are not limited to, cleavage with NaOH in DMSO (dimethylsulfoxide) or methanol. See, for example, Cretney et al., *J. Organometal. Chem.*, 28, pp. 49–52 (1971).

In order to cleave the aryl silane bond of the resin-bound aryl silane intermediate so that a halogen is bound to the aromatic carbon at the cleavage site, a number of suitable conditions may be used, for example, treatment of the resin-bound aryl silane intermediate with bromine, chlorine or iodine.

In order to cleave the aryl silane bond so that a hydroxy group is bound to the aromatic carbon at the cleavage site, a number of suitable conditions may be used, for example, treatment of the resin-bound aryl silane intermediate with benzoyl peroxide to give a benzoate ester at the cleavage site. The resulting aromatic carbocycle which is substituted with an ester functionality may be subsequently hydrolyzed using known conditions to yield an aromatic carbocycle which is substituted with a hydroxy group.

In order to cleave the aryl silane bond so that an acyloxy group is bound to the aromatic carbon at the cleavage site, a number of suitable conditions may be used, for example, treatment of the resin-bound aryl silane intermediate with acetyl peroxide or any suitable acyl peroxide using conventional conditions known to the skilled artisan.

In yet another aspect, this invention is in a method for preparing a library of diverse resin-bound aromatic carbocycles each comprising an aromatic carbon atom and at least one substituent that is not hydrogen or alkyl, said method comprising the steps of: (i) attaching the aromatic carbon atom of each of a plurality of aromatic carbocycles to an individual polymeric resin support through a silane linker to give a plurality of resin-bound aryl silane intermediates; (ii) optionally dividing said resin-bound aryl silane intermediates into a plurality of portions; (iii) performing additional synthetic chemistry on the substituents so that the aromatic carbocycle is derivatized; and (iv) optionally recombining the portions. Suitably, the substituents on the aromatic carbocycle which are to be derivatized are X, A, B or C as defined above.

Based upon the disclosure herein, it will be clear to one of ordinary skill in the art that there are many possible synthetic approaches to preparing the libraries of this invention. The libraries are considered to be combinatorial libraries because the compounds generated from the synthetic methods are molecularly diverse and are prepared simultaneously. The libraries may be prepared on polymeric resin supports using the silane linkers described herein above.

For example, a plurality of aromatic carbocycles each comprising an aromatic carbon atom and having at least one substituent X, A, B or C that is not hydrogen or alkyl, are each attached to an individual polymer resin support through a silane linker to give a plurality of resin-bound aryl silane intermediates. In a first step modification to the substituent (s) on the aromatic carbocycle, the plurality of resin-bound aryl silane intermediates may be reacted with one or more reagents in one reaction vessel. Alternatively in a first step modification, aliquots of the resin-bound aryl silane intermediates may be reacted with one or more reagents and then the resultant products are mixed together to form a library of derivatized aromatic carbocycles. Preferably, the reagent(s) used in this first step modification will modify only a single substituent X, A, B or C.

This first modified/derivatized library may then be further derivatized by repeating the process of dividing and recombining the derivatized resin-bound aryl silane intermediates formed by the additional synthetic chemistry. It will be obvious to the skilled artisan that the resin-bound aryl silane intermediates may be divided into portions at any point during the synthetic scheme. The portions may be recombined at any point during the scheme or, further iterations may be applied if more derivatization is required. For example, after a first step modification where the aliquots were divided and reacted with one or more appropriate reagents, the derivatized aliquots may be recombined and reacted with one or more additional reagents in one reaction vessel. Alternatively, each aliquot may be subdivided into further aliquots and reacted as described herein.

Therefore, it will be obvious to the skilled artisan that the steps of dividing the portions, performing additional synthetic chemistry and recombining the portions, may each be carried out more than once. The steps of optionally dividing and recombining the resin-bound aryl silane intermediates into portions are for purposes of varying the derivatization, depending upon the type of diversity required for the library of end-product aromatic carbocycles being prepared by the combinatorial synthesis. Suitably, when the libraries of the invention are prepared according to the instant disclosure, each polymeric resin support bears a single (derivatized) aromatic carbocycle species created by the additional synthetic chemistry performed on the resin-bound aryl silane intermediate.

For example, in Scheme 6, if the desired library is one that comprises an N-methylated compound of formula 8 and an N-ethylated compound of formula 8, the following variation on the split-synthesis method of Moss et al., *Ann. Rep. Med. Chem.*, 28, p. 315 (1993), for preparing libraries of compounds may be used. The steps depicted in Scheme 6 are followed, without dividing the resin-bound aryl silane intermediates of formulae 1 through 5 into portions. However, prior to N-alkylation of the resin-bound aryl silane intermediate of formula 6, said resin-bound formula 6 is divided into a number of portions, for example, two portions, labeled for purposes of illustration as portion 1 and portion 2. Each of the two portions contains resin-bound aryl silane intermediate 6-Scheme 6. Portion 1 is reacted under standard conditions with, e.g., methyl iodide, in order to obtain a compound 7-Scheme 6, wherein $R^4$ is methyl. Portion 2 is reacted under standard conditions, with, e g., ethyl bromide, in order to obtain compound 7-Scheme 6, wherein $R^4$ is ethyl. The two separate portions are recombined to form a library of two compounds, wherein each polymer resin is linked through a silane linker group, to a distinct aromatic carbocycle which is the product of a specific reaction sequence.

The methods and linkers described herein may be applied to the preparation of a large variety of core structures, including aromatic carbocycles. However, when utilizing the silicon-based linkers and resin-bound aryl silane intermediates disclosed herein, the silicon linker group (which comprises D-CH$_2$—Si—R"R'") is suitably bound to an aromatic carbon on the aromatic portion of the core structure, such as in a benzodiazepine derivative or in a tetrahydronaphthyl derivative.

According to this invention, after the additional synthetic chemistry has been performed on the resin-bound aryl silane intermediate so that a library of molecularly diverse compounds has been prepared, the compounds can be separated and characterized by conventional analytical techniques known to the skilled artisan, for example infrared spectrometry or mass spectrometry. The compounds may be characterized while remaining resin-bound or they can be cleaved from the resin-bound aryl silane intermediates using the conditions described above, and then analyzed.

In addition, some of the compound members of the library may be cleaved from the resin-bound aryl silane intermediates while other members of the library remain resin bound to give a "partially cleaved" library of compounds. Alternatively if all of the members of the library of compounds are cleaved from the resin-bound aryl silane intermediates, a "fully cleaved" library of compounds is created.

General Methods of Preparation

For all of the following Schemes, standard work-up and purification methods can be used and will be obvious to the skilled artisan. In addition, it will be recognized that the aromatic carbocycles coupled to the polymer resins through the silane linkers illustrated below, can be optionally substituted at any appropriate site, depending upon the type of derivatization required. In particular, when the aromatic carbocycle is a biphenyl, the substituents X, A, B or C may be, independently, on one or both rings. This is similarly so for other aromatic carbocyclic rings or ring systems, as defined above.

As used herein, the following terms have the following meanings: "DMF" is dimethylformamide; "DMSO" is dimethylsulfoxide; "LRMS" is low resolution mass spectrometry; "DIEA" is diisopropylethylamine; "THF" is tetrahydrofuran, "n-BuLi" is n-butyllithium, "min" is minutes; "h" or "hr" is hours; "mL" is milliliters; "RT" or "rt" is room temperature; "BnBr" is benzylbromide; and "OAc" is acetate.

Scheme 1

The resin-bound aryl silane intermediate 4-Scheme 1, wherein X is bromine and A, B and C are each hydrogen, is prepared by reacting Merrifield chloromethyl resin (available from Nova Biochem, 1.4 mM/g of Cl) with the aryl silane intermediate alcohol 3-Scheme 1, wherein X is bromine and A, B and C are each hydrogen, in an $S_N2$ displacement as described in Scheme 1.

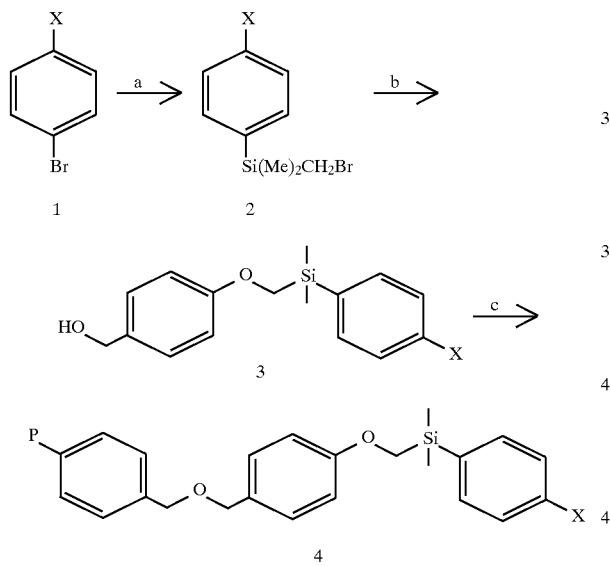

a n-Buli, THF, −78° C., BrCH$_2$Si(Me)$_2$Cl [bromomethyl chlorodimethyl silane, available from Aldrich];
b NaOMe, DMF, p-hydroxybenzyl alcohol;
c NaH, THF, 70° C., Merrifield resin.

Compounds analogous to intermediate compound 2-Scheme 1 (i.e., a compound of Formula (IIB) wherein R'" and R'" are methyl; X is bromine; A, B and C are hydrogen; Y is bromine; and n is 1) may be prepared from an optionally substituted aromatic carbocycle such as 1-Scheme 1 having a substituent(s) which can be converted by conventional techniques, such as formation of an alkyl ($C_1$–$C_8$) lithium species, into a haloalkyl dialkylsilyl substituent. 2-Scheme 1 (or the appropriate analogs) is reacted with a base, (such as sodium methoxide or potassium carbonate) in an aprotic solvent (dimethyl formamide, dimethyl acetamide or DMSO if sodium methoxide is the base; acetone or ethyl methyl ketone if potassium carbonate is the base) to displace the halogen on the silane moiety for coupling with optionally substituted hydroxybenzyl alcohol to prepare an aryl silane compound 3-Scheme 1 (i.e., a compound of Formula (IB) wherein R" and R'" are methyl; X is bromine; A, B and C are hydrogen; and n is 1). An $S_N2$ displacement of 3-Scheme 1 with a polymer resin is accomplished using strong basic conditions (such as NaH) in an aprotic solvent (such as THF, DMSO, DMF or dimethyl acetamide) providing 4-Scheme 1. As will be clear to the skilled artisan, this reaction sequence can be performed on compound 1-Scheme 1, wherein X, A, B and C are, independently from one another, hydrogen, halogen, alkyl, alkenyl, alkynyl, alkoxy, aryloxy, thioether, alkylthio, C(O)R$^a$, wherein R$^a$ is hydrogen or alkyl, t-butoxyaminocarbonyl, cyano, nitro (—NO$_2$), aryl, heteroaryl, arylalkyl, alkyl disulfide, aryl disulfide, acetal, fluorenylmethoxycarbonyl or orthoester (—C(OR)$_3$, wherein R is $C_1$ to $C_4$ alkyl), provided that X, A, B and C can not all be hydrogen and X, A, B and C can not all be alkyl.

Scheme 2

The synthesis of an isomeric resin-bound aryl silane intermediate of 2-Scheme 2, wherein X is bromine and A, B and C are hydrogen, is depicted starting from the Wang resin 1-Scheme 2. In addition, Scheme 2 depicts the preparation of an aromatic carbocycle (4-Scheme 2, wherein X is bromine) from a resin-bound aryl silane intermediate (2-Scheme 2, wherein X is bromine), wherein the aromatic carbocycle has a hydrogen atom at the site of cleavage from the resin.

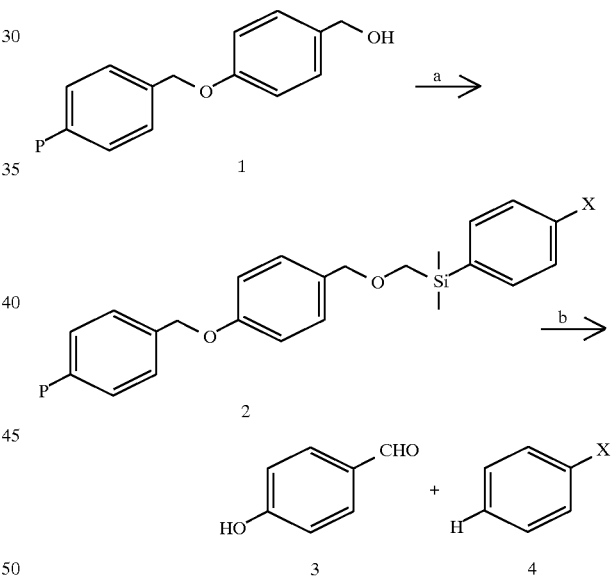

a 2-Scheme 1, NaH, THF, n-Bu$_4$NI$^-$, 70° C., 4 days;
b TFA, Neat

The Wang resin 1-Scheme 2 is prepared according to the published procedure of Su-Sun Wang, JACS, 95, p. 1328 (1973) starting from the Merrifield resin. Elemental analysis of 2-Scheme 2, wherein X is bromine and A, B and C are hydrogen, indicated a conversion of approximately 70%. Preparation of a substituted aromatic carbocycle wherein a hydrogen is left at the site of cleavage from the resin is accomplished according to Scheme 2 by treating the resin-bound aryl silane intermediate 2-Scheme 2 with strong acidic conditions (such as TFA, HCl, H$_2$SO$_4$, trifluoromethanesulfonic acid BF$_3$, methanesulfonic acid or mixtures thereof) to give a substituted aromatic carbocycle 4-Scheme 2. Again, as will be clear to one of ordinary skill in the art, this reaction sequence can be performed on compound 2-Scheme 2, wherein X, A, B and C are, independently from one another, hydrogen, halogen, alkyl, alkenyl, alkynyl, alkoxy, aryloxy, thioether, alkylthio, C(O)R$^a$, wherein R$^a$ is hydrogen or alkyl, t-butoxyaminocarbonyl, cyano, nitro (—NO$_2$), aryl, heteroaryl, arylalkyl, alkyl disulfide, aryl disulfide, acetal, fluorenylmethoxycarbonyl or orthoester (—C(OR)$_3$, wherein R is C$_1$ to C$_4$ alkyl), provided that X, A, B and C can not all be hydrogen and X, A, B and C can not all be alkyl.

Scheme 3 and Scheme 4

The various chemical reactions outlined in Scheme 3 and Scheme 4 show the use of the silicon based polymer resins of this invention for the synthesis of a variety of substituted aromatic carbocycles. As will be obvious, conventional chemistry known to the skilled artisan may be applied to the resin-bound aryl silane intermediates disclosed herein in order to modify the substituents on the starting aromatic carbocycle.

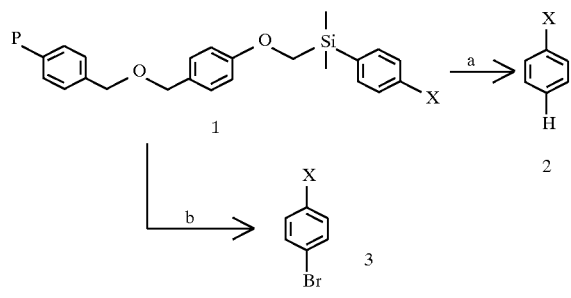

a TFA, Neat;
b Br$_2$, CH$_2$Cl$_2$.

Reaction sequence (a) depicts the preparation of an aromatic carbocycle 2-Scheme 3, wherein X is, hydrogen, halogen, alkyl, alkenyl, alkyl, alkoxy, aryloxy, thioether, alkylthio, C(O)R$^a$, wherein R$^a$ is hydrogen or alkyl, t-butoxyaminocarbonyl, cyano, nitro (—NO$_2$), aryl, heteroaryl, arylalkyl, alkyl disulfide, aryl disulfide, acetal, fluorenylmethoxycarbonyl or orthoester (—C(OR)$_3$, wherein R is C$_1$ to C$_4$ alkyl), preferably halogen, and most preferably bromine, and wherein A, B and C are hydrogen. 2-Scheme 3 wherein there is a hydrogen atom left on the aromatic carbocycle at the cleavage site, is synthesized through an aryl silane intermediate which is bound to a suitable resin (such as the Merrifield resin or the Wang resin), wherein cleavage of 2-Scheme 3 from the resin is accomplished using strong acidic conditions. Preparation of an aromatic carbocycle 3-Scheme 3, wherein there is a halogen atom left on the aromatic carbocycle at the site of cleavage from the silane resin intermediate is accomplished by reacting the resin-bound aryl silane intermediate with an elemental halogen compound (such as Br$_2$, I$_2$ or Cl$_2$) in a suitable aprotic solvent (such as methylene chloride). It will be obvious to one of ordinary skill in the art that these reaction sequences may be applied, wherein X, A, B and C are, independently from one another, hydrogen, halogen, alkyl, alkenyl, alkynyl, alkoxy, aryloxy, thioether, alkylthio, C(O)R$^a$, wherein R$^a$ is hydrogen or alkyl, t-butoxyaminocarbonyl, cyano, nitro (—NO$_2$), aryl, heteroaryl, arylalkyl, alkyl disulfide, aryl disulfide, acetal, fluorenylmethoxycarbonyl or orthoester (—C(OR)$_3$, wherein R is C$_1$ to C$_4$ alkyl), provided that X, A, B and C can not all be hydrogen and X, A, B and C can not all be alkyl.

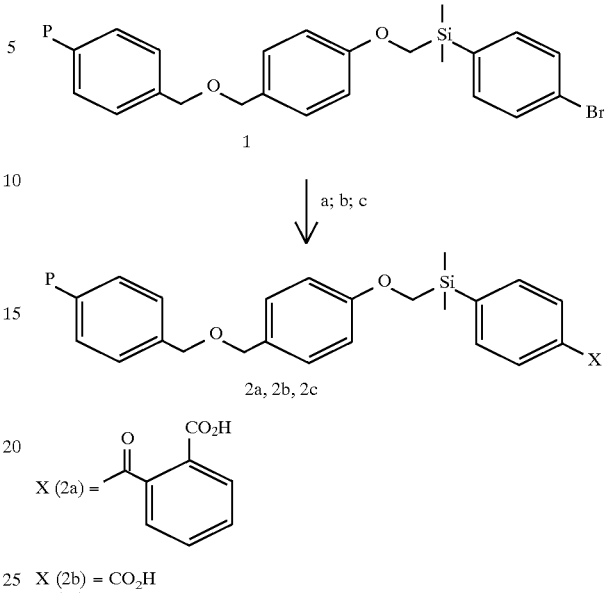

a n-BuLi, THF, Phthalic anhydride (available from Aldrich);
b n-BuLi, THF, CO$_2$;
c n-BuLi, THF, Diethyloxalate (available from Aldrich).

Reaction sequence (a) depicts the preparation of 2a-Scheme 4, wherein the para-bromine moiety on resin-bound aryl silane intermediate 1-Scheme 4 is substituent X which is then modified by additional synthetic chemistry (such as creation of an alkyl lithium species in an aprotic solvent such as THF) to give 2a-Scheme 4, wherein X is defined as shown in Scheme 4. Reaction sequence (b) depicts the preparation of 2b-Scheme 4, wherein the para-bromine moiety on resin-bound aryl silane intermediate 1-Scheme 4 is substituent X which is then modified by additional synthetic chemistry (such as creation of an alkyl lithium species in an aprotic solvent such as THF) to give 2b-Scheme 4, wherein X is a carboxylic acid moiety. Reaction sequence (c) depicts the preparation of 2c-Scheme 4, wherein the para-bromine moiety on resin-bound aryl silane intermediate 1-Scheme 4 is substituent X which is then modified by additional synthetic chemistry (such as creation of an alkyl lithium species in an aprotic solvent such as THF) to give 2b-Scheme 4, wherein X is a ketoester moiety. The moieties A, B and C may be as defined above.

Scheme 5

Scheme 5 illustrates additional synthetic chemistry that was successfully performed in order to prepare an aromatic carbocycle (biphenyl) with a hydrogen left at the cleavage site, according to this invention.

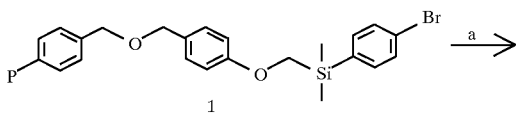

-continued

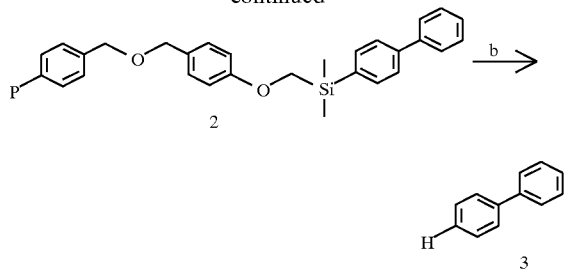

a Phenylboronic acid, (Ph₃P)₄Pd, Toluene, Ethanol, aq Na₂CO₃;
b TFA, Neat.

The resin-bound aryl silane intermediate 1-Scheme 5 (prepared similarly to 4-Scheme 1), wherein X is bromine, and A, B and C are hydrogen, is reacted with phenylboronic acid and (Ph₃P)₄Pd (available from Aldrich) in a mixture of an aprotic and a protic solvent to yield the resin-bound aryl silane intermediate 2-Scheme 5. Subsequent cleavage of resin-bound aryl silane intermediate 2-Scheme 5 under strong acidic conditions produces the aromatic carbocycle biphenyl, 3-Scheme 5. This key reaction is used according to this invention in order to synthesize a variety of biphenyls substituted with various functional groups with conventional chemistry that will be obvious to the skilled artisan. See, for example, Scheme 10 below which illustrates the use of a substituted boronic acid in order to make a substituted biphenyl (3-Scheme 10). A review of boronic chemistry which is compatible with the aryl silane bond, can be found in Suzuki, *Acc. Chem. Res.*, 15, pp. 178–184 (1982). It will be obvious to one of ordinary skill in the art that additional synthetic chemistry may be similarly performed on resin-bound aryl silane indicates wherein X, A, B and C are, independently from one another, hydrogen, halogen, alkyl, alkenyl, alkynyl, alkoxy, aryloxy, thioether, alkylthio, —C(O)R$^a$, wherein R$^a$ is hydrogen or alkyl, t-butoxyaminocarbonyl, cyano, nitro (—NO₂), aryl, heteroaryl, arylalkyl, alkyl disulfide, aryl disulfide, acetal, fluorenylmethoxy-carbonyl or (—C(OR)₃, wherein R is $C_1$ to $C_4$ alkyl), provided that X, A, B and C can not all be hydrogen and X, A, B and C can not all be alkyl, and provided that the chemistry is compatible with modifying the substituents without cleaving the aryl silane bond.

Scheme 6

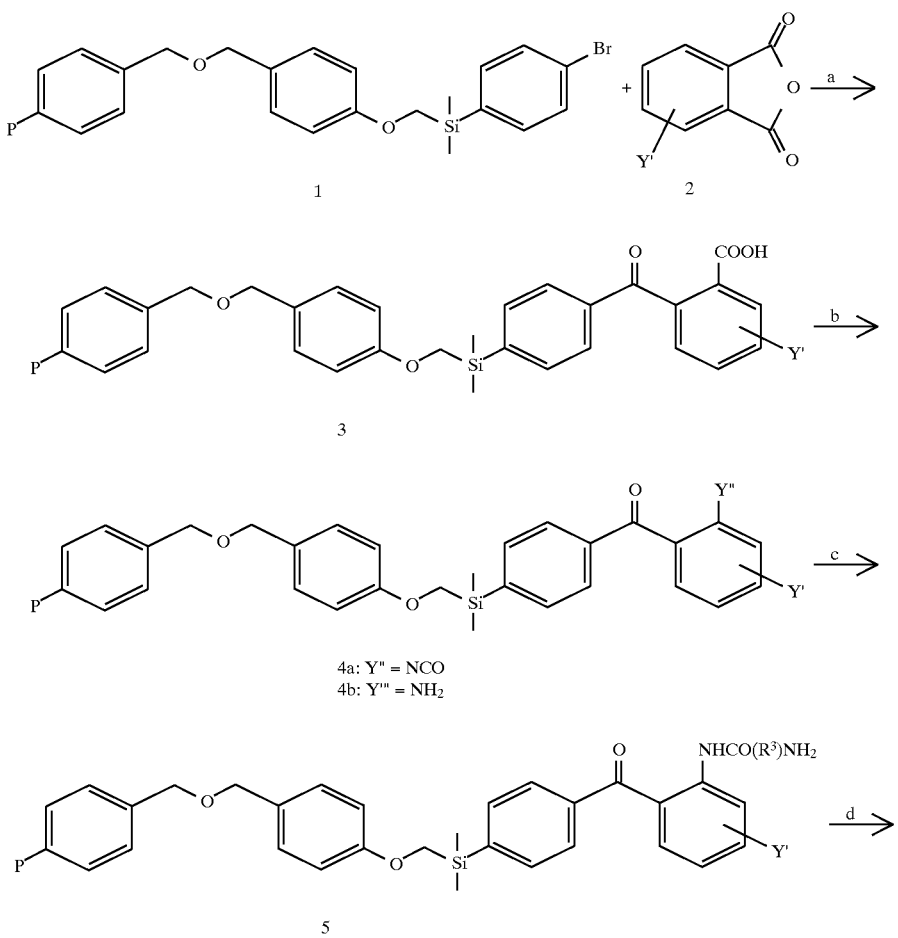

-continued
Scheme 6

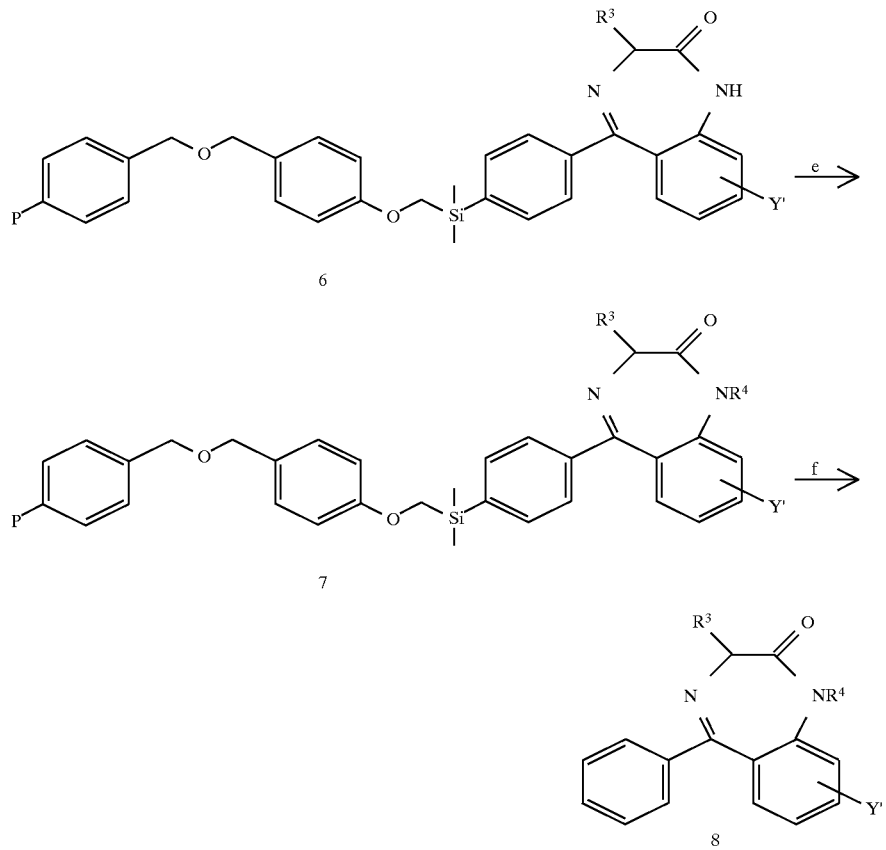

a n-BuLi, THF, optionally substituted phthalic anhydride;
b (i) (PhO)$_2$P(O)N$_3$, Et$_3$N, Toluene; (ii) NaOH, MeOH;
c (i) peptide coupling; (ii) Deprotection with 20% piperidine in DMF;
d DMF, 5% acetic acid;
e 4-benzyl lithium oxazolidinone, THF, R$^4$—Z;
f TFA.

The resin-bound aryl silane intermediate 3-Scheme 6 is prepared using the general procedure outlined above for preparing 2a-Scheme 4, using optionally substituted phthalic anhydride, wherein the optional substituent(s) is Y', and Y' is hydrogen, halogen, alkyl, alkenyl, alkynyl, alkoxy, aryloxy, thioether, alkylthio, C(O)R$^a$, wherein R$^a$ is hydrogen or alkyl, t-butoxyaminocarbonyl, cyano, nitro (—NO$_2$), aryl, heteroaryl, arylalkyl, alkyl disulfide, aryl disulfide, acetal, fluorenylmeth-oxycarbonyl or orthoester (—C(OR)$_3$, wherein R is C$_1$ to C$_4$ alkyl). Additional synthetic chemistry known in the art is performed with eventual preparation of an N-protected amino acid (preferably with an Fmoc protecting group) compound. Peptide coupling is completed using well known published procedures. As used herein, substituent R$^3$ is hydrogen, halogen, alkyl, alkenyl, alkynyl, alkoxy, aryloxy, thioether, alkylthio, C(O)R$^a$, wherein R$^a$ is hydrogen or alkyl, t-butoxyamino-carbonyl, cyano, nitro (—NO$_2$), aryl, heteroaryl arylalkyl, alkyl disulfide, aryl disulfide, acetal, fluorenylmethoxycarbonyl or orthoester (—C(OR)$_3$, wherein R is C$_1$ to C$_4$ alkyl). Deprotection of 4-Scheme 6 is accomplished with conventional techniques (such as 20% piperidine in DMF) to produce 5-Scheme 6. Cyclization of 5-Scheme 6 is accomplished with an organic acid (such as acetic acid) in an aprotic solvent (such as DMF) to produce 6-Scheme 6. Analogs of 6-Scheme 6 may be N-alkylated at the position-1 nitrogen of the benzodiazepine ring (depicted in the scheme as R$^4$), using conventional techniques, for example, reaction with a base (such as 4-benzyl lithium oxazolidinone) in an aprotic solvent and alkylation with an alkyl halide or alkyl tosylate (such as R$^4$-Z, wherein R$^4$ is alkyl; and Z is Br, I or tosylate). Cleavage of the resin-bound aryl silane intermediate 7-Scheme 6 to produce an optionally substituted aromatic carbocycle, i.e., the benzodiazepine 8-Scheme 6, is accomplished by treatment with strong acid.

For purposes of illustration for this scheme, X is Br and A, B and C are hydrogen. However, it will be recognized that further diversity may be placed on the end-product benzodiazepine if the substituents X, A, B and C on the staring material are as defined more broadly, above.

Scheme 6a

Using the alternative synthetic sequence depicted below, 4b-Scheme 6 may be synthesized through a nitrobenzophenone intermediate.

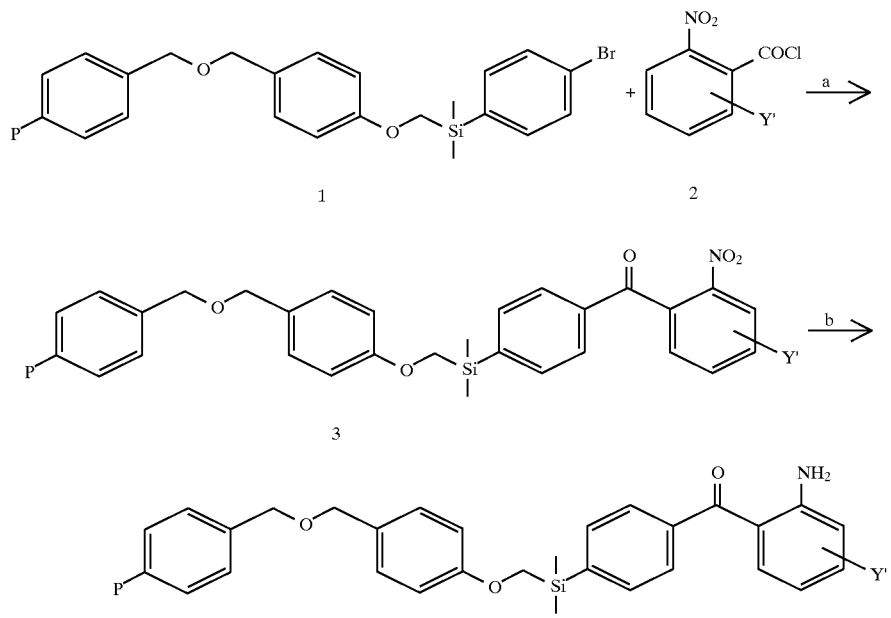

a n-BuLi, THF, 2-nitrobenzoyl chloride;
b NaSH, THF, MeOH/water

Scheme 7

Scheme 7 illustrates a method for preparing 1,3- or 1,4-diaminobenzene compounds, one of the various types of aromatic carbocycles that may be prepared using the silane linkers of this invention:

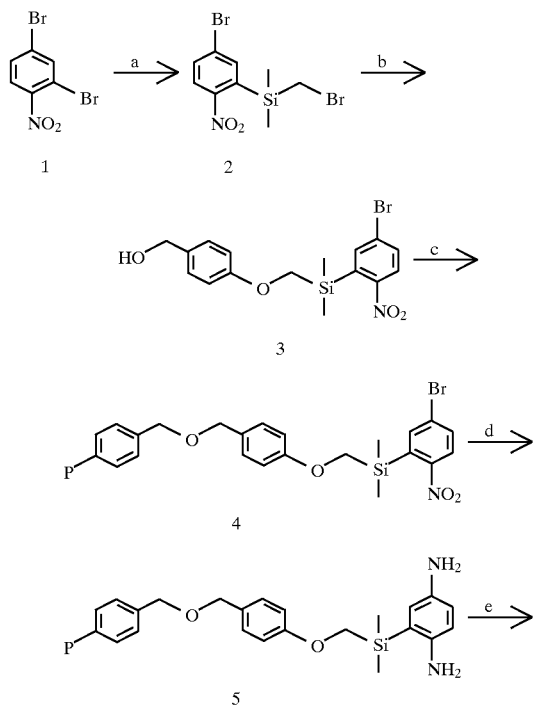

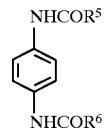

a n-BuLi, THF, −105° C., BrCH$_2$Si(Me)$_2$Cl;
b (i) NaOMe, 4-hydroxybenzyl alcohol, THF;
c NaH, THF, Merrifield chloromethyl resin;
d (i) NH$_3$, MeOH;
e NaSH, THF, Water; (iii) Peptide coupling; (iv) TFA to cleave the aromatic carbocycle while leaving a hydrogen at the cleavage site.

In a manner similar to that described in Scheme 1, a substituted silane intermediate of Formula (IIB), (i.e., 2-Scheme 7), wherein R" and R'" are methyl; the substituents X and A are bromine and nitro, respectively, B and C are hydrogen; Y is bromine; and n is 1, is prepared by forming a lithium species of 2,4-bibromonitrobenzene (Aldrich) and subsequent reaction with a silane compound (such as bromomethyl chlorodimethyl silane available from Aldrich) in an aprotic solvent (such as THF or ether). The aryl silane intermediate of Formula (IIB), wherein R" and R'" are methyl; substituents X and A are bromo and nitro, respectively; B and C are hydrogen; Y is bromo; and n is 1 (2-Scheme 7), is then reacted with a strong base (such as sodium methoxide or potassium carbonate) and an optionally substituted benzyl alcohol in an aprotic solvent (such as THF, dimethyl formamide, dimethyl acetamide or DMSO if sodium methoxide is the base; acetone or ethyl methyl ketone if potassium carbonate is the base) to prepare the aryl silane intermediate of 3-Scheme 7. This intermediate is coupled with a polymer resin (such as Merrifield resin, Wang resin, or any other suitable resin described herein) in an aprotic solvent (such as THF) using a base (such as sodium hydride, sodium methoxide in THF, dimethyl formamide, dimethyl acetamide or DMSO, or potassium carbonate in acetone or ethyl methyl ketone) to produce 4-Scheme 7. Additional synthetic chemistry, such as reduction of a nitro group to an amino group, which will be obvious to one of ordinary skill in the art, is performed in order to modify the substituents X and A. Subsequent additional synthetic chemistry may be performed, such as N-acylation using various carboxylic acid derivatives and amino acids under standard conditions known in the art, to produce N-substituted resin-bound aryl silane intermediates 5-Scheme 6. Cleavage of the resin-bound aryl silane intermediate with strong acid conditions affords 6-Scheme 7, wherein substituents B, C, $R^5$ and $R^6$ are, independently from one another, hydrogen, halogen, alkyl, alkenyl, alkynyl, alkoxy, aryloxy, thioether, alkylthio, $C(O)R^a$, wherein $R^a$ is hydrogen or alkyl, t-butoxyaminocarbonyl, cyano, nitro ($-NO_2$), aryl, heteroaryl, arylalkyl, alkyl disulfide, aryl disulfide, acetal, fluorenylmethoxycarbonyl or orthoester ($-C(OR)_3$, wherein R is $C_1$ to $C_4$ alkyl).

Scheme 8

Scheme 8 illustrates a method for preparing amino carboxy compounds, another class of aromatic carbocycles that may be prepared using the silane linkers of this invention:

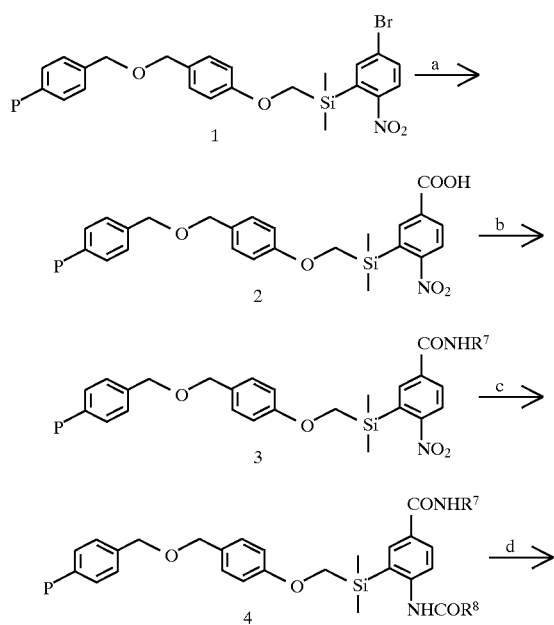

a n-BuLi, THF and $CO_2$;
b peptide coupling;
c (i) NaSH, THF, Water; (ii) peptide coupling; (iii) TFA, Neat.

In a manner similar to that described above for Scheme 7, resin bound aryl silane intermediate 1-Scheme 8 is prepared. Additional synthetic chemistry is performed on the intermediate in order to prepare amino carboxy aromatic carbocycles 4-Scheme 8. For example, when the substituent X of 1-Scheme 8 is bromine, the bromine moiety is converted, by conventional techniques to a carboxy group, through an alkyl lithium species in an aprotic solvent (such as THF). 2-Scheme 8 is converted to an amide using conventional peptide coupling techniques with various amines and amino acid derivatives. Additional synthetic chemistry which would be obvious to the skilled artisan is performed in order to modify the substituents X, A, B and C, for example, N-acylation using various carboxylic acids and amino acids. Cleavage of the modified aromatic carbocycle in order to prepare the final product which is a compound of 4-Scheme 8, wherein the substituents B, C, $R^7$ and $R^8$ are, independently from one another, hydrogen, halogen, alkyl, alkenyl, alkynyl, alkoxy, aryloxy, thioether, alkylthio, $C(O)R^a$, wherein $R^a$ is hydrogen or alkyl, cyano, t-butoxyaminocarbonyl, nitro ($-NO_2$), aryl, heteroaryl, arylalkyl, alkyl disulfide, aryl disulfide, acetal, fluorenylmethoxycarbonyl or orthoester ($-C(OR)_3$, wherein R is $C_1$ to $C_4$ alkyl), is accomplished under strongly acidic conditions (such as treatment with TFA).

Scheme 9

Scheme 9 illustrates a method for preparing biphenyltetrazole compounds, yet another class of aromatic carbocycles that may be prepared using the silane linkers of this invention.

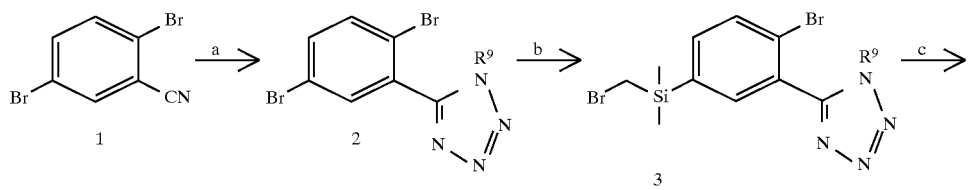

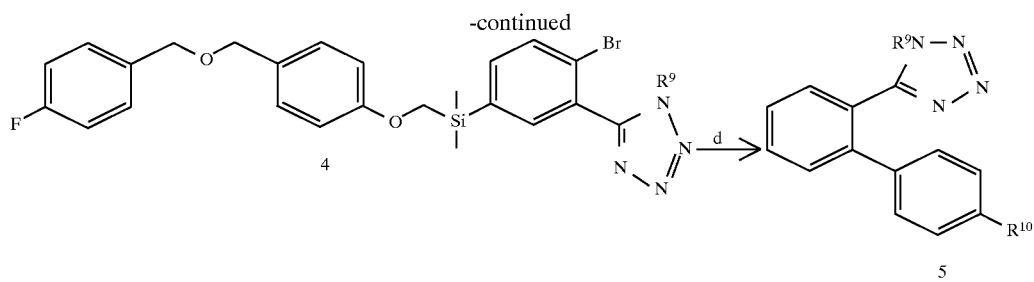

(a) (i) NaN₃, AlCl₃; (ii) Base, R⁹Z', wherein Z' is Cl, Br, I or tosylate;
(b) n-BuLi, Ether, BrCH₂Si(Me)₂;
(c) (i) NaOMe, 4-hydroxy benzyl alcohol; (ii) NaH, THF, Merrifield chloromethyl resin;
(d) (i) Pd(PPh₃)₄, 4-R¹⁰-substituted phenylboronic acid [wherein R¹⁰ is aldehyde (—CHO), —CH₂OR, halogen,
—CH(OR)₂, —C(OR)₃, —NO₂, —NR₂, —SR, (wherein R is C₁ to C₄ alkyl), an ethylene dioxy group,
or an optionally substituted aryl group] Na₂CO₃(aq), toluene, ethanol; (ii) TFA, Neat.

2-Scheme 9 (wherein X and A are bromine and B and C are defined as described above) prepared by reacting 1-Scheme 9 (prepared from 2,4-dibromobenzoic acid which is available from Aldrich, by reaction with methanesulfonyl chloride and ammonia) with sodium azide in the presence of a Lewis acid, and then N-alkylating the intermediate previously formed, using conventional techniques, for example, reaction with a base (such as NaH, potassium carbonate or trialkylamines) in an aprotic solvent, and alkylation with an alkyl halide or an alkyl tosylate (such as R⁹-Z', wherein R⁹ is alkyl; and Z' is C, Br, I or tosylate). 2-Scheme 9 is coupled with a silane compound and then with a polymer resin to prepare 4-Scheme 9, as described previously. Additional synthetic chemistry is performed in order to modify the aromatic carbocycle bound to the resin. Cleavage of the substituted aromatic carbocycle is accomplished using strong acid conditions. It will be clear that X and A can be other bromide and as defined above, provided that X, A, B and C can not all be hydrogen and not all X, A, B and C can be alkyl.

Scheme 10

Scheme 10 illustrates the preparation of an aromatic carbocycle 3-Scheme 10, wherein the carbocycle is an aldehyde substituted biphenyl compound. 1-Scheme 10 is prepared according to Scheme 1 and then reacted with an optionally substituted boronic acid (such as 4-formylphenylboronic acid) in a basic medium (such as sodium carbonate) and an aprotic solvent (such as toluene) at elevated temperatures (such as 100° C.) to give a resin-bound aryl silane intermediate 2-Scheme 10. Cleavage of 2-Scheme 10 with TFA yields the aromatic carbocycle with a hydrogen at the clevage site.

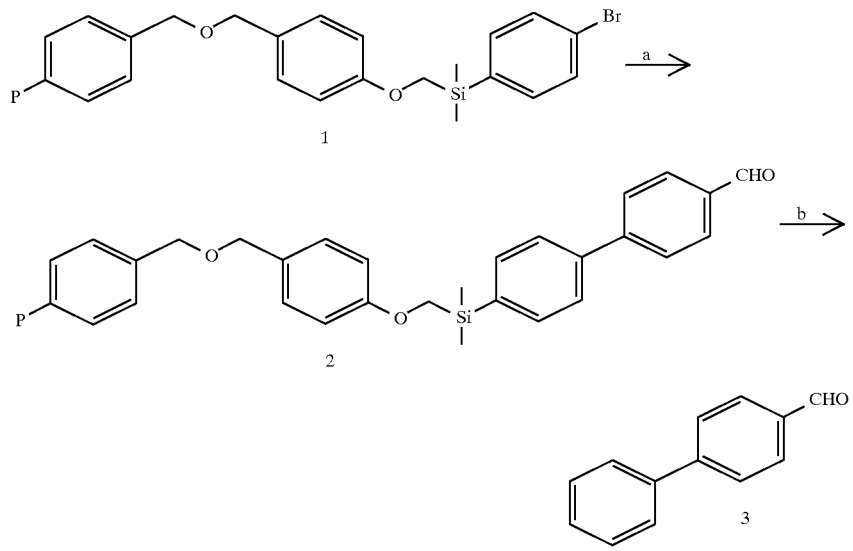

a) 4-formylpenylboronic acid, (Ph₃ P)₄Pd, Na₂CO₃(aq), Toluene, EtOH, 100°
b) TFA, neat, 25°

Scheme 11

Scheme 11 illustrates the preparation of an amine substituted biphenyl compound using the resin-bound aryl silane intermediate 1-Scheme 11 (prepared according to step (a) of Scheme 10 above) as a starting material. 1-Scheme 11 is reacted with an optionally substituted primary amine (such as benzyl amine, Aldrich®, Milwaukee, Wis.) in an aprotic or protic solvent (such as toluene, methylene chloride, ethanol or methanol) to give a resin-bound aryl silane intermediate substituted with a benzyl imine (2-Scheme 11). Suitably, the optionally substituted primary amine is substituted with alkyl, aryl heteroaryl, arylalkyl or heteroarylalkyl; preferably arylalkyl; more preferably, benzyl. Additional synthetic chemistry, specifically a Grignard reaction using alkylmagnesium bromide (made conventionally) in an aprotic solvent (such as ether and toluene), is performed on resin-bound aryl silane intermediate 2-Scheme 11 to convert the benzyl imine to 3-Scheme 11, an aminobenzyl substituted alkenyl moiety. Compounds analogous to 3-Scheme 11, but wherein the alkenyl moiety is varied, may be prepared prepared by using a different Grignard reagent under the same reaction conditions. Standard cleavage conditions are used to give 4-Scheme 11.

resin-bound aryl silane intermediate 2-Scheme 12. The vinyl ester 2-scheme 12 is modified to a thiol addition moiety by reaction with an optionally substituted thiol (such as thiophenol, Aldrich) in a tertiary amine base (such as triethylamine) in an aprotic or protic solvent (such as toluene or ethanol) to give resin-bound aryl silane intermediate 3-Scheme 12, which intermediate is cleaved to give the desired derivatized aromatic carbocycle, 4-Scheme 12. It will be recognized that various additional synthetic chemistry can be performed on intermediate 2-Scheme 12 in order

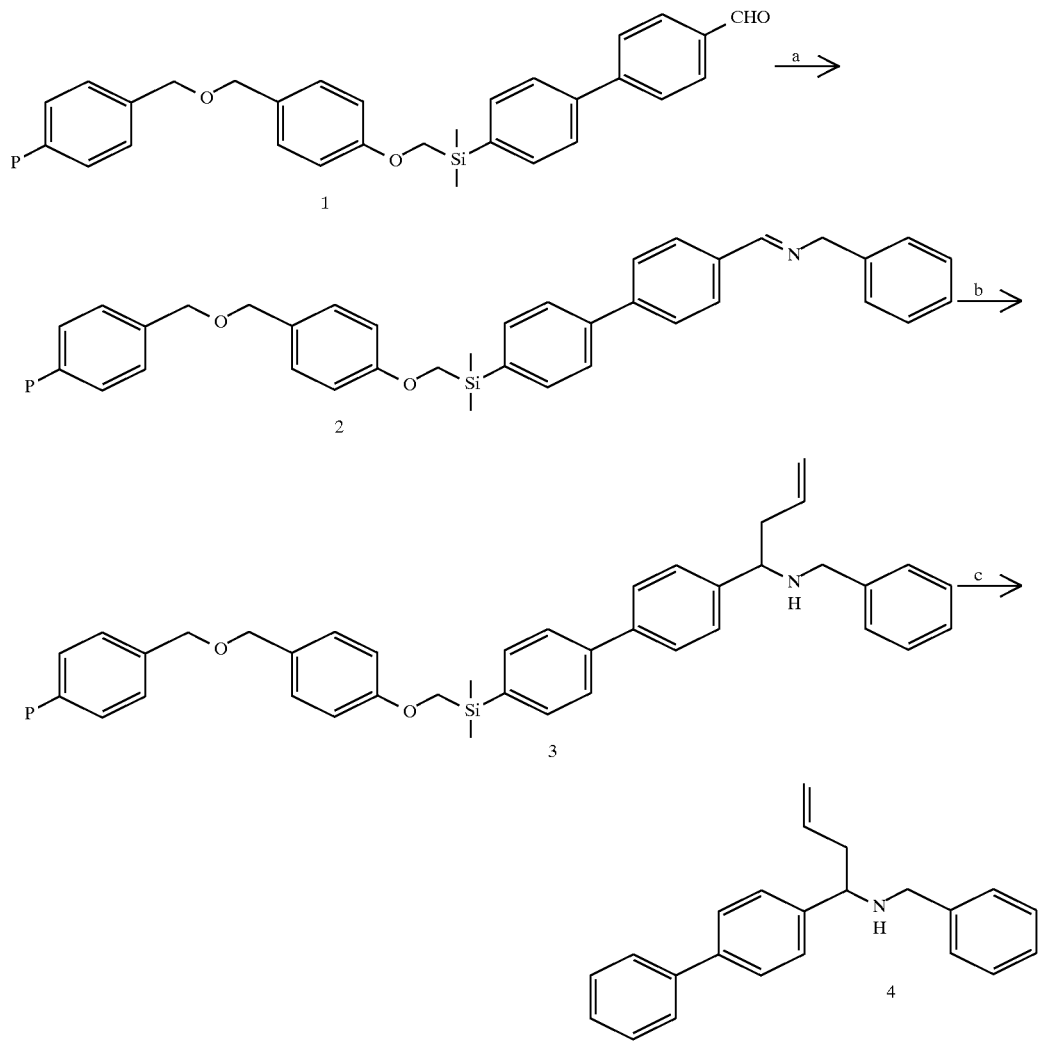

a) PhCH$_2$ NH$_2$, Toluene;
b) Allylmagesium bromide, ED$_2$, Toluene, 25°;
c) TFA (neat)

Scheme 12

Scheme 12 illustrates the preparation of another substituted biphenyl compound using the resin-bound aryl silane intermediate 1-Scheme 12 prepared according to step (a) of Scheme 10 above) as a starting material. In this case, the aldehyde substituted resin-bound aryl silane intermediate 1-Scheme 12 is reacted with an optionally substituted Wittig reagent (such as phosphorane or a compound of the formula Ph$_3$P=CHCOOR$^b$, wherein R$^b$ is C$_1$ to C$_6$ alkyl, specifically ethyl) in an aprotic solvent (such as THF, ether or dioxane) at elevated temperatures (such as 60° C.) to give to derivatize across the alkenyl bond, for example by performing a Wadsworth-Emmons reaction as disclosed by Patios, *Tet. Lett.*, p. 1317 (1991); Coatrot, *Synthesis*, p. 790 (1956); Marshall, *J. Org. Chem.*, 51(10), p. 1735 (1986); and Mandai, *Tet. Lett.*, 21 pp. 2987–2990 (1992).

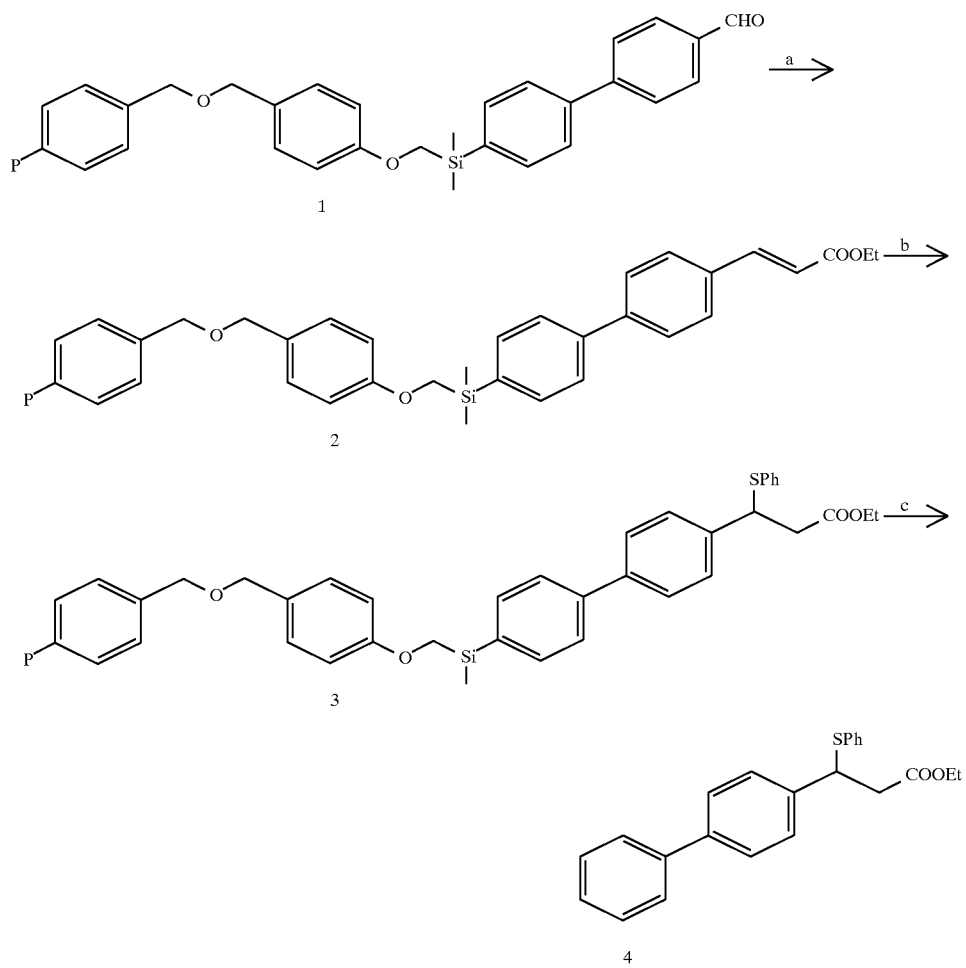
a) Ph₃ P = CHCOOEt, THF, 60°;
b) PhSH, E₃tN, Toluene, 25°;
c) TFA, Neat
Schemes 13a and 13b
Schemes 13a and 13b illustrate other types of additional synthetic chemistry which are compatible with the aryl silane bond of various resin-bound aryl silane intermediates.
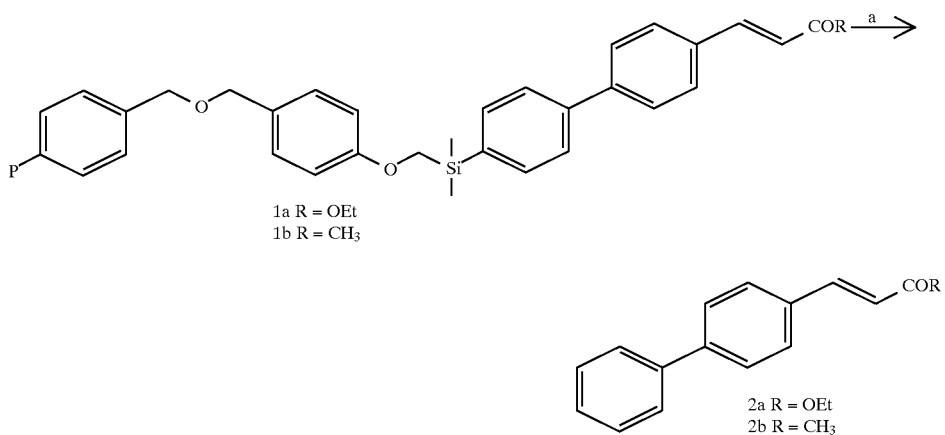

-continued
Scheme 13a a) TFA, Neat

Scheme 13b

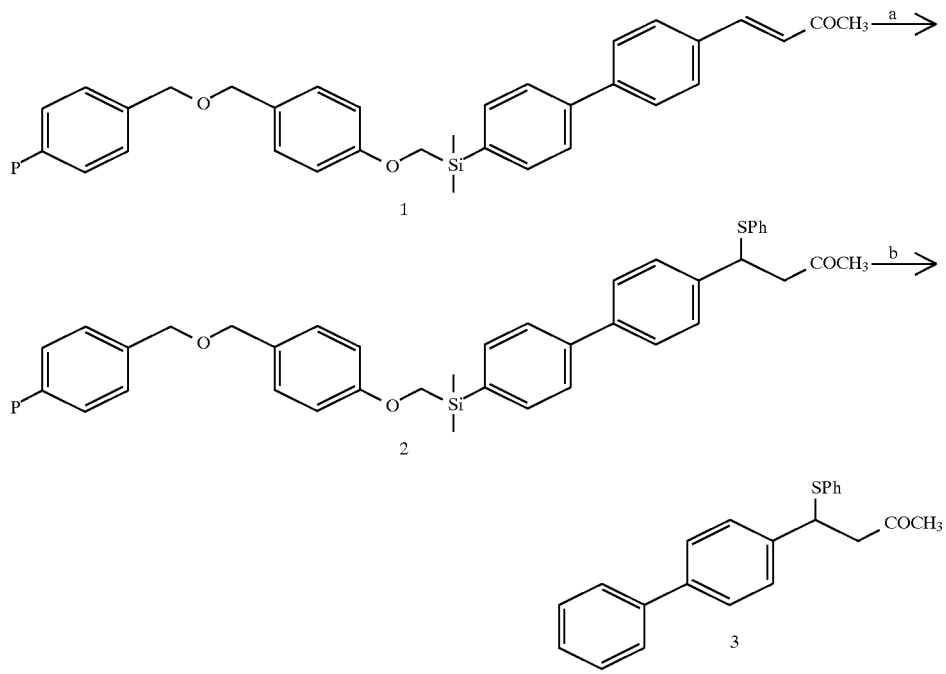

a) PhSH, Et₃ N, Toluene;
b) TFA, Neat

Scheme 14

Scheme 14 merely illustrates the standard reaction conditions for making dibromobenzonitrile (starting material 1-Scheme15).

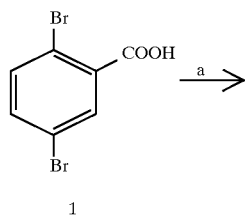

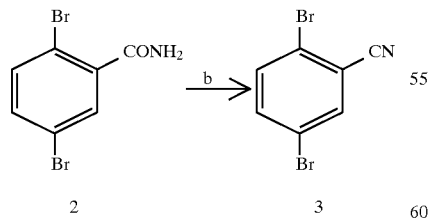

Schemes 15 and 16

Scheme 15 illustrates the reaction conditions for making a cyano, bromo-substituted aryl silane compound 4-Scheme 15. Scheme 16 illustrates the preparation of a resin 2-Scheme 16, starting from the Merrifield chloromethyl resin 1-Scheme 16.

Scheme 15

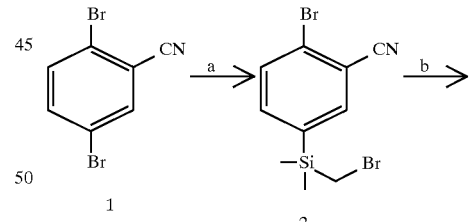

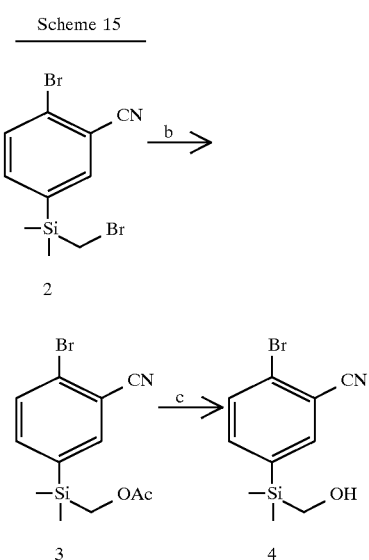

a) n-BuLi, THF, −105°, BrCH₂Si(Me)₂Cl;
b) NaOAc, DMF, 50°
c) HCl (3 N), MeOH, 25°

Scheme 16

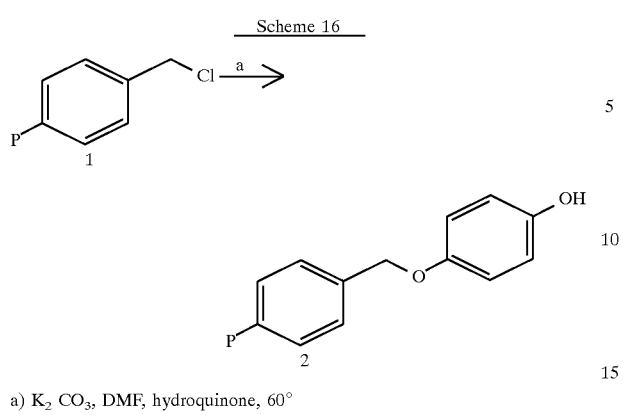

a) K₂CO₃, DMF, hydroquinone, 60°

Scheme 17

Scheme 17 illustrates the preparation of a cyano-substituted aromatic carbocycle using the cyano, bromo-substituted aryl silane compound 2-Scheme 17 (prepared per Scheme 15) and resin 1-Scheme 17 (prepared per Scheme 16) as starting materials. As used herein, "Ph₃P" is triphenylphosphine (Aldrich); "DEAD" is diethylazodicarboxylate (Aldrich); and "NMM" is N-methyl morpholine (Aldrich).

Without further elaboration, it is believed that one skilled in the art can, using the preceding description, utilize the present invention to its fullest extent. The following examples further illustrate the synthesis and use of the compounds of this invention. The following examples are, therefore, to be construed as merely illustrative and not a limitation of the scope of the present invention in any way.

EXAMPLES

Preparation of 4-Bromophenyldimethylsilylmethylbromide (2-Scheme 1)

A solution of n-butyllithium (2.5M, 53 mL, 0.133 mole) was added dropwise over 30 minutes under argon to a solution of 1,4-dibromobenzene (30.0 g, 0.127 mole) in dry THF (575 mL) at −78° C. After stirring for 1.5 h, bromomethylchlorodimethylsilane (25.0 g, 0.133 mole) was added to the reaction mixture through a canula and the solution was stirred for 1.5 h at −78° C. The reaction was poured into water (325 mL) and extracted with ether. The combined extracts were washed with water and brine, and then dried (Na₂SO₄) and concentrated in vacuo to an oil. The oil was distilled (Kugelrohr, 110°–125° C., 0.05 mm Hg) to afford the compound as a clear, colorless oil (22.6 g, 58%). $^1$H NMR (400 MHz, CDCl₃) 7.45 (dd, 4H), 2.60 (s, 2H), 0.45 (s, 6H).

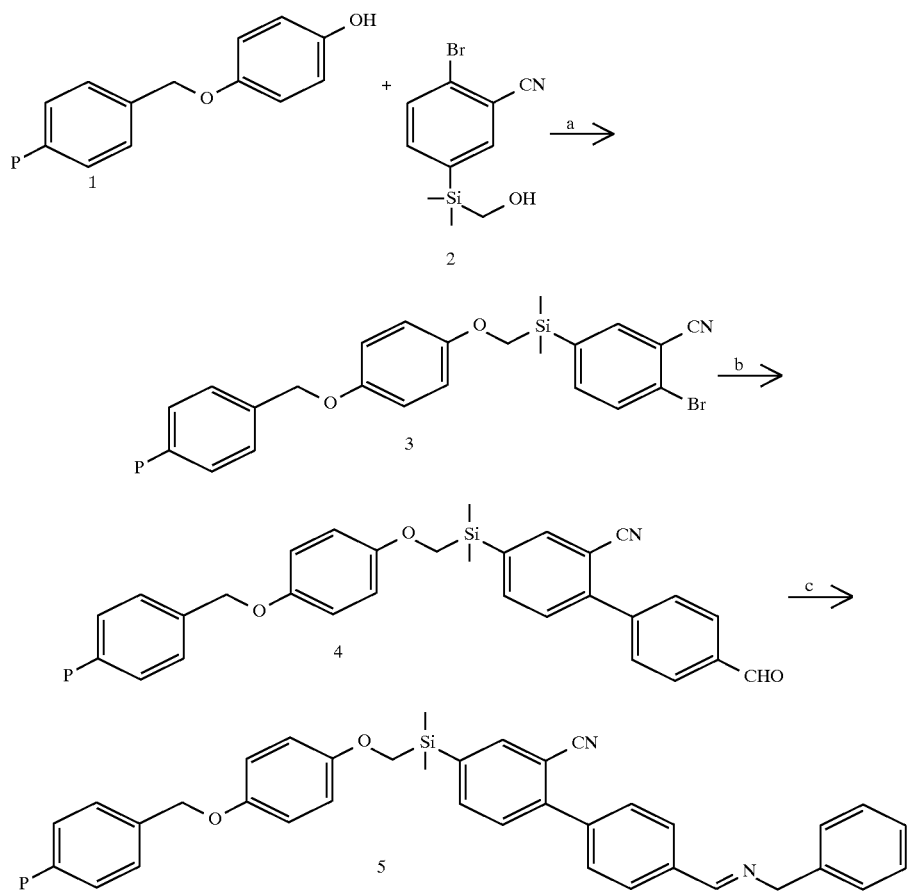

a) Ph₃P, DEAD, NMM, 35°
b) 4-formylphenylboronic acid, (P₅lP)4Pd, Na₂CO₃ (aq) EtOH, Toluene, 100°

Preparation of 4-(4-Bromophenyldimethylsilylmethyloxy)benzyl alcohol (Formula 3-Scheme 1)

Sodium methoxide (4.17 g, 73.4 mmole) was added under argon to a solution of 4-hydroxybenzyl alcohol (8.67 g, 69.9 mmol) in dry DMF (70 mL) and the reaction mixture was stirred for 30 minutes at room temperature. 4-Bromophenyldimethylsilylmethyl-bromide (22.6 g, 73.4 mmol) was added through a canula and the reaction was stirred at RT for 30 minutes and at 65° C. for 45 minutes. The reaction was poured into ice water (250 mL) and extracted with ethyl acetate. The combined extracts were washed with water, 5% sodium bicarbonate and brine and the dried ($Na_2SO_4$). The solution was concentrated to an oil at reduced pressure and purified by flash chromatography (silica gel, 20% ethyl acetate/hexane) to yield the product as a clear, colorless oil (9.23 g, 38%). $^1$H NMR (400 MHz, $CDCl_3$) 7.48 (dd, 4H), 7.10 (dd, 4H), 4.61 (s, 2H), 3.77 (s, 2H), 0.42 (s, 6H).

Preparation of Resin-Bound Aryl Silane Intermediate 4-Scheme 1

A solution of 4-(4-bromophenyldimethylsilylmethyloxy) benzyl alcohol (7.22 g, 20.55 mmol) in dry THF (5 mL) was added to a suspension of sodium hydride (95%, 0.617 g, 25.69 mmol) and stirred at 30° C. until gas evolution ceased. Merrifield resin (Nova Biochem., 1.4 mmol/g)) was added with additional dry THF (15 mL) and the reaction mixture was stirred at 65° to 70° C. for 24 h. The reaction mixture was cooled to room temperature and quenched with methanol (5 mL) and the resin was filtered and washed with methanol, methanol/water (1:1), methanol, methylene chloride and finally methanol. The product was dried in vacuo for 24 h to yield the title compound (8.99 g). Anal. found: C, 82.20, H, 7.03; Br, 6.67.

Preparation of Formula 2-Scheme 2

Wang resin (2.0 g), prepared pursuant to Su-Sun Wang, JACS, 95, p. 1328 (1973), is suspended in THF (15 mL) and allowed to swell for 30 minutes. Sodium hydride (250 mg) was then added in one portion and stirred at room temperature for 2 h. Dibromide (2 g) was added, followed by tetra-n-butylammonium iodide and heated under reflux for 4 days. The reaction mixture was cooled and carefully quenched with the addition of methanol (5 mL). Filtration followed by washing with methanol, water, methylene chloride and finally with methanol yielded the resin which was dried in vacuum oven. Anal.: Br (4.7%), MS (DCI, $NH_3$) 380; 349 and 351 peaks equal intensity.

Bromination of Resin-Bound Aryl Silane Intermediate 4-Scheme 1 (See Scheme 3(b))

Resin-bound aryl silane intermediate 4-Scheme 1 (0.5 g) was swelled in methylene chloride (5 mL). Bromine (0.1 mL) was added and stirred overnight. Reaction mixture, after filtering, washing with ether and removal of solvents in vacuo, gave an oil (175 mg) which solidified on standing. It was found to be dibromobenzene by $^1$H NMR and m. pt.
$^1$H NMR ($CDCl_3$, 400 MHz) d 7.35 (s); m. pt. 86°–88° C.

Reaction of Resin-Bound Aryl Silane Intermediate 4-Scheme 1 with HBr (See Scheme 3(c))

Resin-bound aryl silane intermediate 4-Scheme 1 (500 mg) was suspended in methylene chloride (5 mL). Gaseous HBr was then passed through the suspension cooled in an ice bath for 5 minutes. The cooling bath was removed and the reaction mixture stirred for 30 minutes. Excess HBr was purged from the suspension by passing Argon until no HBr was detected with pH paper. The resin was filtered off, washed with ether and the solvents removed in vacuo to give 230 mg of an oil. MPLC (silica, ethyl acetate:hexane 1:10) provided the product. MS (DCI, $NH_3$) 428 ($M^+$+$NH_4$).

Reaction Resin-Bound Aryl Silane Intermediate 4-Scheme 1 with Trifluoroacetic Acid (See Scheme 3 (a))

Resin-bound aryl silane intermediate 4-Scheme 1 (500 mg) was stirred in trifluoroacetic acid (2 mL) and the product was analyzed by GC(SE-30, 50° C.) room temperature 5.14 minutes. The formation of bromobenzene was confirmed by co-injection with authentic bromobenzene.

Preparation of Resin-Bound Aryl Silane Intermediate 2a-Scheme 4

A solution of n-butyllithium (1.6M, 4.0 mL, 6.4 mmole) was added dropwise to a suspension of the resin-bound aryl silane intermediate 4-Scheme 1 (2.0 g, 2 mmole) in dry THF (22 mL) at 10° C. and the suspension was stirred for 2.5 h at room temperature. Phthalic anhydride (1.18 g, 8 mmol) dissolved in warm THF (6 mL) was added and the suspension was stirred for 1 h at RT. The resin was filtered and washed with THF, THF/water (2:1), THF/2N HCl (3:1), THF/water (2:1), water, THF/water (2:1), THF and methanol. The duct was dried in vacuo for 24 h at 50° C. to yield the title compound (1.91 g). Anal. found: C, 85.47; H, 7.32. IR (KBr) 1718 $cm^{-1}$ and 1698 $cm^{-1}$ (carbonyl stretch).

Preparation of Resin-Bound Aryl Silane Intermediate 2b-Scheme 4

In the same manner as described for resin-bound aryl silane intermediate 2a-Scheme 4, the resin-bound aryl silane intermediate 4-Scheme 1 (0.5 g, 0.5 mmole) in dry THF (6 mL) was treated with a solution of n-butyllithium (1.6M, 1.0 mL, 1.6 mmole) followed by solid carbon dioxide to give the carboxy resin-bound aryl silane intermediate 2b (0.277 g). Anal. found: C, 85.65; H, 7.55. IR (KBr) 1694 $cm^{-1}$ (carbonyl stretch).

Preparation of Resin-Bound Aryl Silane Intermediate 2c-Scheme 4

In the same manner as described for resin-bound aryl silane intermediate 2a-Scheme 4, the resin-bound aryl silane intermediate 4-Scheme 1 (0.5 g, 0.5 mmole) in dry THF (6 mL) was treated with a solution of n-butyllithium (1.6M, 1.0 mL, 1.6 mmole) followed by diethyl oxalate (0.34 mL, 2.5 mmol) to give the glyoxylic ester resin-bound aryl silane intermediate 2c (0.330 g). Anal. found: C, 85.75; H, 7.53. IR (KBr) 1735 $cm^{-1}$ and 1685 $cm^{-1}$ (carbonyl stretch).

Palladium Coupling of Resin-Bound Aryl Silane Intermediate 4-Scheme 1 with Phenylboronic Acid and Cleavage with TFA to Produce Biphenyl (See Scheme 5)

Resin-bound aryl silane intermediate 4-Scheme 1 (2 g) was suspended in toluene (15 mL) and allowed to swell for 30 minutes. To this was added tetrkistriphenylphosphine (275 mg, 0.25 mmol), phenylboronic acid (500 mg, 4.1 mmol), ethanol (2 mL), sodium carbonate, aq (2 mL, 2M), all of which was heated in an oil bath maintained at 90° for 16 h. The reaction mixture was cooled, filtered washed with methanol, water, methylene chloride and methanol to give a black solid which was taken for the next step. A portion of the above resin (1 g) was treated with trifluoroacetic acid (3 mL) and stored at room temperature for 24 h. Methylene chloride (10 mL) was added and filtered, washed with methylene chloride. Removal of solvents gave a slight brown oil which was triturated with hexane (50 mL). Evaporation of the hexanes yielded biphenyl (78 mg) which was come with an authentic sample.

Reaction of Resin-Bound Aryl Silane Intermediate 2a-Scheme 4 [Also 3-Scheme 6] with Diphenylphosphoryl Azide to Prepare 4-Scheme 6

The resin-bound aryl silane intermediate 2a-Scheme 4 was suspended in toluene and allowed to swell for 30 minutes. To this was added diphenylphosphoryl azide and the mixture is heated in an oil bath maintained at 90° C. for 16 h. The reaction mixture was cooled and filtered, washed with methanol, methylene chloride, methanol and finally dried in vacuo to give the isocyanate. IR 2100 cm$^{-1}$.

Hydrolysis of Resin-Bound Aryl Silane Intermediate Formula 4-Scheme 6 in Order to Prepare Resin-Bound Aryl Silane Intermediate Formula 5-Scheme 6

The resin-bound aryl silane intermediate obtained above [4-Scheme 6] was suspended in dioxane and refluxed with aqueous sodium hydroxide overnight. Filtration followed by washing with methanol, water, methylene chloride and finally methanol provided the free amine.

Coupling of Amino Acid with Resin-Bound Aryl Silane Intermediate Formula 5-Scheme 6 to Prepare Resin-Bound Aryl Silane Intermediate Formula 6-Scheme 6

The amine resin-bound aryl silane intermediate 5-Scheme 6 was suspended in DMF and allowed to react with FMOC-amino acid fluoride in the presence of 4methyl-2,6-di-tert-butylpyridine overnight. The resin-bound aryl silane intermediate was filtered, washed with methanol, DMF, methylene chloride and methanol. Drying in vacuo yielded the coupled product.

Deprotection and Cyclization of Resin-Bound Aryl Silane Intermediate Formula 6-Scheme 6 to Prepare Resin-Bound Aryl Silane Intermediate Formula 7-Scheme 6

The above resin-bound aryl silane intermediate 6-Scheme 6 was suspended in DMF and allowed to react with piperidine to give the free amine. The reaction mixture was filtered and washed as usual to provide the resin-bound aryl silane intermediate free amine. The resin-bound aryl silane intermediate free amine was suspended in DMF and heated at 60° with 5% acetic acid to provide the cyclic product. See, Bunin, B. A., Ellman, J. A., *JACS*, p. 10997 (1992).

Preparation of the Nitrobenzophenone Resin-Bound Aryl Silane Intermediate (3-Scheme 6)

1-Scheme 1 (1.0 g, 1.0 mmol) was suspended in THF (10 mL) and cooled to −78° C. Added n-BuLi (1.6M in Hexanes, 1.6 mmol) and allowed to react for 2 h. The mixture was warmed to −65° C.; 2-nitrobenzoyl chloride (1 mL, 7 mmol) was added, and the mixture was allowed to warm to room temperature overnight. Filtration followed by washing with methanol (3×25 mL), water (2×25 mL), methylene chloride (2×25 mL and finally with methanol (50 mL) gave the resin which was dried at 60° C. in vacuo. Recovered ( 1.0 g). IR 1740, 1520 cm$^{-1}$.

Preparation of the Aminobenzophenone Resin (4-Scheme 6)

A mixture of nitrobenzophenone resin, 3-Scheme 6, (950 mg), NaSH (1.0 g) in THF (10 mL), MeOH (5 mL), water (5 mL) was heated in an oil bath at 70° C. for 16 h. The mixture was cooled, filtered and washed with methanol, water, methylene chloride and finally with methanol. Drying at 60° (in vacuo gave a slight yellow resin. Recovered (900 mg). IR 1640 (broad).

Preparation of 4-Formylbiphenylsilane Resin (2-Scheme 10)

The bromoresin 1-Scheme 10 (1 g, 1 mmol) was swelled in toluene (10 mL) and ethanol (4 mL). To this was added 4-formylphenylboronic acid (450 mg, 3 mmol), aqueous sodium carbonate (2M, 3 mL, 6 mmol) and tetrakistriphenylphosphine palladium (200 mg). The reaction mixture was heated under Argon ("Ar") with stirring for 24 h., cooled and filtered through a sintered glass funnel. Washed the resin with methylene chloride, methanol, methanol-water (1:1), methanol, methylene chloride and finally with methanol. Dried in vacuo to give colorless 4-formylbiphenyl resin 2-Scheme 10. IR (KBr) 1701 cm$^{-1}$ (CHO).

Preparation of the Imine (2-Scheme 11)

The resin aldehyde 1-Scheme 11 made as described above (250 mg) and benzyl amine (1 mL) in toluene (5 mL) was stirred at 25° C. for 12 h. It was then briefly heated for 5 min at 60° C., cooled, filtered and washed with toluene followed by diethyl ether. Dried in vacuo to give 2-Scheme 11 as a colorless solid. IR (KBr) 1643 cm$^{-1}$ (C=N). Anal C (87.64), H (7.48), N (0.99).

Addition of Allylmagnesum Bromide to 2-Scheme 11 to Give (3-Scheme 11)

2-Scheme 11 (250 mg) was swelled in 1:1 ether, toluene (4 mL). To this at 25° C. was added allyl magnesium bromide, a conventionally made Grignard reagent, (1 mL, 1M in ether) and stirred overnight. Filtered, washed with ether, toluene and finally with ether. Dried in vacuo to give a colorless resin. IR (KBr) 1640 cm$^{-1}$ (C=C).

TFA Cleavage of Amine (4-Scheme 11)

3-Scheme 11 (100 mg) was stirred with trifluoroacetic acid (2 mL) for 12 h., filtered and washed with methanol. Removal of solvents in vacuo followed by stirring with saturated sodium carbonate and extracting into ether provided the biphenyl derivative 4-Scheme 11.

1 HNMR (CDCl$_3$, 400 MHz) δ 7.2–7.8 (m, 14H), 5.7 (m, 1H), 5.1 (m, 2H), 3.5–3.8 (m, 3H), 2.5 (bs, 2H). MS (M+H) 314.

Preparation of the Wittig Adduct (2-Scheme 12)

Aldehyde resin 1-Scheme 12 prepared as above for 2-Scheme 10 (210 mg) was swelled in THF (3 mL), added phosphorane (350 mg) and heated in an oil bath maintained at 60° C. for 24 hr. Cooled, filtered washed with methanol, methylene chloride and finally with methanol. Dried in vacuo to give a colorless resin 2-Scheme 12. FT-IR (KBr) 1708, 1636 cm−1.

Addition of Thiophenol, Preparation of the Sulfide (3-Scheme 12)

The ester resin 2-Scheme 12 (200 mg) was swelled in THF (3 mL) added triethylamine (0.2 mL) and thiophenol (0.3 mL) and stirred at 25° C. for 2 days. Filtered, washed with methanol, methylene chloride and finally methanol. Drying in vacuo provided a colorless solid 3-Scheme 12 FT-IR (KBr) 1735 cm$^{-1}$. Anal C 84.75, H 7.21, S 2.11.

Cleavage of Biphenylsulfide by TFA (4-Scheme 12)

3-Scheme 12 (20 mg) was taken up in a small test tube and exposed to TFA vapors in a dessicator for 24 h. Excess TFA was removed in vacuo and the product extracted into diethyl ether. Removal of solvents provided the sulfide 4-Scheme 12.

MS (M+H) 363.

TFA Cleavage of the Ester (2a-Scheme 13a)

2-Scheme 12 (40 mg) was taken in a test tube and exposed to TFA vapors in a dessicator for 24 h. Excess TFA from the resin was removed in vacuo and the product extracted into ether. Removal of solvents provided 2a-Scheme 13a which was found to be pure by 1 HNMR (CDCl$_3$, 400 MHz)

Addition of Triphenylphosphoranilidine Acetone to Aldehyde (1b-Scheme 13a)

1-Scheme-12 was swelled in THF (10 mL) and added phosphorane (1.4 g) and heated at 60° for 24 h. Cooled, filtered and washed with MeOH, CH$_2$Cl$_2$ and finally with MeOH.

Dried in vacuo to provide the ketone.
FT-IR

Preparation of the Dibromoamide (2-Scheme 14)

To a solution of dibromobenzoic acid (21.6 g, 77.2 mmol) in dry pyridine (150 mL) under Ar was added methanesulfonyl chloride (9.28 g, 81 mmol) and stirred at 0° C. for 1 h. To this reaction mixture was passed ammonia gas for 10 min at 0°, and then poured into ice cold water (750 mL). The solid was filtered, washed with water. Air dried to give the amide (15.9 g, 74%). IR (neat) 3366, 3185, 1650 cm–1. 1 HNMR (CDCl3, 400 Mhz) δ 7.72 (d, 1H, J=3 Hz), 7.48 (d, 1H, J=7 Hz), 7.42 (dd, 1H, J=3, 7 Hz).

Preparation of the Nitrile (3-Scheme 14)

To a solution of DMF (3.3 mL, 42.4 mmol) in dry CH$_3$CN (100 mL) at 0° C. was added dropwise oxalyl chloride (3.6 mL, 40.8 mmol) over 5 min. After stirring for 5 min at 0° C., a solution of the amide (5.58 g, 20 mmol) in dry DMF (30 mL) was added via canula. After 5 min, pyridine (6.5 mL, 80 mmol) was added over 1 min and the reaction mixture was stirred at 0° C. for 15 min. It was then poured into saturated NH$_4$Cl(200 mL), extracted with 1:1 ethyl acetate:hexane (300 mL). The organic layer was washed with water (2×100 mL), brine (75 mL) and dried over anhydrous Na$_2$SO$_4$. Removal of solvents followed by trituration with hexane provided 3-Scheme 14 (4.68 g, 90%). IR (Neat) 2225, 1570, 1256 cm–1. 1 HNMR (CDCl3, 400 MHz) δ 7.75 (d, 1H, J=2 Hz), 7.58 (dd, 1H, J=2, 7 Hz), 7.55 (d, 1H, J=7 Hz).

Preparation of the Bromocyanosilane (2-Scheme 15)

To a solution of 3-Scheme 14 (5 g, 19.2 mmol) in dry THF (200 mL) at –105° C. was added under Ar, n-BuLi (1.6M in hexane, 12 mL 19.2 mmol) over a period of 30 min. The ion mixture was then stirred for 10 min at –105° C. To this was added bromomethylchlorodimethyl silane (4.67 mL, 24.9 mmol) over 2 min and stirred for 45 min while warming to –80° C. The reaction mixture was poured to water (200 mL), enacted with 1:1 ether:hexane (200 mL), washed with water, brine and dried over anhydrous sodium sulfate. The resulting oil was flash chromatographed (silica, ethyl acetate (3%) in hexane) to give the 2-Scheme 15 (5.01 g, 79%).

1 HNMR (CDCl3, 400 MHz) d 7.9 (d, 1H, J=2 Hz), 7.75 (dd, 1H, J=2, 7 Hz), 7.5 (d, 1H, J=7 Hz), 2.8 (s, 2H), 0.5 (s, 6H).

Preparation of the Acetate (3-Scheme 15)

To a solution of the 2-Scheme 15 (5.01 g, 15 mmol) in dry DMF (50 mL) was added anhydrous sodium acetate (3.70 g, 45.1 mmol) and stirred at 55° C. for 16 h. Cooled, poured into ice water, extracted with 1:1 hexane, ether, washed with water, brine and dried over anhydrous Na$_2$SO$_4$. Removal of solvents followed by flash chromatography (silica, ethyl acetate:hexane 1:19) gave the 3-Scheme 15 (3.42 g, 73%). 1 HNMR (CDCl3, 400 MHz) δ 7.85 (d, 1H, J=2 Hz), 7.75 (dd, J=2, 7 Hz), 7.5 (d, 1H, J=7 Hz), 4.1 (s, 3H), 2.0 (s, 2H), 0.5 (s, 6H).

Preparation of the Alcohol (4-Scheme 15)

To a solution of the 3-Scheme 15 (0.79 g, 2.53 mmol) in methanol (20 mL) was added HCl (3N, 4 mL) and stirred for 12 h. The reaction mixture was neutralized by the addition of solid sodium bicarbonate, filtered and solvents evaporated. Diluted with ethyl acetate, washed with water, brine, dried. Removal of solvents gave an oil (0.68 g, 100%). IR (neat) 3421, 2226, 1570, 1254 cm–1. 1 HNMR (CDCl3, 400 MHz) δ 7.85 (d, 1H, J=2 Hz), 7.72 (dd, 1H, J=2, 7 Hz), 7.55 (d, 1H, j=7 Hz), 3.75 (s, 2H), 0.5 (s, 6H).

Preparation of the Phenol Resin (2-Scheme 16)

To a suspension of Merrifield chloromethyl resin (20 g, 24.8 mmol) in dry DMF (200 mL) was added hydroquinone (21.84 g, 198 mmol) followed by soilid K$_2$CO$_3$ (15.44 g, 112 mmol). The reaction mixture was heated in an oil bath maintained at 65° C. for 48 h., cooled, added ethanol (40 mL) followed by gradual addition of 2:1 EtOH:3N HCl. The resin was filtered, washed with ethanol, ethanol:3N HCl, EtOH, THF, MeOH, water, THF and finally with methanol. Dried in vacuo to give 2-Scheme 15 (20.8 g). IR (KBr) 3544, 3429, 1196, 1025 cm–1. Anal: C (89.55), H (7.31), Cl (020).

Mitsunobu Coupling of Phenol Resin (3-Scheme 17)

To a solution of the alcohol (1 g, 3.7 mmol) in N-methylmorpholine (5 mL) at 0° C. was added triphenylphosphine (0.971 g, 3.7 mmol) and stirred for 5 min. To this was then added dropwise diethylazodicarboxylate (0.58 mL, 3.7 mmol) and stirred at 0° for 30 min. The resin (1 g, 1.24 mmol) was added, temperature increased to 35. After 4 days, the product was filtered, washed with THF, MeOH and dried at 50° in vacuo to give 3-Scheme 17 (1.023 g). IR 2225 cm$^{-1}$ (CN)

It will be clear to the skilled artisan that the silicon linkers and silicon based polymer resins of this invention may be used in a variety of combinatorial methods for synthesizing a large number of molecularly diverse compounds, simultaneously. For example, the instant invention may be applied to (i) the "multi-pin" method described in Geysen et al., Proc. Natl. Acad. Sci. USA., 81, p. 3998 (1984); U.S. Pat. No. 4,708,871 (1987); Geysen et al., Bioorg. Med. Chem. Lett., 3, p.397 (1993); and European Patent 138,855 (1991); (ii) the "tea-bag" approach described in Houghten, R. A., Proc. Natl. Acad. Sci. USA., 82, p. 5131 (1985); and Houghten et al., Nature, 354, p. 84 (1991); and (iii) chemical synthesis on a "chip" described in Fodor et al., Science, 251, p. 767 (1991) and U.S. Pat. No. 5,143,854 (1992).

In addition, the compounds may be screened in assays which have been developed for determining lead compounds as pharmaceutical agents. For reasons of efficiency, the components of the library are screened in groups of multiple compounds. Therefore, once the library of compounds has been synthesized, there must be some method to deconvolute the results of screening such that individual active compounds can be identified. Based upon the disclosure herein, it will be clear to the skilled artisan that there are many methods for deconvolution of the combinatorial library. For example, if the compounds of the library are screened on a solid support, they may be physically segregated so that individual active compounds may be directly selected and identified. In contrast, if the compounds of the library are cleaved from the resin and tested as soluble mixtures, the library may be deconvoluted in an iterative approach, which involves resynthesis of mixtures of decreasing complexity until a single compound is identified, or in a scanning approach, in which the various substituents on the aromatic carbocycle, are evaluated independently and the structure of active compounds are determined deductively. For an explanation of the iterative and scanning approaches to deconvolution of a combinatorial library of compounds, see, for example, Houghten et al., Nature, 354, p. 84 (1991).

Alternative Clevage Methods

In all of the following Schemes (IA), (IIA) and (III) to (IV), "X" is used at all occurrences to mean, a moiety which may be hydrogen, alkyl, alkoxy, halogen, or optionally substituted aryl. In all of the following Schemes (IA), (IIA) and (III) to (IV), "Y" is used herein at all occurrences to depict a moiety which is the remaining portion of the desired final product, and which will vary depending upon the nature of the desired final product. The symbol "P" enclosed by a square or a circle, is used in the Schemes at all occurrences to mean the polymer backbone of the resin. The following embodiments of the present invention provide examples of methods which may be utilized in preparing various additional libraries as described below in Schemes (V) to (IX), on a solid support, for example a polymeric resin.

An alternative cleavage method within the scope of this invention is the Nickon reductive deamination reaction (JACS, 86, 1152 (1964)) which is utilized in order to remove product(s) of the reactions from the resin in a manner which yields compounds which may react with receptors and enzymes. The Nickon reductive deamination reaction scheme depicted below in Scheme (I), has as a linker remnant a methyl group which is a functional group that is useful in developing pharmacophores which bind to G-protein-coupled receptors.

SCHEME (I)

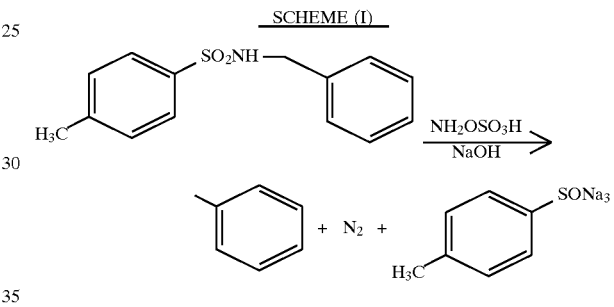

Therefore, using the Nickon reductive deamination reaction, the resin reaction is as follows in Scheme (IA):

SCHEME (IA)

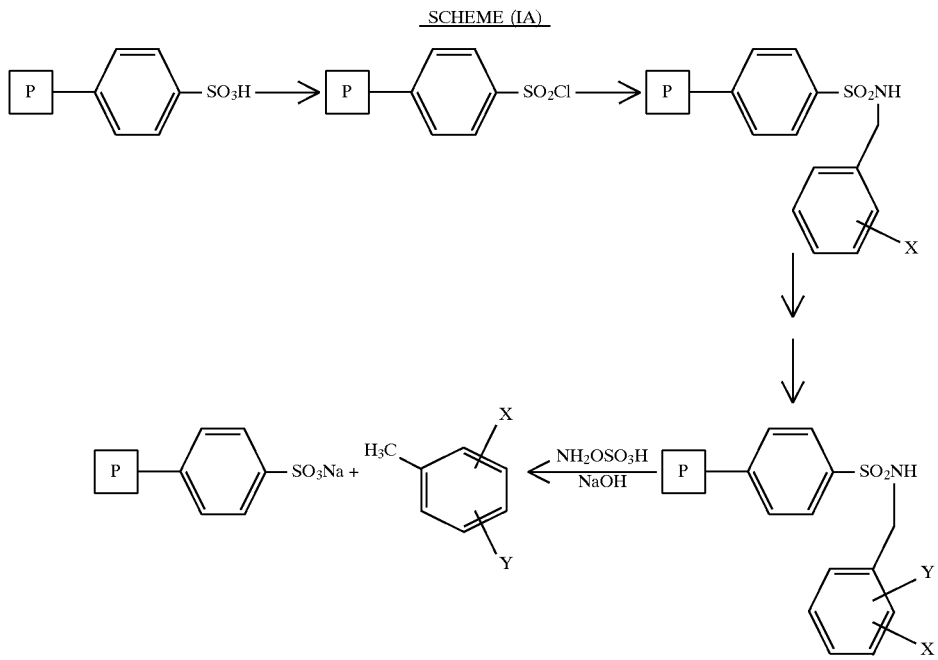

In this embodiment of the invention, the sulfonamide NH of the linker may be incompatible with organometallics or other strong bases known to the skilled artisan. If the incompatibility occurs, one can use an alkyl protecting group which can be removed by treatment with tributyltin hydride in the presence of Pd° in a manner which is conventional in the art.

Another cleavage method within the scope of this invention and which also leaves an aryl methyl group in the products, utilizes the borohydride cleavage of activated sulfonamides (see, for example, R. O. Hutchins et al., *J. Org. Chem.*, 40, p. 2019 (1975); and R. S. Glass, *Chem. Commun.*, p. 1546 (1971). An example of how the borohydride cleavage may be utilized in the methods of this invention is depicted below in Scheme (VII) for the combinatorial synthesis of the N-phenylimidazole-5-acrylic acid library of compounds.

In another embodiment of this aspect of the invention, the Lewis acid cleavage of tertiary carbons from aromatic rings which is a reverse Friedal-Crafts alkylation is utilized in order to remove product(s) of the reactions from the resin in a manner yielding compounds which may react with receptors and enzymes. For a review, see Tashiro et al., *Org. Prep. Proced. Int.*, 8, p. 51 (1976). An example is depicted below in Scheme (II) (See, also, Hofman et al., *Recl. Trav. Chim, Pays - Bas,* 79, p. 790 (1960).

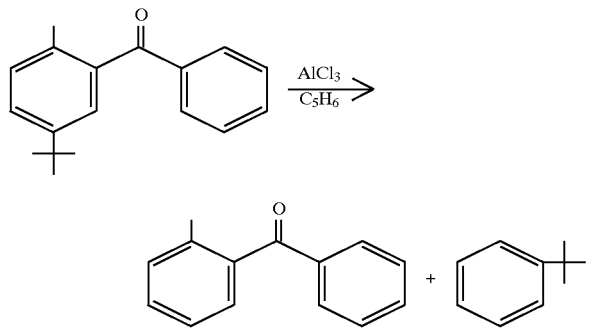

Therefore, using the reverse Friedel-Crafts alkylation, the resin reaction is as follows in Scheme (IIA):

for example, as depicted below in Scheme (III), is utilized in order to remove product(s) of the reaction from the resin in a manner yielding compounds which may react with receptors and enzymes.

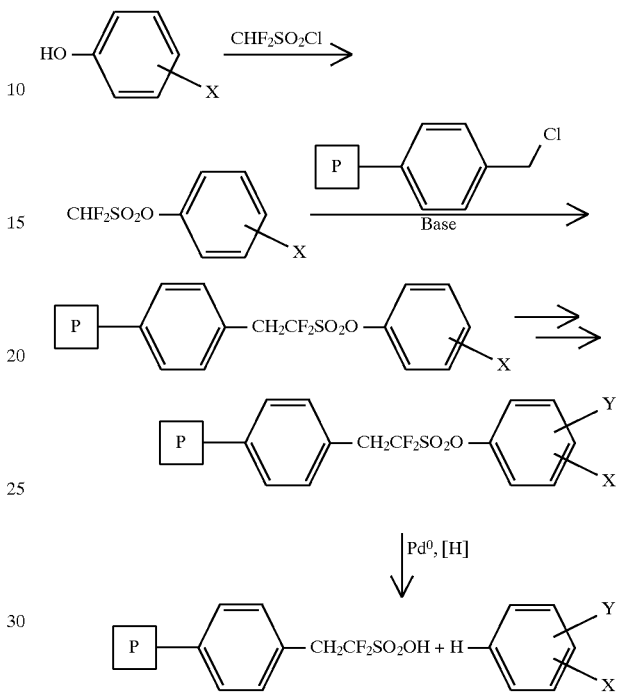

Instead of using the reductive cleavage, the sulfonate ester could be used as a leaving group to introduce other functional groups by means of Pd° chemistry in reactions well known to one of ordinary skill in the art. Examples of functional groups which may be introduced include, but are not limited to, the acrylate and phosphonate functional groups.

Another aspect of this invention is in the methods for separating the batches of resin at the end of the reaction sequence and before deprotection in order to simplify the screening analysis, that is, the deconvolution of the library.

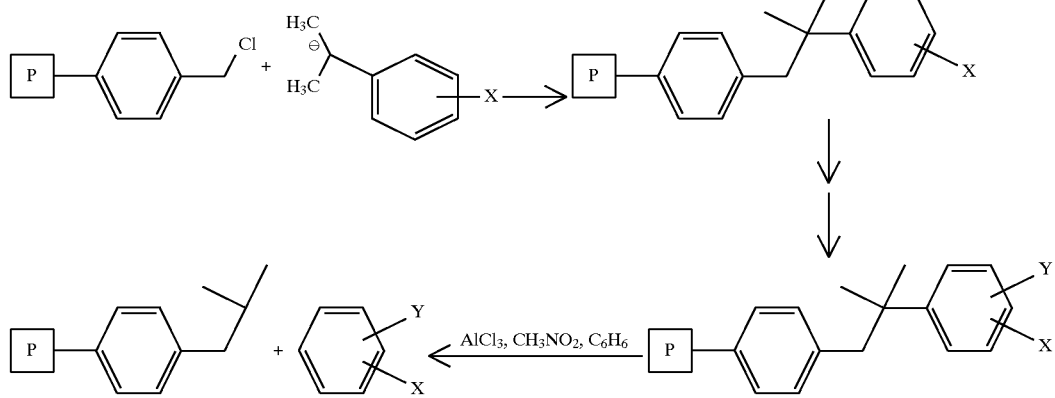

In yet another embodiment of this aspect of the invention, the reductive cleavage of an aryl fluoroalkylsulfonate ester, The following examples serve to illustrate different embodiments of this aspect of the invention, but they are not limitations thereto. Other examples which are known by, or would be obvious to, one of ordinary skill in the art in view of the disclosure herein, are also within the scope of this aspect of the invention. For example, in one embodiment of this aspect of the invention, the physical properties of the resin are utilized, alone or in combination, in order to separate the resin into workable batches, either, for further derivatization or screening analysis. In another embodiment of this aspect of the invention, a different physical property of the resin batches can be utilized for each reaction stage wherein different functional groups are introduced onto the core structure. In yet another embodiment of this aspect of the invention, a single physical property of the resin, e.g., mesh size, which allows enough separable resin batches to be separated to define several reaction steps, may also be utilized.

A preferred physical property of the resin that is utilized in this embodiment of the invention is mesh size of the resin. Utilizing the mesh size of the resin allows separation of the resin batches by dry sieving, gas flotation, liquid flotation or any other method of separation known by or obvious to the skilled artisan. The number of separable batches depends on the efficiency of the fractionation method utilized, and is within the knowledge of one of ordinary skill in the art. Presently at least three different mesh sizes of polystyrene ion exchange resin beads are commonly available (e.g., Dowex 50W strongly acidic cation exchanger, 2% crosslinked, mesh size 50–100, 100–200 and 200–400). However, it is well within the scope of this invention for the skilled artisan to utilize known techniques in order to separate out sharper cuts.

Another preferred physical property of the resin that is utilized in this aspect of the invention is magnetism. When the resin polymerization is performed in the presence of a very finely divided iron powder, the powder will be incorporated into the interior of the resin. Different concentrations of metal in the polymerization mixture give different metal loadings to the resin, therefore allowing the resin batches to be separated magnetically, by techniques known to one of ordinary skill in the art.

For example, if separation of the compounds made by the combinatorial methods described herein is based only upon mesh size of the resin, using the standard sieves available to the skilled artisan, it would be possible to separate the batches. In particular, for a three stage synthesis, three consecutive resin mesh sizes (e.g., 50–100, 100–200; and 200–400) could be used for each of three first stage reagents labeled, for illustrative purposes, as "A', B', and C'". These batches could be subdivided into individual batches labeled, for illustrative purposes, as "A'-1, A'-2, A'-3, B'-1, B'-2", and so on to give 9 batches. A'-1, B'-1, and C"-1 could be combined, reacted with a second stage reagent, labeled for illustrative purposes as "a", and then separated to give A'-1-a, B'-1-a, and C"-1-a. Treatment of all 9 batches from stage one would give 9 batches each of which would contain three compounds ranging from A'-1-a to C'-3-c. The A'-1-a, A'-1-b, and A'-1-c batches could be combined and reacted with a third stage reagent, labeled for illustrative purposes as "a", to give A'-1-a-a, A'-1-b-a, and A'-1-c-a as separable batches. Similar treatment of the other batches would result in a total of 27 separate batches. Separation of the batches to distinguish the last reagent is not required.

If each batch were reacted with a mixture of 2 reagents rather than 1, this would give 27 batches each of which would contain 8 compounds for a total of 216 compounds. The mixture of compounds from each batch could be tested and any batch that give a hit could be reprepared using the same method, but to get 8 pure compounds would only require a 2 by 2 by 2 procedure.

Another aspect of the invention involves a deconvolution approach wherein the mixtures of compounds synthesized by the combinatorial methods of this invention that have been assayed and are shown to have activity, are separated by chromatography (for example, consecutive HPLC using different columns and conditions known to the skilled artisan) and identified by mass spectroscopy.

Applications of the combinatorial synthesis methods for creating additional libraries of compounds within the scope of this invention are shown below in Schemes (V) to (IX), which utilize as templates for the synthesis, the core structures of benzodiazepines, N-phenylimidazoles, oxindoles and indole carboxylic acids or amides. The libraries depicted in Schemes (V) to (IX) may be prepared on a solid support or they may be prepared in solution.

SCHEME (V)

Benzodiazepine Synthesis

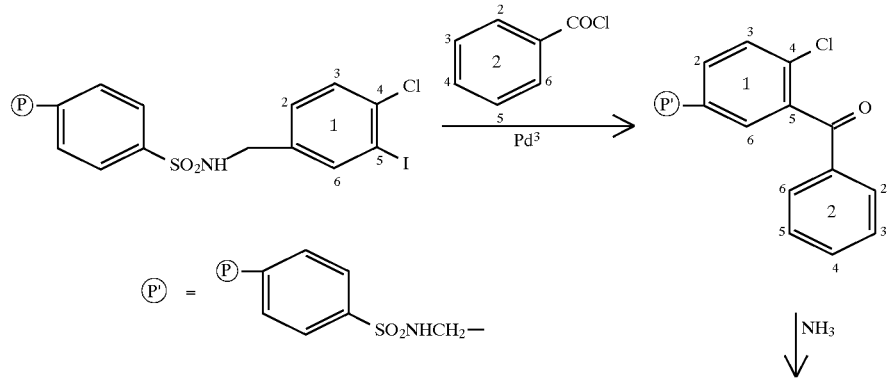

-continued
SCHEME (V)

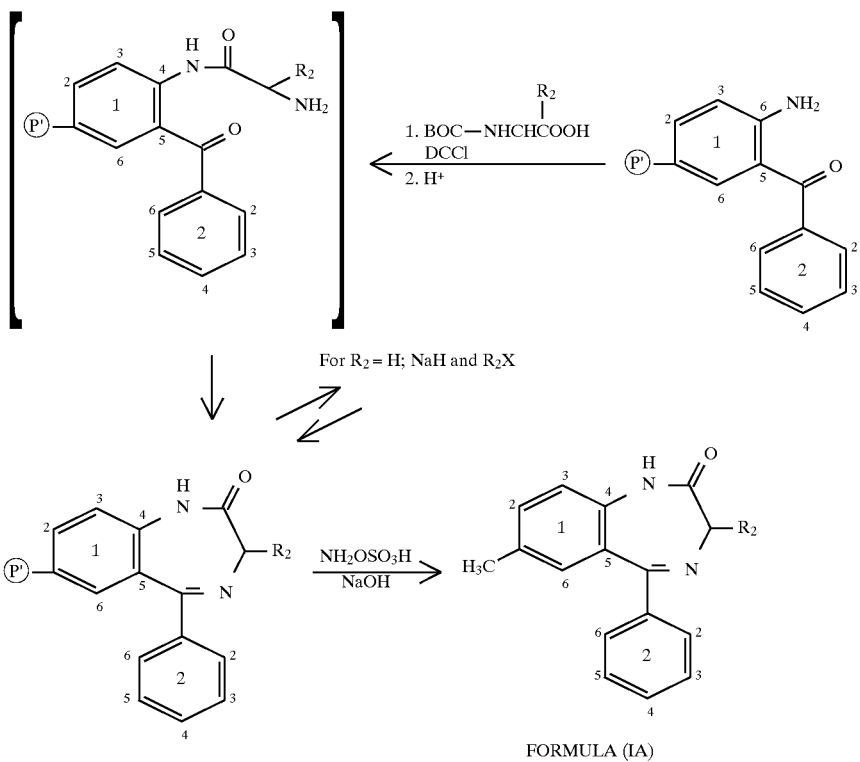

wherein the substituents at positions 2 through 6 on rings 1 and 2 are, independently from one another, hydrogen, alkyl, alkoxy, halogen, —OH, optionally substituted heteroaryl or optionally substituted aryl; and $R_2$ is hydrogen, alkyl, alkenyl, alkynyl, alkoxy, thioalkyl, optionally substituted heteroaryl, optionally substituted aralkyl, carboxyalkyl, aminoalkyl or optionally substituted aryl.

SCHEME (VI)

N-Phenylbenzimidazole-5-acrylic Acid Synthesis-1

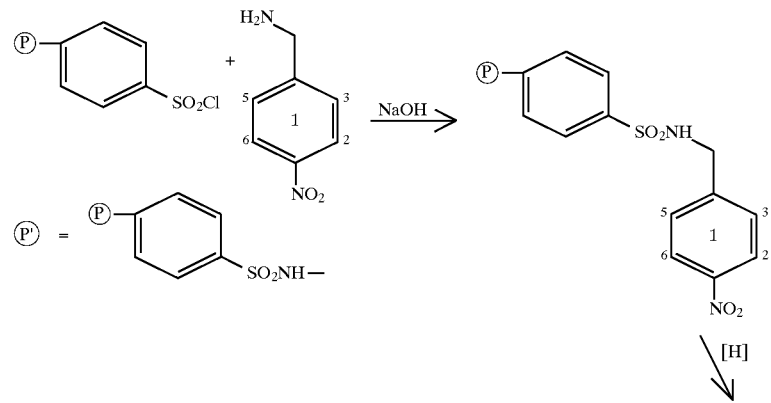

-continued
SCHEME (VI)

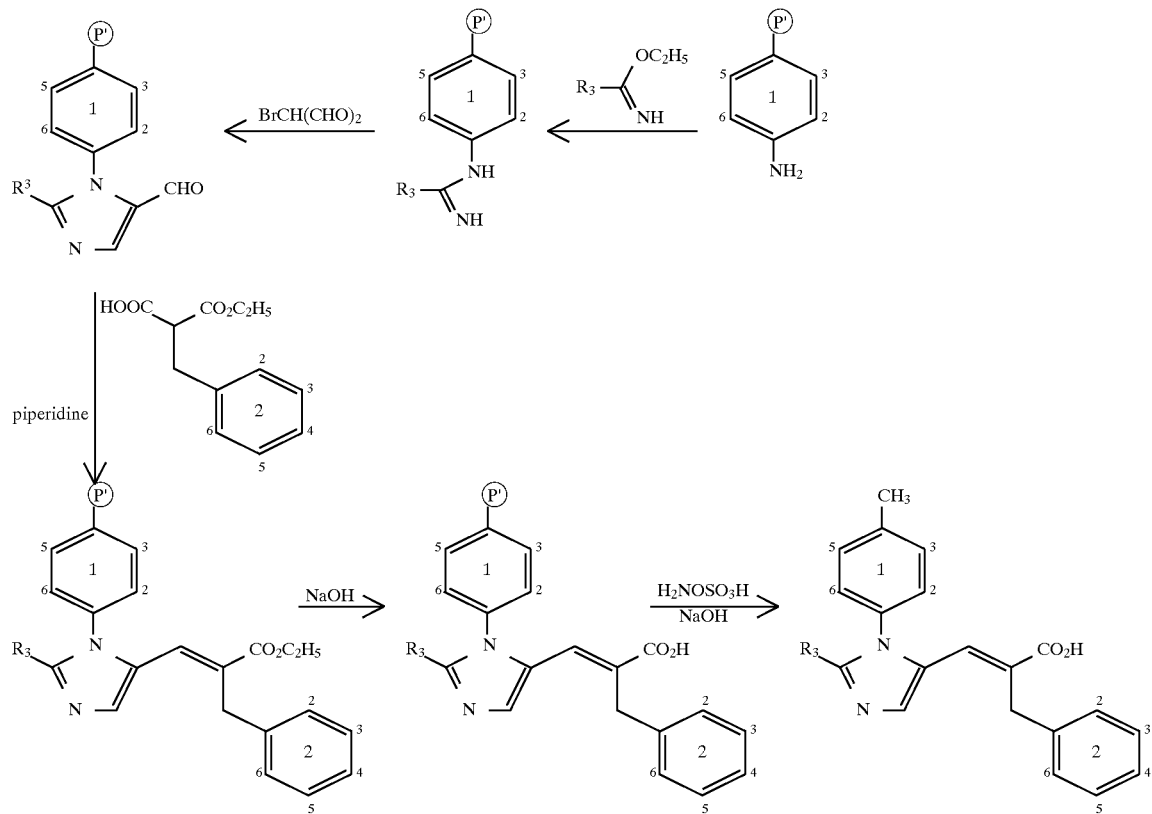

wherein the substituents at positions 2, 3, 5 and 6 on ring 1 and the substituents at positions 2 through 6 on ring 2 are, independently from one another, hydrogen, alkyl, alkoxy, halogen, —OH, optionally substituted heteroaryl or optionally substituted aryl; and $R_3$ is hydrogen, alkyl, alkenyl, alkynyl, alkoxy, thioalkyl, optionally substituted heteroaryl, optionally substituted aralkyl, carboxyalkyl, aminoalkyl or optionally substituted aryl.

SCHEME (VII)

N-Phenylimidazole-5-acrylic Acid Synthesis-2

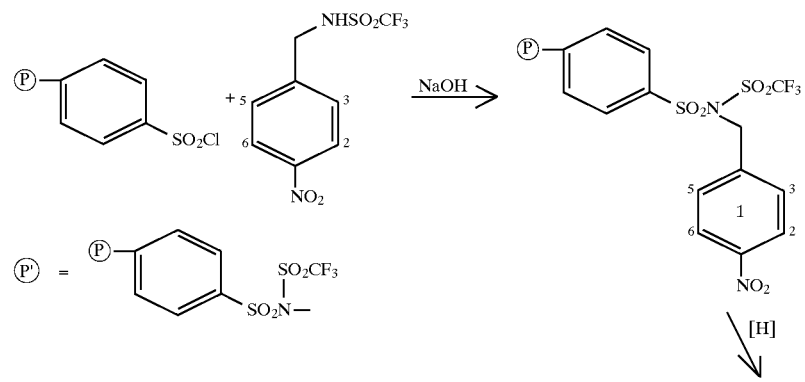

-continued
SCHEME (VII)

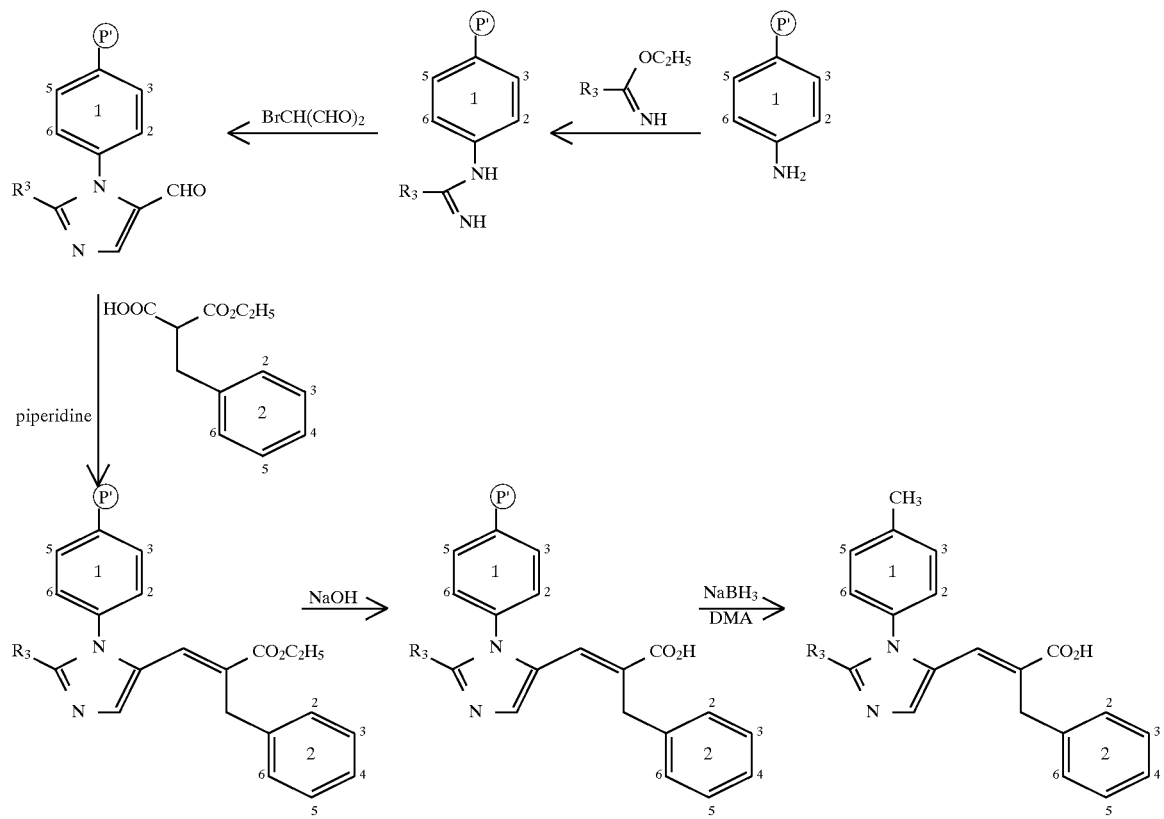

FORMULA (IIA)

wherein the substituents at positions 2, 3, 5 and 6 on ring 1 and the substituents at positions 2 through 6 on ring 2 are, independently from one another, hydrogen, alkyl, alkoxy, halogen, —OH, optionally substituted heteroaryl or optionally substituted aryl; and $R_3$ is hydrogen, alkyl, alkenyl, alkynyl, alkoxy, thioalkyl, optionally substituted heteroaryl, optionally substituted aralkyl, carboxyalkyl, aminoalkyl or optionally substituted aryl.

SCHEME (VIII)

Synthesis of Oxindoles

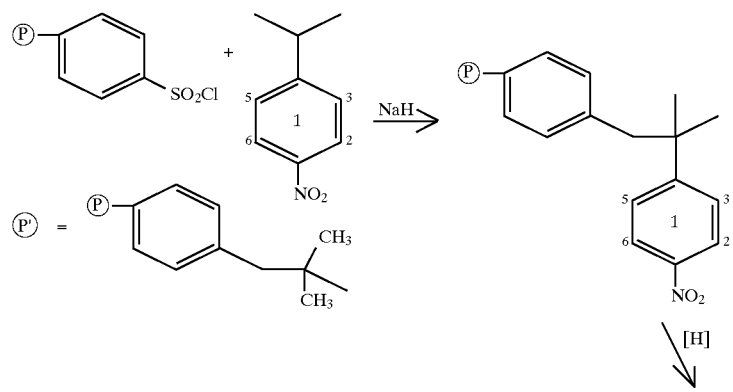

SCHEME (VIII)
-continued

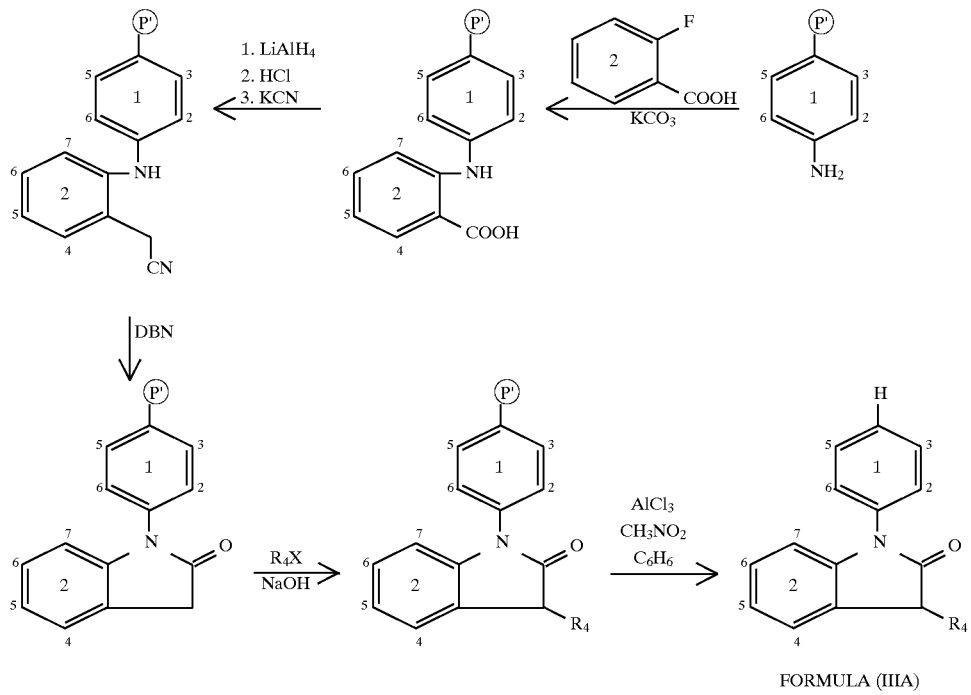

wherein the substituents at positions 2, 3, 5 and 6 on ring 1 and the substituents at positions 4 through 7 on ring 2 are, independently from one another, hydrogen, alkyl, alkoxy, halogen, —OH, optionally substituted heteroaryl or optionally substituted aryl; and $R_4$ is hydrogen, alkyl, alkenyl, alkynyl, alkoxy, thioalkyl, optionally substituted heteroaryl, optionally substituted aralkyl, carboxyalkyl, aminoalkyl or optionally substituted aryl.

SCHEME (IX)

Synthesis of Indole-2-Carboxylic Acids or Amines

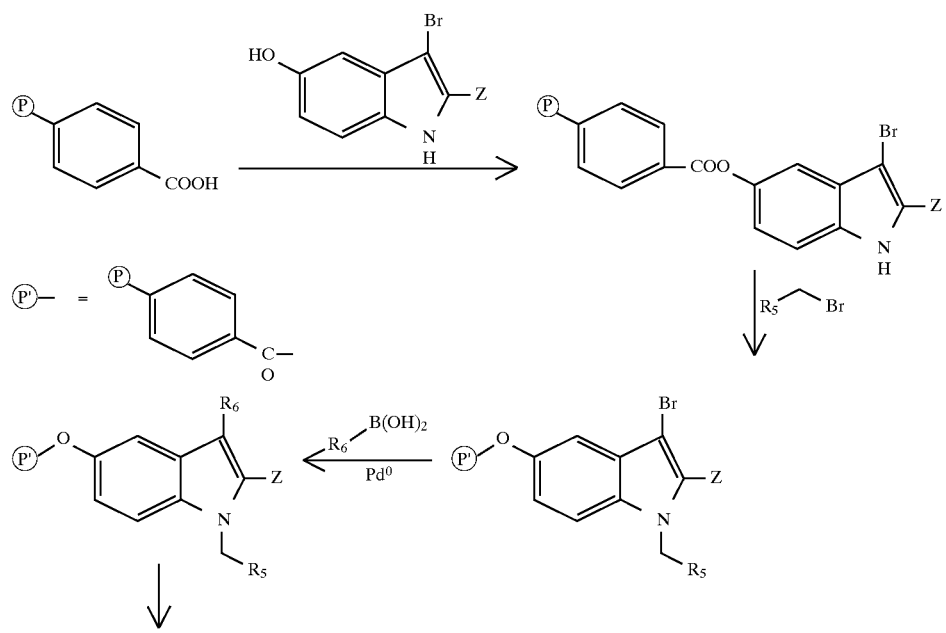

-continued
SCHEME (IX)

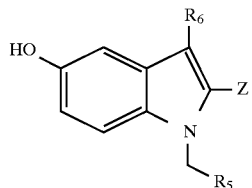

FORMULA (IVA)

wherein Z is $(CH_2)_rCO_2R_7$ or $(CH_2)_sN(R_7)_2$; $R_7$ is hydrogen or alkyl; r is an integer from 0 to 6; s is an integer from 1 to 6; and $R_5$ and $R_6$ are independently from one another are optionally substituted aryl or optionally substituted heteroaryl. In the above Scheme (IX), following removal from the resin, the phenolic —OH may be capped if desired (e.g., by alkylation).

The following Examples illustrate the creation of a combinatorial library of compounds using (1) an N-phenyl-imidazole-5-acrylic acid core structure wherein the library is deconvoluted by the iterative approach and (2) a 3-amino8-carboxy-2,3,4,5-tetrahydro-H-1-benzazepin-2-one core structure wherein the library is deconvoluted by the scanning approach.

EXAMPLES

Example 1

Preparation of a 125 Member Combinatorial Library Based on N-phenyl-imidazole-5-acrylic Acids as the Core Structure Dowex 50w strongly acidic cation exchange resin, 2% cross-linked, dry mesh size 200–400, 0.6 meq/mL unit capacity, 74–82% moisture content is used. It is washed as described by Farrall and Frechet, *J. Org. Chem.*, 41, p. 3877 (1976), however, using NaOH as the final aqueous wash which leaves the resin in the sodium form. This is dried under vacuum at 80° C. for 18 hours before use.

The washed resin (100 g dry weight, 300 meq of sulfonic acid) is treated with sulfonyl chloride (81 g, 600 meq) in toluene (500 mL) at reflux for 6 hr. The resin is collected by filtration and washed 3 times with dichloromethane to remove unreacted sulfonyl chloride and then dried under vacuum at 60° C. to give chlorosulfonyl resin. For a three stage sequence using 5 different reagents at each stage, five hundred mg portions (1.5 meq) of resin are placed in each of 125 coarse fritted glass gas dispersion tubes which are numbered with 3 digits, each digit indicating the reagent number that it will be reacted with, and its position in the sequence stage. The 25 tubes which will be reacted with the same reagent in stage 1 are placed in a action kettle with the reaction solution. Stirring is accomplished by sonication usually 10 sec every 2 minutes. Supplemental mechanical stirring of the gross reaction kettle is also carried out. The reaction kettle temperature can be controlled by appropriate baths, and the reaction kettle head can be equipped with sonicators, condensers, temperature probes, gas inlet tubes, and other necessary equipment. The synthesis of 1-phenyl-2-substituted-imidazol-5-benzylacrylic acids is carried out according to Scheme VII using the following key reagents:

Stage 1: The benzylamines: 2-methoxy-5-nitro-, 2-ethoxy-5-nitro, 2chloro-5nitro-, 2,3-methylenedioxy-5-nitro-, and 2,4dimethoxy-5-nitro-.

Stage 2: The methyl imino ethers prepared from the following nitriles: acetonitrile, valeronitile, benzonitrile, 3-phenylpropionitrile, and ethylthioacetonitrile.

Stage 3: The following benzylmalonic acid monoethyl esters: 3,4-methylenedioxy-, 3,4,5-trimethoxy-, 3,4-dimethoxy-, 4-methoxy-, and 3-methoxy-.

Each reagent is reacted with the appropriate 25 tubes which contain a total of 37.5 meq of reactive sites. To ensure completeness of reaction a large excess of reagent is used. Thus for stage 1, each batch of 25 tubes in a reaction kettle is treated with a solution of 150 meq of the nitrobenzylamine dissolved in THF at 25° C. for 18 hrs. The reaction solution is removed and the resin product washed 3 times with DMF and then with water twice. The nitro groups in each batch of tubes are then reduced by slowly adding a solution of 31.5 g of sodium hydrosulfite in 160 mL of water to the tubes immersed in 300 mL of ethanol. When the addition is complete the mixture is heated at 75° C. for 2 hrs, cooled, and the reaction solution removed. The resin is washed 3 times with water, then in turn with methanol, tetrahydrofuran, and twice with methylene chloride.

The tubes are then resorted so that 5 tubes from each of the stage 1 reagents are bundled together for stage 2. Each stage 2 bundle of 25 tubes is then treated with 150 meq of imino ether using only enough toluene as a diluent to ensure that the resin is fully immersed. After heating for 3 hr at 100° C., the reaction mixture is diluted with isopropanol, the solvent removed, and the resin washed 3 times with fresh isopropanol. This gives resin bound N-phenylamidine. Each stage 2 bundle is then treated with a solution of 22.7 g (150 meq) of bromomalonaldehyde, 16.2 g (160 meq) of triethylamine, and 11.25 g (187.5 meq) of acetic acid in 400 mL of isopropanol at 80° C. for 18 hr. The reaction solvent is removed and the resin washed twice with isopropanol, once with tetrahydrofuran, and twice with benzene to give resin-bound N-phenylimidazole-5-aldehydes.

The tubes are then resorted so that 5 groups of 25 tubes are obtained with each of the tubes in a group having been reacted with a unique set of stage 1 and stage 2 reagents. This gives the stage 3 bundles each of which are then treated with 750 meq of the appropriate monoethyl benzylmalonate, 6.4 g (75 meq) of piperidine, and 1 g of p-toluic acid in 500 mL of benzene at reflux for 18 hrs using a Dean-Stark trap to remove water. The reaction solvent is then removed and the resin washed twice with toluene and twice with methanol to give resin bound imidazole-5-acrylic acid ester. This is treated with a mixture of 200 mL of methanol and 100 mL of 10% aqueous sodium hydroxide at reflux for 3 hrs. Removal of the reaction solution and washing twice with water gives the resin bound acrylic acid as the sodium salt.

For removal of the final product from the resin each tube is placed in a separate test tube containing 3 mL of 10% sodium hydroxide solution and heated to 95° C. Hydroxylamine-O-sulfonic acid (50 mg) is added portionwise over 30 minutes, and then the reaction is kept at 95° C. for an additional 1 hr. The reaction pH is brought to 4.5 with 6N HCl and the tube removed from the aqueous solution, placed in a fresh test tube and extracted twice with ethyl acetate. The aqueous reaction mixture is also extracted twice with ethyl acetate, and the combined organic layers dried over MgSO$_4$ and evaporated to dryness under an argon stream at 40° C. The residue is taken up in dimethylsulfoxide and aliquots subjected to biological screening.

This procedure gives a library containing 125 individual compounds. If two reagents were combined and used instead of using one reagent at each stage, the process would give 125 samples each containing 8 compounds for a total of 1000 compounds. Following bioassay of the samples as mixtures, active samples are deconvoluted either by combinatorial single reagent synthesis using only the reagents the sample was derived from, or by separation and identification of the individual compounds.

Example 2

Preparation of a Combinatorial Library Based on 3-Amino-8-carboxy-2,3,4,5-tetrahydro-1H-1-benzazepin-2-one as the Core Structure of Formula (V)

This example illustrates the creation of a scanning combinatorial library based on the aminobenzazepine core structure. The library consists of 8-carboxamido-benzazepinones of formula (VA) wherein W is —CONH$_2$ and wherein the 3-amino group is acylated and the azepine nitrogen is aklylated. The acyl substituent R$_8$ and the alkyl substituent R$_9$ are, independent from one another, optionally substituted alkyl, optionally substituted aryl or optionally substituted aralkyl moieties.

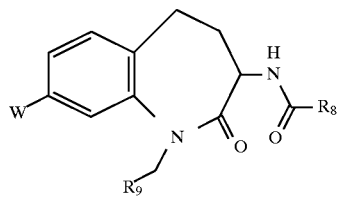

Formula (VA)

Library A is created consisting of m collections of n compounds in each collection, wherein m and n are integers as described above. Each collection in library A contains molecules with a known alkyl substituent R$_9$ in combination with the complete collection of acyl substituents R$_8$. The acylation and alkylation of the aminobenzazepine core structure are performed independently of each other and in any order. The aminobenzazepine core structure is acylated in n separate reaction vessels with different activated carboxylic acids bearing substituents R$_8$, yielding n acylated benzazepinones. These are then recombined and partitioned into m different reaction vessels and alkylated with m different alkylating agents bearing substituents R$_9$.

Library B is created consisting of n collections of m compounds in each collection. Each collection in library B contains molecules with a known acyl substituent R$_8$ in combination with the complete collection of alkyl substituents R$_9$. The acylation and alkylation of the aminobenzazepine core structure are performed independently of each other and in any order. The starting aminobenzazepine is partitioned into m different reaction vessels and alkylated with m different alkylating agents, wherein the alkylating agents are that same as those which are used for creating library A, as defined above. These alkylated aminobenzazepines are then recombined and partitioned into n different reaction vessels for acylation with n different activated carboxylic acids, wherein the activated carboxylic acids are the same as those which are used for creating library A, as defined above.

By evaluating the biological activity of each collection in library A and library B, one skilled in the art can determine the optimal substituents R$_8$ and R$_9$ independently.

The scanning combinatorial library is conveniently prepared by solid phase synthesis starting with 3-t-butyloxycarbonylamino-8-carboxy-2,3,4,5-tetrahydro-1H-1-benzazepin-2-one (12) which is loaded onto benzhydrylamine resin using carbodiimide/dimethylaminopyridine. For the acylation ion, the Boc group is removed with 50% TFA/CH$_2$Cl$_2$ and the amine salt neutralized with diisopropylethylamine. Acylation of the free amine is conveniently carried out with the acid chloride of the required carboxylic acid. Alkylation of the benzazepine nitrogen is carried out using excess sodium hydride in DMF with appropriate alkyl or arylmethyl halides or triflates. The completed alkyl-acyl-benzazepine is cleaved from the resin with liquid HF to yield the carboxamide, i.e., a compound of formula (VA) wherein W is CONH$_2$.

Attachment of the starting protected aminobenzazepinone to hydroxymethylated polystyrene yields carboxylic acid derivatives when cleaved with liquid HF, i.e., a compound of formula (VA), wherein W is CO$_2$H. In addition, attachment of the starting protected aminobenzazepinone to hydroxymethylated polystyrene yields ester derivatives when cleaved by transesterification (ROH/Et$_3$N), i.e., a compound of formula (VA), wherein W is CO$_2$R, and wherein R is optionally substituted alkyl, optionally substituted aryl, optionally substituted aralkyl, optionally substituted heteroaryl or optionally substituted heteroaralkyl. Further, attachment of the starting protected aminobenzazepinone to hydroxymethylated polystyrene yields alcohol derivatives when cleaved reductively, i.e., a compound of formula (VA), wherein W is —CH$_2$OR, and wherein R is hydrogen. It is also clear that one could use more acid-labile resins such as Wang resin (cleaved with 95% TFA/5% H$_2$O) or Sasrin resin (cleaved with 2% TFA/CH$_2$Cl$_2$) if orthogonal amino protection such as Fmoc is used in the methods of this invention. It is clear that one skilled in the art will recognize that there are a variety of other solid supports, protecting group strategies and cleavage strategies which can be included in the above embodiments of the invention.

In one embodiment of this invention, the biological assay is configured so that the skilled artisan practicing the invention can leave the ligand attached to a suitable polymer, for example, the hydrophilic Tentagel or polyethyleneglycol-polystyrene supports, during evaluation of the biological activity of the ligand.

Methyl-2-nitro-4-carboxy-benzoate (6)

To a stirred solution of di-methyl nitroterephthalate ((5), 12g, 50 mMol) in dioxane (100 mL) at room temperature was slowly added dropwise aq. 1N NaOH (50 mL) over 30 minutes. After stirring for 16 h at room temperature the reaction was diluted with water, washed with ether, acidified with aq. 1N HCl (50 mL) then extracted with 10% n-BuOH in ethyl acetate (2×100 mL). After drying (MgSO$_4$) over ethyl acetate and evaporation under reduced pressure the resulting residue was purified by flash chromatography on silica gel eluted with (98:2:0.1) CHCl₃, MeOH, HOAc to give product (6) (8.07 g, 72%) as a white solid.

¹H-NMR (CDCl₃) d 3.96 (3H, s), 7.80 (1H, d), 8.36(1H, dd), 8.57 (1H, d); TLC R_f 0.51 (95.4:1 CHCl₃, MeOH, H₂O)

2-Nitro-4-t-butoxycarbonyl-benzoic Acid Methyl Ester (7)

To a stirred suspension of the above acid ((6), 7.0 g, 31 mMol) in toluene (25 mL) was added oxalylchloride (5 mL) followed by one drop of dry DMF. After stirring for 16 h (the solution became clear after ~30 minutes) the reaction was evaporated to dryness and re-evaporated from fresh toluene (2×100 mL). To the resulting acid chloride in CHCl₃ (10 mL) with stirring at 0° C. was added t-BuOH (1 mL) followed by pyridine (0.6 mL). The reaction was allowed to warm to room temperature and stirred for 6 h. The resulting reaction was stripped of solvent, taken up in ethyl acetate, washed with aq. 1N NaHCO₃, brine, dried (MgSO₄) and evaporated under reduced pressure. Purification by flash chromatography on silica gel eluted with 10% ethyl acetate in hexane gave product (7) (7.28 g, 83%) as a clear oil.

TLC R_f 0.57 (20% EtOAc, n-hexane); ¹H-NMR (CDCl₃) d 1.6 (9H, s), 3.95 (3H, s), 7.83 (1H, d, J=8 Hz), 8.3 (1H, dd), 8.5 (1H, d, J=2 Hz)

2-Nitro-4-t-butoxycarbonyl-benzoylfluoride (8)

To a stirred solution of the above di-ester ((7), 7.28 g, 26 mmol) in dioxane (100 mL) was added aq. 1N NaOH (30 mL). The reaction was stirred for 6 h, acidified with aq. 1N HCl (30 mL), extracted with ethyl acetate, washed with brine, dried (MgSO₄) and evaporated under reduced pressure to give the corresponding acid which was used as is in the next reaction. To a stirred solution of the above acid (6.68 g, 25 mMol) under Ar in dry CH₂Cl₂ (75 mL) was added pyridine (2.1 mL, 25 mMol) followed by cyanuric fluoride (1.56 mL, 17 mMol). After stirring for 2 h the reaction became a thick suspension. The reaction was then evaporated under reduced pressure, taken up in ether (150 mL) and filtered through a pad of celite to remove insoluble materials. The filtrate was washed with cold water, dried (MgSO₄), filtered and evaporated under reduced pressure to give the crude acid fluoride (8) as a clear oil.

Benzyl-2(R)-[(t-butoxycarbonyl)amino]-4-oxo-4-(o-nitro-p-t-butoxycarbonyl-phenyl)butanoate (10)

To a stirred solution of the organozinc reagent ((9), 0.75 mMol) prepared from D-serine as in references 1–3) in dry THF at 35° C. was added Bis(triphenylphosphine)-palladium dichloride (0.028 g, 0.04 mMol) followed by a solution of the acid fluoride (4, 0.75 mMol) prepared above in dry THF. The reaction was stirred for an additional 30 minutes, diluted with ethyl acetate (50 mL) and filtered into a separatory funnel. Sequential washing with aqueous hydrochloric acid (20 mL, 0.1M), and distilled water (3×20 mL) followed by drying over anhydrous Na₂SO₄, filtration and concentration under reduced pressure gave a crude reaction product. Flash chromatography over silica gel eluted with ethyl acetate in hexane gave the title compound (10).

2(R)-[(t-butoxycarbonyl)amino]-4-oxo-4-(o-amino-p-t-butoxycarbonyl-phenyl)butanoic Acid (11)

The above nitro compound (10) was hydrogenated in a Parr apparatus over 10% Pd/C in acetic acid at 50 psi H₂ for 3 h. Filtration of the catalyst through Celite®, rinsing with acetic acid and evaporation of the filtrate gave a residue which was crystallized from MeOH/ether to give product (11).

3(R)-[(t-butoxycarbonyl)amino]-8-carboxy-2,3,4,5-tetrahydro-2-oxo-1H-1-benzazepine (12)

To a stirred solution of the above (11) (0.71 mMol) in dry DMF (20 mL) at 0° C. in a dewar flask was added triethylamine (200 mL, 1.42 mMol), NaHCO₃ (300 mg, 3.57 mMol), and finally diphenylphosphorylazide (250 mL, 1.2 mMol). After stirring at 0° C. for 24 h the reaction was evaporated under reduced pressure, taken up in ethyl acetate (100 mL), washed with H₂O, brine, dried (MgSO₄), filtered and evaporated. The remaining residue was purified by silica gel chromatography eluted with ethyl acetate in hexane. The fully protected intermediate obtained was then treated with 50% trifluoroacetic acid in CH₂Cl₂ (15 mL) for 45 min. at room temperature, evaporated under reduced pressure, triturated with ether, filtered and dried under vacuum to give the fully deprotected intermediate. This was treated with di-t-butyldicarbonate and triethylamine overnight at room temperature in DMF, evaporated under reduced pressure, taken up into ethyl acetate and washed with 1N NaHSO₄, water and brine, dried (MgSO₄), filtered and evaporated. The residue was purified by silica gel chromatography eluted with ethyl acetate in hexane to give the title product (12).

Procedure for Attaching 3-t-butyloxycarbonylamino-8-carboxy-1-benzazepin-2-one to BHA resin

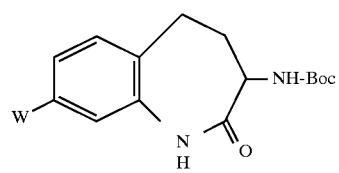

2

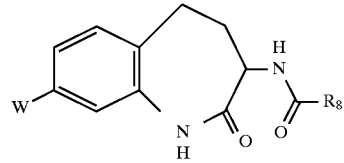

3

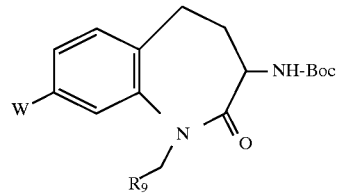

4

An aliquot of 1.1 equivalents of (2) (wherein W is CO₂H) based on the substitution of amino groups on the BHA resin is dissolved in DMF (10 mL/g resin used) and added to the resin in a peptide shaker vessel. Dimethylaminopyridine (1.1 equiv.) in CH₂Cl₂ (5 mL/g resin) is added followed by diiospropylcarbodiimide (1.1 equiv.) in CH₂Cl₂ (5 mL/g resin) and the reaction is shaken overnight. The resin is collected by filtration and washed with CH₂Cl₂.

General Procedure for Acylation

The Boc group of (2) or (4) (wherein W is CO-BHA resin) is removed by treatment with 50% TFA/CH₂Cl₂ for 20 minutes. The resin is washed with CH₂Cl₂ and the amine salt neutralized by washing several times with 7% DIEA/

$CH_2Cl_2$. The appropriate acid chloride (1.2 equivalents, pre-formed by the reaction of oxalyl chloride with the corresponding carboxylic acid) is then added in $CH_2Cl_2$ followed by DIEA (1.3 equiv.) and reaction is allowed to proceed for 3 hr. or until complete (by Kaiser ninhydrin test). The resin is collected by filtration and washed with $CH_2Cl_2$.

General Procedure for Alkylation

Benzazepinone (2) or (3) (wherein W is CO-BHA resin) is treated with NaH (1.3 equiv.) in DMF for 15 minutes followed by the appropriate alkylating agent $R_2CH_2E$ (wherein E is halogen, triflate) for 1.5 hr at room temperature. The resin is washed with 50% aqueous isopropanol, DMF and finally $CH_2Cl_2$ and is collected by filtration.

General Procedure for Cleavage From Resin

The completed acylated, alkylated aminobenzazepinone (formula (VA)) (wherein W is CO-BHA resin) is treated with anhydrous liquid HF (10 mL/g resin) at 0° C. for one hour. The HF is removed by evaporation and the resin is triturated with $CH_2Cl_2$, DMF and MeOH. The combined filtrates are evaporated to yield the free aminobenzazepinone (formula (VA)) (wherein W is $CONH_2$).

Example 3

Preparation of a Combinatorial Library Based on 3-Amino-7-carboxy-2,3,4,5-tetrahydro-1H-1-benzazepin-2-one as the Core Structure The following compounds labeled 1 to 8 were prepared in solution as intermediates for making the compounds labeled 11 to 15. Compounds 9 and 10 are bound to a BHA resin, variously derivatized and cleaved to give the compounds 11 to 15.

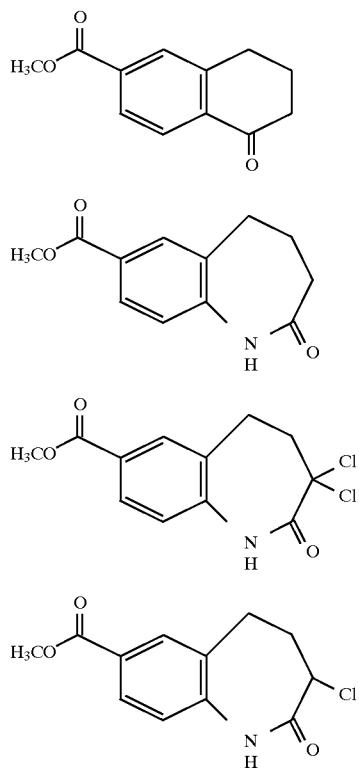

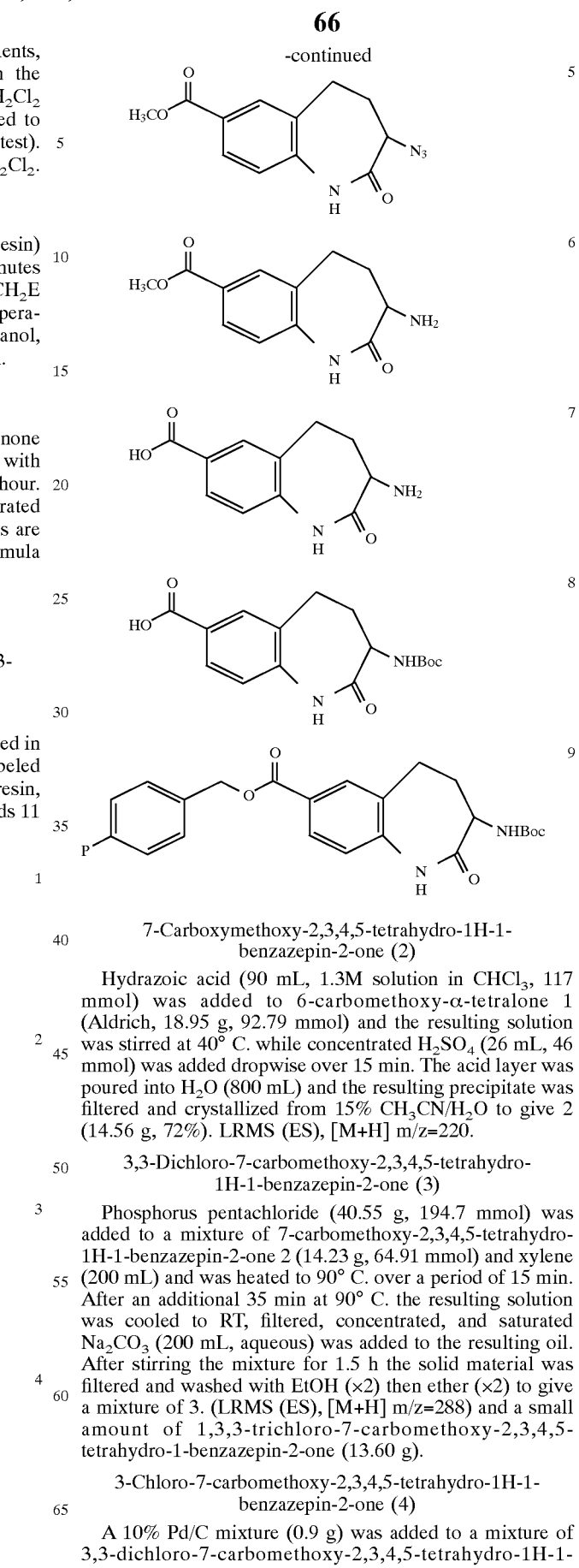

7-Carboxymethoxy-2,3,4,5-tetrahydro-1H-1-benzazepin-2-one (2)

Hydrazoic acid (90 mL, 1.3M solution in $CHCl_3$, 117 mmol) was added to 6-carbomethoxy-α-tetralone 1 (Aldrich, 18.95 g, 92.79 mmol) and the resulting solution was stirred at 40° C. while concentrated $H_2SO_4$ (26 mL, 46 mmol) was added dropwise over 15 min. The acid layer was poured into $H_2O$ (800 mL) and the resulting precipitate was filtered and crystallized from 15% $CH_3CN/H_2O$ to give 2 (14.56 g, 72%). LRMS (ES), [M+H] m/z=220.

3,3-Dichloro-7-carbomethoxy-2,3,4,5-tetrahydro-1H-1-benzazepin-2-one (3)

Phosphorus pentachloride (40.55 g, 194.7 mmol) was added to a mixture of 7-carbomethoxy-2,3,4,5-tetrahydro-1H-1-benzazepin-2-one 2 (14.23 g, 64.91 mmol) and xylene (200 mL) and was heated to 90° C. over a period of 15 min. After an additional 35 min at 90° C. the resulting solution was cooled to RT, filtered, concentrated, and saturated $Na_2CO_3$ (200 mL, aqueous) was added to the resulting oil. After stirring the mixture for 1.5 h the solid material was filtered and washed with EtOH (×2) then ether (×2) to give a mixture of 3. (LRMS (ES), [M+H] m/z=288) and a small amount of 1,3,3-trichloro-7-carbomethoxy-2,3,4,5-tetrahydro-1-benzazepin-2-one (13.60 g).

3-Chloro-7-carbomethoxy-2,3,4,5-tetrahydro-1H-1-benzazepin-2-one (4)

A 10% Pd/C mixture (0.9 g) was added to a mixture of 3,3-dichloro-7-carbomethoxy-2,3,4,5-tetrahydro-1H-1- benzazepin-2-one 3 and 1,3,3-trichloro-7-carbomethoxy-2,3,4,5-tetrahydro-1-benzazepin-2-one (9.34 g), NaOAc (5.51 g, 40.5 mmol), and glacial acetic acid (25 mL). After stirring under a hydrogen atmosphere (balloon) at RT for 3.5 h and at 60° C. for an additional 30 min, the reaction mixture was filtered (celite) and concentrated. The resulting material was partitioned between saturated $NaHSO_4$ (aqueous) and $CH_2Cl_2$. The organic layer was removed and the aqueous layer was extracted with $CH_2Cl_2$ (×2). The combined organic extracts were dried ($Na_2SO_4$) and concentrated to give 4 (3.6 g). LRMS (ES), [M+H] m/z=254.

3-Azido-7-carbomethoxy-2,3,4,5-tetrahydro-1H-1-benzazepin-2-one (5)

A solution of 3-chloro-7-carbomethoxy-2,3,4,5-tetrahydro-1H-1-benzazepin-2-one 4 (3.50 g, 13.8 mmol) and $NaN_3$ (1.08 g, 16.6 mmol) in DMSO (100 mL) was stirred at RT for 22 h, then heated at 75° C. for an additional 2 h. The resulting solution was poured into ice water (500 mL) and the resulting precipitate was filtered and dried under vacuum to give 5 (3.26 g, 91%). $^1H$ NMR (250 MHz, $CDCl_3$) δ 8.09 (1H, brs, H-1), 7.93 (2H, m, H-6,8), 7.10 (1H, d, j=6.5 Hz, H-9), 3.93 (3H, s, $OCH_3$), 3.88 (1H, dd, j=8.0, 11.5 Hz, H-3), 3.01 (1H, ddd, j=8.0, 13.5, 13.5 Hz, H-5), 2.82 (1H, m, H-5), 2.59 (1H, m, H-4), 2.36 (1H , H-4).

3-Amino-7-carbomethoxy-2,3,4,5-tetrahydro-1H-1-benzazepin-2-one (6)

A suspension of Raney Nickel (15.09 g, pre-wash weight, washed with $H_2O$ (×3) then isopropanol (×3)), in isopropanol (20 mL) was added to a suspension of 3-azido-7-carbomethoxy-2,3,4,5-tetrahydro-1H-1-benzazepin-2-one 5 in isopropanol (100 mL). After 1.5 h the reaction mixture was filtered (celite), concentrated, and fractionated by flash column chromatography (12% $MeOH/CHCl_3$) to give 6 (1.75 g, 60%). LRMS (ES), [M+H] m/z=235.

3-Amino-7-carboxy-2,3,4,5-tetrahydro-1H-1-benzazepin-2-one (7)

A solution of NaOH (0.44 g, 11 mmol) in $H_2O$ (12 mL) was added to a suspension of 3amino-7-methoxy-2,3,4,5-tetrahydro-1H-1-benzazepin-2-one 6 (1.72 g, 7.34 mmol) in $H_2O$ (100 mL) and MeOH (20 mL). After 5 h the resulting solution was neutralized with HCl (1M, 11 mL) and concentrated to give 7 (2.41 g, theoretically containing approx. 33% NaCl by weight). LRMS (ES), [M+H] m/z=221.

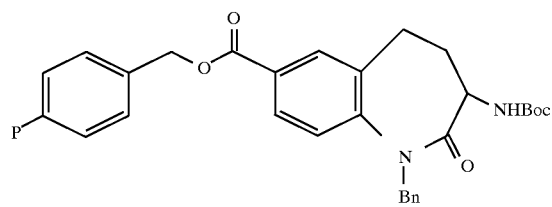

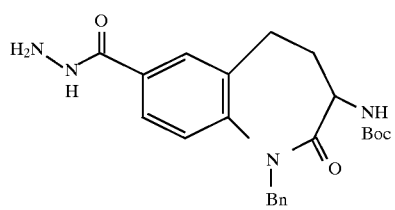

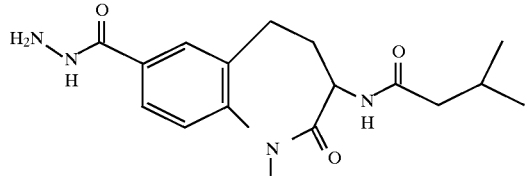

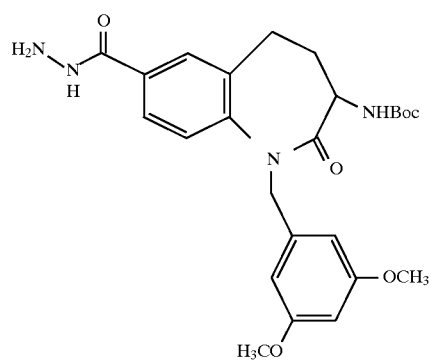

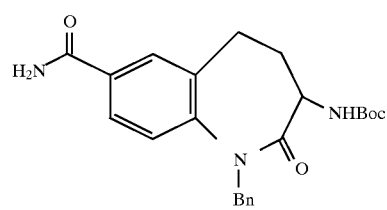

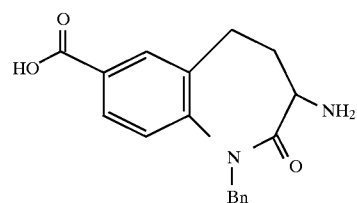

Compound (9)

DIEA (1.06 mL, 6.09 mmol) and $Boc_2O$ (0.73 g, 3.35 mmol) were added to a solution of 3-amino-7-carboxy-2,3,4,5-tetrahydro-1H-1-benzazepin-2-one 7 (1.00 g, 3.05 mmol) in DMF (20 mL). After 20 h the solution was concentrated and partitioned between $CHCl_3$ and 1M HCl. The organic layer was removed, and the aqueous layer was extracted with $CHCl_3$ (×2). The combined organic extracts were dried ($Na_2SO_4$) and concentrated. The resulting N-t-butoxycarbonyl protected compound 8 (LRMS (ES), [M+H] $^{m/z}$=321) was dissolved in MeOH (20 mL) and a 20% w/w $CsHCO_3/H_2O$ solution was added to pH 7. The resulting cesium salt was concentrated and dissolved in DMF and re-concentrated (×2), and was then dissolved in DMF (15 mL) and added to Merrifield resin (2.77 mmol, 1% cross-linked, 1 mmol/g substitution). The mixture was rotated in a 50° C. bath for 20 h and was then filtered, washed with DMF, then MeOH, and dried under vacuum to give the substituted resin 9 (3.35 g). The resin was then capped: A 20% w/w $CsHCO_3/H_2O$ solution was added to a solution of HOAc (0.34 mL, 6 mmol) and MeOH (15 mL) to pH 7. The resulting solution was concentrated and the salt was dissolved in DMF and concentrated (×2), dissolved in DMF (30 mL) and added to the substituted resin. The mixture was rotated in a 50° C. bath for 21 h, and was then filtered, washed with DMF, 50% dioxane/$H_2O$, DMF, 50% dioxane/$H_2O$, $CH_2Cl_2$ (×3), and was dried under high vacuum.

Elemental analysis indicated 0.91% Cl, so the capping procedure was repeated but scaled up to 30 mmol of CsOAc. Elemental analysis then indicated 0% Cl, and N analysis indicated a resin substitution of 0.53 mmol.

Compound (11)

A solution of 4-benzyl-2-oxazolidinone (340 mg, 1.92 mmol) in THF (10 mL) under an argon atmosphere was cooled to −78° C. and n-BuLi (0.64 mL, 2.5M solution in hexanes, 1.6 mmol) was added. After 15 min the solution was transferred via cannula to the resin (302 mg, 0.160 mmol), also in the −78° C. bath. The resulting mixture was stirred for 1.5 h, BnBr (0.29 mL 2.4 mmol) followed by DMF (5 mL) was added, and the mixture was removed from the cooling bath and allowed to stir at RT for 19 h. The solvent was removed and the solid was washed with THF, 50% THF/$H_2O$ (×2), THF, and MeOH (×2) to give 10. An anhydrous solution of 50% hydrazine/MeOH (6.0 mL) was added to the resin 10 (375 mg, 0.199 mmol). After stirring for 70 h, the reaction mixture was filtered and the resin was further extracted with MeOH (×2), 50% MeOH/$CH_2Cl_2$ (×2), and $CH_2Cl_2$ (×2), and the combined extracts were concentrated to give 11 (65 mg, 96%). LRMS (ES), [M+H] m/z=425.

Compound (12)

A 50% TFA/$CH_2Cl_2$ solution (excess) was added to the resin and the resulting solution was stirred for 30 min. The solution was removed and the resin was washed with $CH_2Cl_2$ (×3), 7% DIEA/$CH_2Cl_2$ (×3), and $CH_2Cl_2$ (×3). Isovaleric acid (32 μL, 0.30 mmol) NMM (80 μL, 0.79 mmol), HOBT (40 mg, 0.30 mmol) and HBTU (112 mg, 0.30 mmol) were added to a slurry of the above resin in THF (3 mL). After 24 h the solvent was removed by filtration and the resin was washed with DMF (×2) and $CH_2Cl_2$ (×3). The resin was Kaiser negative. The resin was alkylated with benzylbromide and cleaved from the resin with hydrazine according to the procedure outlined for compound 11 to give 12 (32 mg, 79%). LRMS (ES), [M+H] m/z=409.

Compound (13)

The resin 9 (100 mg, 0.053 mmol) was alkylated with 3,5-dimethoxybenzyl chloride and the molecule was removed from the resin with hydrazine according to the procedure outlined for compound 11 to give 13 (21 mg, 82%). LRMS (ES), [M+H] m/z=485.

Compound (14)

Ammonia was bubbled for 20 min through a −20° C. slurry of MeOH/10 (96 mg, 0.051 mmol). The reaction vessel was sealed and heated at 100° C. for 72 h, then cooled to RT, filtered, and the filtrate was concentrated to give 14. LRMS (ES), [M+H] m/z=410.

Compound (15)

The resin 9 (138 mg, 0.0731 mmol) was placed in a sintered glass funnel in a vessel containing TFA at a level below the resin, and the vessel was sealed. After 24 h the funnel was removed from the reaction vessel and placed under high vacuum for 24 h. The resin was then extracted with MeOH (×2), 50% MeOH/$CH_2Cl_2$ (×2), $CH_2Cl_2$ (×2), and MeOH (×2) to give 15 (8 mg, 35%). LRMS (ES), [M+H] m/z=311.

Biological Assays (1) A representative binding assay is as follows. Other binding assays or functional assays that are known by, or that would be obvious to the skilled artisan, may be performed as well. Tissue containing the appropriate target receptor are homogenized, filtered through cheesecloth and centrifuged at 1500×g for 10 minutes. The supernatant is decanted and the pellet is resuspended in an appropriate incubation buffer, e.g. 75 mM Tris.HCl, pH 7.4 containing 12.5 mM $MgCl_2$ and 1.5 mM EDTA. Membranes equivalent to 100 g protein are incubated with 50 pmol radiolabeled receptor ligand and an appropriate amount of the test library mixture in a total volume of 500 1 for 1 hr. at 37° C. The binding reaction is terminated by dilution with the addition of 5 mL of cold incubation buffer and the bound tracer is separated from free by filtration on Whatman GF/C filter paper. The filter paper is washed several times with cold incubation buffer and then counted to determine the amount of bound ligand.

Specific binding is defined as the portion of radiolabeled receptor ligand binding which can be completed by a high concentration of unlabeled receptor ligand. The presence of a competing ligand in the library test mixture is evidenced by a reduction in specific binding of the radiolabeled receptor ligand in the presence of the library test mixture.

(II) An additional assay that is effective and extremely useful for testing the aromatic carbocycles prepared according to this invention is disclosed by Lerner et al., *Proc. Natl. Acad. Sci. USA.*, 91(5), pp. 1614–1618 (1994), which is inflated by reference herein.

The above description fully discloses the invention including preferred embodiments thereof. Modifications and improvements of the embodiments specifically disclosed herein are within the scope of the following claims. Without further elaboration it is believed that one skilled in the art can, using the preceding description, utilize the present invention to its fullest extent. Therefore any examples are to be construed as merely illustrative and not a limitation on the scope of the present invention in any way. The embodiments of the invention in which an exclusive property or privilege is claimed are defined as follows.

What is claimed is:

1. A method for preparing a resin-bound compound, wherein the compound is an aromatic carbocycle comprising an aromatic carbon atom and at least one substituent, X, A, B or C, said method comprising the steps of:

(i) coupling the aromatic carbon to a polymeric resin support through a silane linker to give a resin-bound aryl silane intermediate; and (ii) performing additional synthetic chemistry on at least one substituent, X, A, B or C, in order to modify said substituent, with the proviso that not all of substituents X, A, B or C are hydrogen and not all of X, A, B or C are alkyl.

2. The method of claim 1 wherein the silane linker is D-$CH_2$—Si—R"R'", and wherein R" and R'" are independently, $C_1$ to $C_6$ alkyl and D is a $C_1$ to $C_{20}$ alkyl chain optionally having one or more intervening heteroatoms or aryl groups.

3. The method of claim 2 wherein D is —O—$CH_2$—Ph—O—; —O—Ph—O—; or —O—Ph—$CH_2$—O—.

4. The method of claim 1 wherein the resin-bound aryl silane intermediate is prepared by reacting an aryl silane compound of Formula (IB)

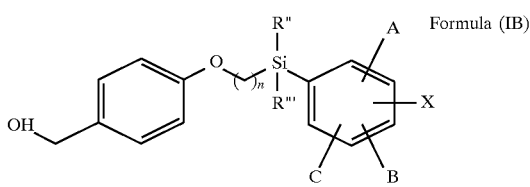

Formula (IB)

wherein R" and R'", independently from one another, are $C_1$ to $C_6$ alkyl; X, A, B and C are, independent from one another, hydrogen, halogen, alkyl, alkenyl, alkynyl, alkoxy, aryloxy, thioether, alkylthio, $C(O)R^a$, wherein $R^a$ is hydrogen or alkyl, t-butoxyamino-carbonyl, cyano, nitro, aryl, heteroaryl, arylalkyl, alkyl disulfide, aryl disulfide, acetal, fluorenylmethoxycarbonyl or an orthoester group; and n is an integer from 1 to 10; with a chloromethyl cross-linked divinylbenzene polystyrene resin support.

5. The method of claim 4 wherein R" and R'" are independently $C_1$ to $C_4$ alkyl; X is bromine or iodine; A, B and C are each hydrogen and n is an integer from 1 to 4.

6. The method of claim 1 wherein the polymeric resin support is a cross-linked polystyrene resin, a polyethylene glycol-polystyrene resin, or a polypropylene glycol resin.

7. The method of claim 1, wherein after step (ii), the method further comprises the step of cleaving the resin-bound aryl silane intermediate so that the aromatic carbocycle resulting from the cleavage has a hydrogen, halogen, hydroxy or acyloxy group on the aromatic carbon where it was bound through the silane linker.

8. The method of claim 1 wherein the aromatic carbon is first coupled to the silane linker.

9. The method of claim 7 wherein the aromatic carbocycles are cleaved from the polymeric resin support by treatment with HF, TFA, HCl, $H_2SO_4$, pyridinium hydrofluoride, triflic acid, $BF_3$, methanesulfonic acid or mixtures thereof.

10. A method for preparing a library of diverse resin-bound aromatic carbocycles each comprising an aromatic carbon atom and at least one substituent, X, A, B or C, said method comprising the steps of:
(i) coupling the aromatic carbon atom of each of a plurality of aromatic carbocycles to an individual polymeric resin support through a silane linker to give a plurality of resin-bound aryl silane intermediates;
(ii) optionally dividing said resin-bound aryl silane intermediates into a plurality of portions;
(iii) performing additional synthetic chemistry on at least one of the substituents, X, A, B or C contained on the plurality of aromatic carbocycles, in order to modify said substituent; and
(iv) optionally recombining the portions, with the proviso that not all of substituents X, A, B or C are hydrogen and not all of X, A, B or C are alkyl.

11. The method of claim 10 wherein the steps of (ii) dividing the portions, (iii) performing additional synthetic chemistry, and (iv) recombining the portions, are carried out more than once.

12. The method of claim 10, wherein after step (iv), the method further comprises the step of partially cleaving the aromatic carbocycles from the individual polymeric resin supports so that the aromatic carbocycles resulting from the cleavage have a hydrogen, halogen, hydroxy or acyloxy group on the aromatic carbon where they were bound to the polymeric resin support through the silane linker.

13. The method of claim 12 wherein the derivatized aromatic carbocycles are fully cleaved from the resin.

14. The method of claim 10 wherein the polymeric resin support is a cross-linked polystyrene resin, a polyethylene glycol-polystyrene resin, or a polypropylene glycol resin.

15. The method of claim 13 wherein the aromatic carbocycles are cleaved from the polymeric resin support by treatment with HF, TFA, HCl, $H_2SO_4$, pyridinium hydrofluoride, triflic acid, $BF_3$, methanesulfonic acid or mixtures thereof.

16. The method of claim 10 wherein each of the plurality of aromatic carbocycles is attached to the polymeric resin support by a silane linker comprising -D-$CH_2$—Si—R"R'", wherein R" and R'" are independently, $C_1$ to $C_6$ alkyl and D is a $C_1$ to $C_{20}$ alkyl chain optionally having one or more intervening heteroatoms or aryl groups.

17. The method of claim 16 wherein D is —O—$CH_2$—Ph—O—; —O—Ph—O—; or —O—Ph—$CH_2$—O—.

18. The method of claim 15 wherein the aromatic carbocycle is first coupled to the silane linker to comprise a compound of the Formula (IB)

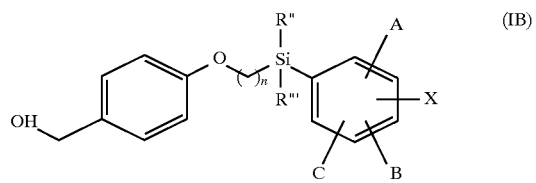

wherein R" and R'", independently from one another, are $C_1$ to $C_6$ alkyl; X is Br or I; A, B and C are hydrogen and n is an integer from 1 to 4.

19. The method of claim 10 wherein the substituents X, A, B and C are, independent from one another, hydrogen, halogen, alkyl, alkenyl, alkynyl, alkoxy, alkylthio, t-butoxyaminocarbonyl, nitro, aryl, heteroaryl, arylalkyl, alkyl disulfide, aryl disulfide, acetal, fluorenylmethoxycarbonyl or orthoester.

20. The method of claim 1 wherein the substituents, X, A, B and C are, independent from one another, hydrogen, halogen, alkyl, alkenyl, alkynyl, alkoxy, alkylthio, $C(O)R^a$, wherein $R^a$ is hydrogen or alkyl, t-butoxyaminocarbonyl, cyano, nitro, aryl, heteroaryl, arylalkyl, alkyl disulfide, aryl disulfide, acetal, fluorenylmethoxycarbonyl or orthoester.

21. The method of claim 10 wherein the aromatic carbocycles are selected from the group consisting of 1-, 2- or 3-tetrahydrobenzazepine compounds, 1,4-, 1,5- or 2,4-tetrahydrobenzodiazepine compounds, biphenyl tetrazole compounds, 1,3- or 1,4-diaminobenzene compounds or 1,3- or 1,4-aminocarboxyphenyl compounds.

22. A compound of Formula (IB)

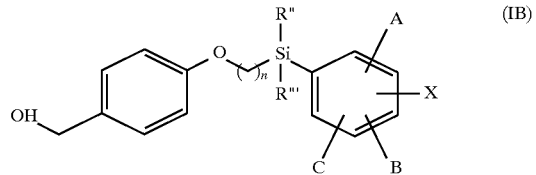

wherein R" and R'", independently from one another, are $C_1$ to $C_6$ alkyl; X, A, B and C are, independent from one another, hydrogen, halogen, alkyl, alkenyl, alkynyl, alkoxy, aryloxy, thioether, alkylthio, $C(O)R^a$, wherein $R^a$ is hydrogen or alkyl, t-butoxyamino-carbonyl, cyano, nitro, aryl, heteroaryl, arylalkyl, alkyl disulfide, aryl disulfide, acetal, fluorenylmethoxycarbonyl or an orthoester group provided that not all of X, A, B or C are hydrogen and not all of X, A, B or C are alkyl; and n is an integer from 1 to 10.

23. A compound of the Formula (IIB)

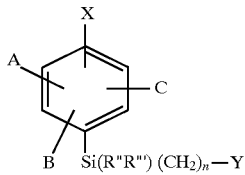
(IIB)

wherein R" and R'", independently from one another, are $C_1$ to $C_6$ alkyl; X, A, B and C are, independent from one another, hydrogen, halogen, alkyl, alkenyl, alkynyl, alkoxy, alkylthio, $C(O)R^a$, wherein $R^a$ is hydrogen or alkyl, t-butoxyaminocarbonyl, cyano, nitro, aryl, heteroaryl, arylalkyl, alkyl disulfide, aryl disulfide, acetal, fluorenyl-methoxycarbonyl or an orthoester group, provided that not all of X, A, B or C are hydrogen and not all of X, A, B or C are alkyl; Y is halogen or hydroxyl; and n is an integer from 1 to 10.

24. A method for screening a compound as a receptor ligand, said method comprising preparing the compound according to claim 1, and testing the compound in a suitable assay developed for identifying such receptor ligands.

25. A method for screening a library of compounds as receptor ligands, said method comprising preparing the library according to claim 10, and testing the compounds in a suitable assay developed for identifying such receptor ligands, wherein said compounds comprise an aromatic carbocycle attached to a polymeric resin through a silane linker of the formula -D-$CH_2$—Si— wherein D is a $C_1$ to $C_{20}$ alkyl chain optionally having one or more intervening heteroatoms or aryl groups.

26. The method of claim 25, wherein the library of compounds is partially cleaved from the polymeric resin.

* * * * *